United States Patent
Shultz et al.

(10) Patent No.: US 11,120,123 B2
(45) Date of Patent: Sep. 14, 2021

(54) DEVICE, METHOD, AND GRAPHICAL USER INTERFACE FOR MANAGING AUTHENTICATION CREDENTIALS FOR USER ACCOUNTS

(71) Applicant: Apple Inc., Cupertino, CA (US)

(72) Inventors: Conrad A. Shultz, San Jose, CA (US); Richard J. Mondello, Mountain View, CA (US); Reza Abbasian, Santa Clara, CA (US); Ivan Krstic, San Francisco, CA (US); Darin Adler, Los Gatos, CA (US); Charilaos Papadopoulos, San Jose, CA (US); Maureen Grace Daum, Mountain View, CA (US); Guillaume Borios, San Jose, CA (US); Patrick Robert Burns, San Jose, CA (US); Alexander David Sanciangco, Campbell, CA (US); Brent Michael Ledvina, San Francisco, CA (US); Chelsea Elizabeth Pugh, San Francisco, CA (US); Kyle Brogle, San Francisco, CA (US); Marc J. Krochmal, Santa Clara, CA (US); Jacob Klapper, Santa Clara, CA (US); Paul Russell Knight, San Francisco, CA (US); Connor David Graham, San Francisco, CA (US); Shengkai Wu, San Jose, CA (US); I-Ting Liu, Sunnyvale, CA (US); Steven Jon Falkenburg, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 16/427,152

(22) Filed: May 30, 2019

(65) Prior Publication Data
US 2019/0370457 A1    Dec. 5, 2019

Related U.S. Application Data

(60) Provisional application No. 62/679,841, filed on Jun. 3, 2018.

(51) Int. Cl.
*G06F 21/46* (2013.01)
*G06F 3/0482* (2013.01)
(Continued)

(52) U.S. Cl.
CPC ............ *G06F 21/46* (2013.01); *G06F 3/0482* (2013.01); *G06F 3/04886* (2013.01); *G06F 21/31* (2013.01)

(58) Field of Classification Search
CPC .... G06F 21/46; G06F 3/0482; G06F 3/04886; G06F 21/31; G06F 21/45; G06F 21/30;
(Continued)

(56) References Cited

U.S. PATENT DOCUMENTS

2010/0031343 A1* 2/2010 Childress ................ G06F 21/46
726/18

FOREIGN PATENT DOCUMENTS

| WO | 2014019129 A1 | 2/2014 | |
|----|---------------|--------|---|
| WO | WO-2014019129 A1 * | 2/2014 | ............ G06F 21/45 |
| WO | 2016200443 A1 | 12/2015 | |

OTHER PUBLICATIONS

International Search Report and Written Opinion of corresponding Intl. App. No. PCT/US2019/286636 dated Sep. 27, 2019.

* cited by examiner

*Primary Examiner* — Abiy Getachew
(74) *Attorney, Agent, or Firm* — Fernando & Partners, LLP

(57) ABSTRACT

In accordance with some embodiments, a method is performed at an electronic device with a display device and one (Continued)

or more input devices. The method includes displaying, via the display device, a user interface that includes a new-password field. The method includes detecting, via the one or more input devices, a user input that corresponds to selection of the new-password field. In response to detecting the user input that corresponds to selection of the new-password field, the method includes displaying, on the display device, a representation of a new automatically-generated password in the new-password field and displaying, on the display device, an affordance to accept the new automatically-generated password and an affordance to decline to use the new automatically-generated password.

27 Claims, 86 Drawing Sheets

(51) Int. Cl.
*G06F 3/0488* (2013.01)
*G06F 21/31* (2013.01)

(58) Field of Classification Search
CPC . H04L 9/3226; H04L 63/083; H04W 12/0608
See application file for complete search history.

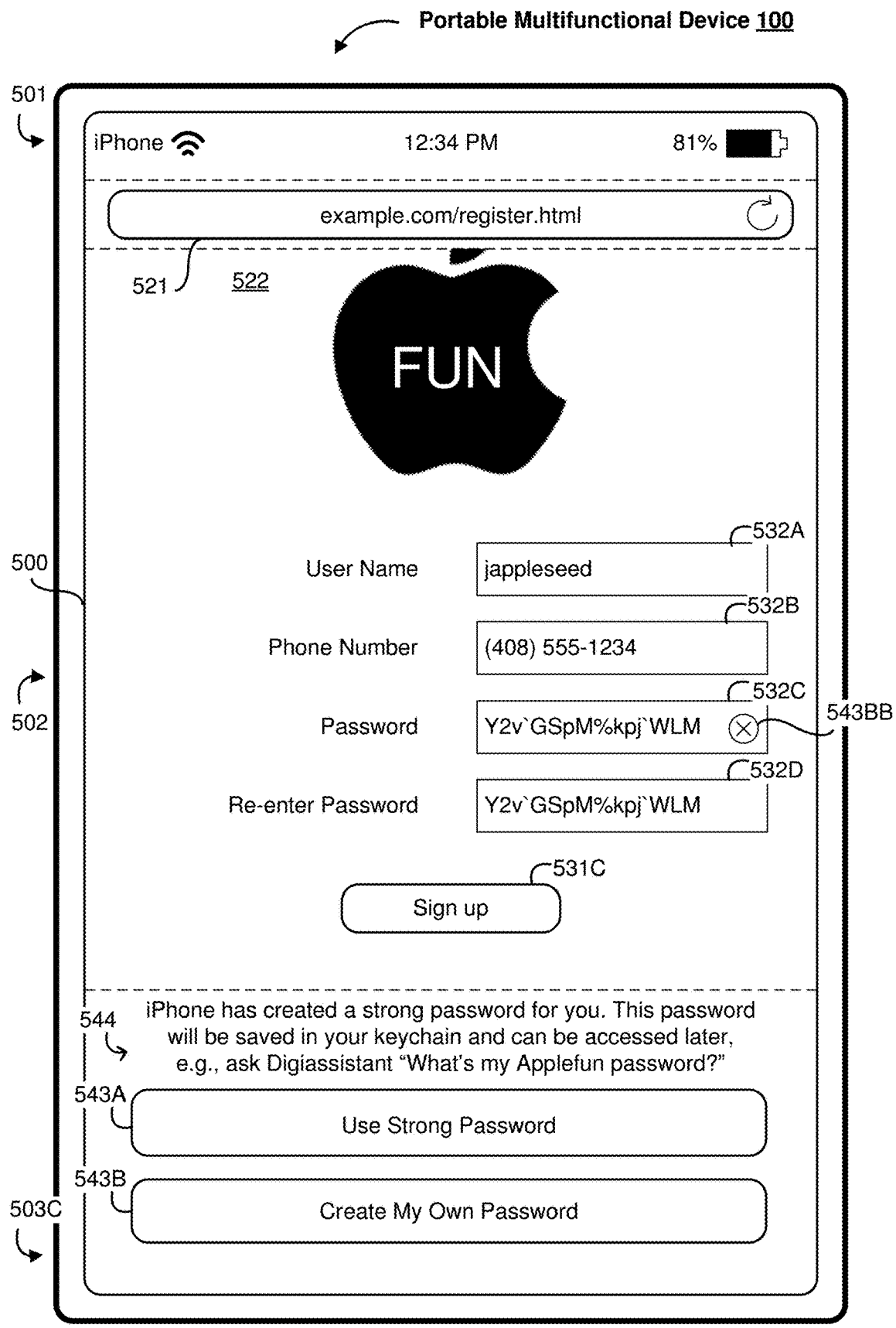
Figure 5G1

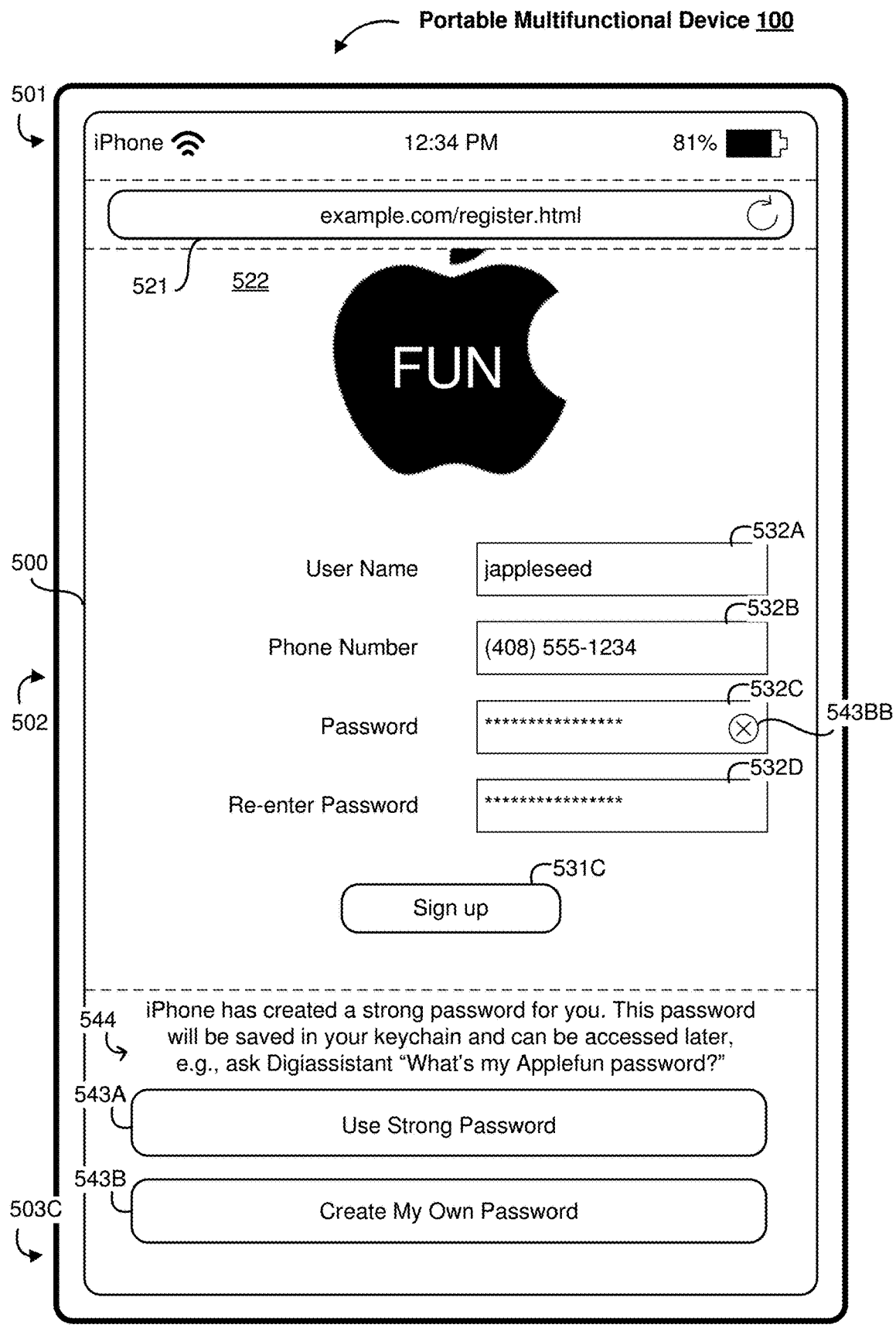
Figure 5G2

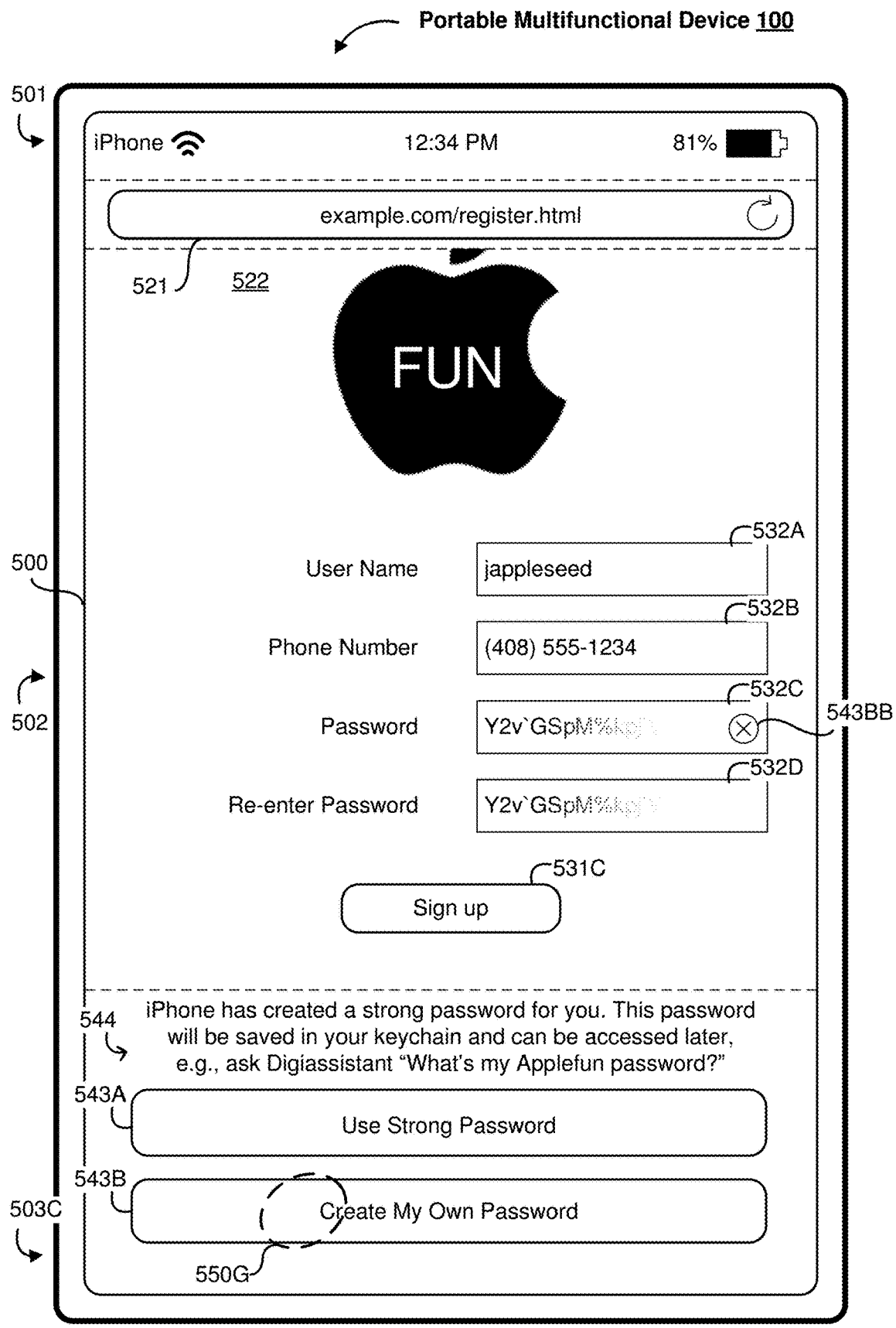
Figure 5G3

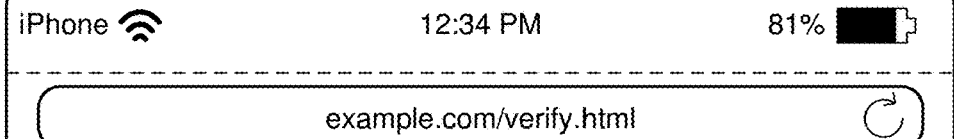
Figure 5U1

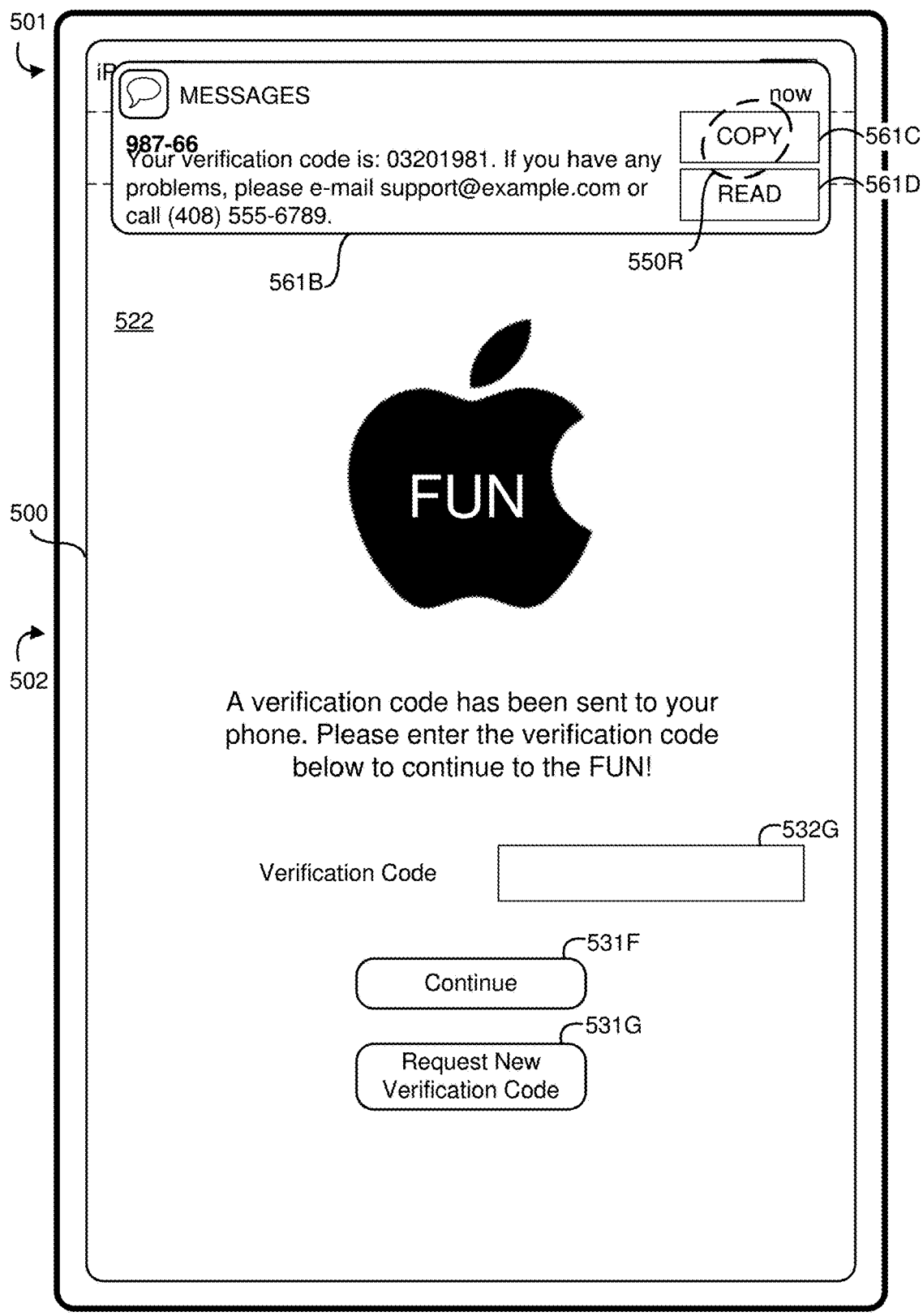
Figure 5U2

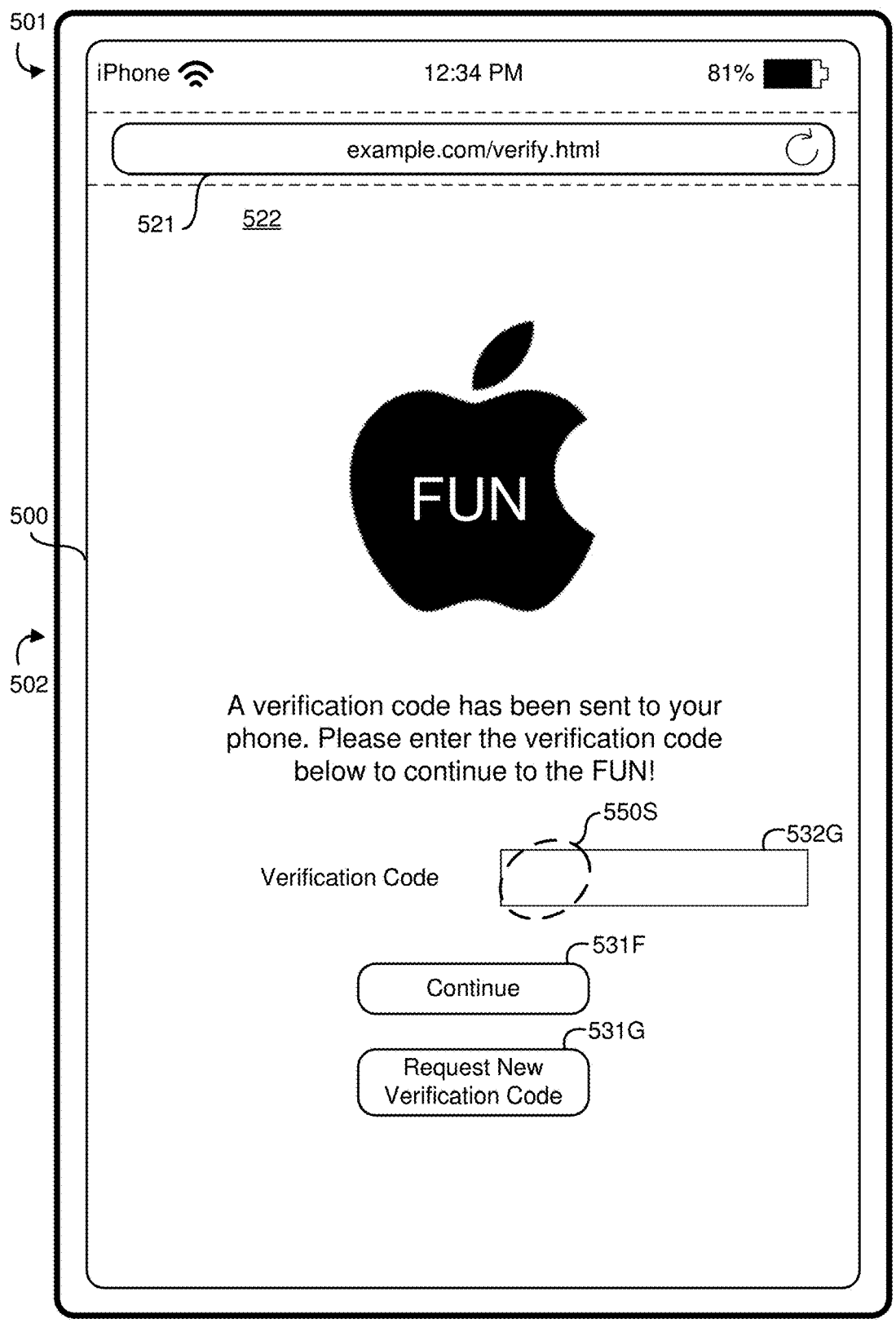
Figure 5U3

800

At an electronic device with a display device and one or more input devices:

Displaying, via the display device, a user interface that includes a new-password field — 802

↓

Detecting, via the one or more input devices, a user input that corresponds to selection of the new-password field — 804

Determining that a selected field is a new-password field based on one or more of a number of fields of the user interface or text associated with the user interface — 806

↓

In response to detecting the user input that corresponds to selection of the new-password field: — 808

Displaying, on the display device, a representation of a new automatically-generated password in the new-password field — 810

Displaying the new automatically-generated password — 812

Displaying a generic password indicator — 814

Displaying a portion of the new automatically-generated password and an indication that a portion of the new automatically-generated password is not displayed — 816

The new automatically-generated password is generated based on one or more password generation constraints of the user interface — 818

In response to detecting the user input that corresponds to selection of the new-password field: ⎯808

Displaying, on the display device, an affordance to accept the new automatically-generated password and an affordance to decline to use the new automatically-generated password ⎯820

Displaying a new-password user interface including the affordance to accept the new automatically-generated password and the affordance to decline to use the new automatically-generated password ⎯822

Displaying the new-password user interface excludes display of a plurality of character insertion affordances displayed in a soft keyboard ⎯824

Detecting, via the one or more input devices, a user input that corresponds to selection of a user identifier field ⎯826

In response to detecting the user input that corresponds to selection of the user identifier field, displaying, on the display device, the soft keyboard including the plurality of character insertion affordances ⎯828

The new-password user interface includes a description of the new automatically-generated password and instructions for retrieval of the new automatically-generated password ⎯830

Displaying, separate from the new-password user interface, a second affordance to decline to use the new automatically-generated password ⎯832

```
At an electronic device with a display device and one or more input devices:

Receiving, via the one or more input devices, a request to access a     ——902
resource protected by a verification code
```

```
After receiving the request to access the resource, receiving, at the     ——904
electronic device, an electronic message
```

```
In response to receiving the electronic message, displaying, on the       ——906
display device, a message notification The message notification includes a copy affordance that, when        ——908
    selected, copies the content to a clipboard
```

```
Detecting, via the one or more input devices, a user input                ——910
corresponding to selection of the message notification
```

```
In response to detecting the user input corresponding to selection of the ——912
message notification, displaying, on the display device, the electronic
message with emphasis of the content that matches the predetermined format
```

```
In response to receiving the electronic message:
    in accordance with a determination that the electronic message does
not include content that meets the respective criteria, displaying, on the  ——914
display device, a message notification; and
    in accordance with a determination that the electronic message
includes content that meets the respective criteria, forgoing display of the
message notification
```

| At a first electronic device with a display device and one or more input devices:<br><br>Receiving, at the first electronic device, an indication that a second electronic device is in need of authentication credentials for a service | — 1002 |

↓

| In response to receiving the indication that the second electronic device is in need of authentication credentials for the service, in accordance with a determination that the first electronic device meets respective criteria, wherein the respective criteria include a requirement that the first electronic device is within a predetermined proximity to the second electronic device, displaying, via the display device in order for the respective criteria to be met, a verification prompt that requires input of verification information from the second electronic device on the first electronic device in order to proceed | — 1004 |

> In accordance with a determination that the first electronic device does not meet the respective criteria, forgoing display of the verification prompt — 1006

> The respective criteria include a requirement that the first electronic device is within a proximity to a third electronic device that is associated with the second electronic device — 1008

>> The second electronic device is a media playback device and the third electronic device is a remote control for the second electronic device — 1010

> Displaying, on the display device, a sharing confirmation notification including a sharing confirmation affordance that, when selected, causes display of the verification prompt and detecting, via the one or more input devices, a user input corresponding to selection of the sharing confirmation affordance — 1012

> The verification information from the second electronic device is displayed by the second electronic device — 1014

In response to receiving the verification information, initiating a process for sharing authentication credentials for the service from the first electronic device to the second electronic device ⎯1020

In response to detecting the sequence of one or more inputs, sharing authentication credentials for the service from the first electronic device to the second electronic device ⎯1030

Transmitting, from the first electronic device to the second electronic device, the authentication credentials for the service wirelessly over a secure connection ⎯1032

Sharing a user identifier and a password from the first electronic device to the second electronic device ⎯1034

Obtaining, via the one or more input devices, authentication information ⎯1036

Authenticating the user based on the authentication information ⎯1038

After the process for sharing the authentication credentials for the service, displaying, on the display device, a notification indicating that the process for sharing the authentication credentials for the service is completed. ⎯1040

At an electronic device with a display device and one or more input devices:

Detecting, via the one or more input devices, a verbal request to display password information ~1102

In response to receiving the verbal request to display the password information, in accordance with a determination that the request is for a password for a first user account that is accessible by the device and that the user is authenticated, displaying the password for the first user account ~1104

Displaying information regarding the first user account that is accessible by the device ~1106

The information regarding the first user account that is accessible by the device includes password security information for the password for the first user account ~1108

The information regarding the first user account that is accessible by the device includes an alert indicating that the password for the first user account is the same as a password for another user account that is accessible by the device ~1110

The alert includes an affordance that, when selected, displays a resource for changing the password for the first user account ~1112

In response to receiving the verbal request to display the password information, in accordance with a determination that the request is for a password for a second user account that is accessible by the device and that the user is authenticated, displaying the password for the second user account ~1114

DEVICE, METHOD, AND GRAPHICAL USER INTERFACE FOR MANAGING AUTHENTICATION CREDENTIALS FOR USER ACCOUNTS

CROSS-REFERENCE TO RELATED APPLICATIONS

This application claims priority to U.S. Provisional Patent App. No. 62/679,841, filed on Jun. 3, 2018, which is incorporated by reference in its entirety.

TECHNICAL FIELD

This relates generally to electronic devices with touch-sensitive surfaces, including but not limited to electronic devices with touch-sensitive surfaces that manage authentication credentials for user accounts.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse-based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for managing authentication credentials for user accounts. Such methods and interfaces optionally complement or replace conventional methods for managing authentication credentials for user accounts. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display device and one or more input devices. The method includes displaying, via the display device, a user interface that includes a new-password field. The method includes detecting, via the one or more input devices, a user input that corresponds to selection of the new-password field. In response to detecting the user input that corresponds to selection of the new-password field, the method includes displaying, on the display device, a representation of a new automatically-generated password in the new-password field and displaying, on the display device, an affordance to accept the new automatically-generated password and an affordance to decline to use the new automatically-generated password.

In accordance with some embodiments, a method is performed at an electronic device with a display device and one or more input devices. The method includes receiving, via the one or more input devices, a request to access a resource protected by a verification code. After receiving the request to access the resource, the method includes receiving, at the electronic device, an electronic message. After receiving the electronic message and while displaying, via the display device, a user interface for inputting the verification code, the method includes, in accordance with a determination that the electronic message includes content that meets respective criteria, wherein the respective criteria include a format requirement that the electronic message includes content that matches a predetermined format, displaying an insertion affordance that, when selected, automatically inserts the content that matches the predetermined format as a verification code in the user interface.

In accordance with some embodiments, a method is performed at a first electronic device with a display device and one or more input devices. The method includes receiving, at the first electronic device, an indication that a second electronic device is in need of authentication credentials for a service. In response to receiving the indication that the second electronic device is in need of authentication credentials for the service, in accordance with a determination that the first electronic device meets respective criteria, wherein the respective criteria include a requirement that the first electronic device is within a predetermined proximity to the second electronic device, the method includes displaying, via the display device in order for the respective criteria to be met, a verification prompt that requires input of verification information from the second electronic device on the first electronic device in order to proceed. While displaying the verification prompt, the method includes receiving, via the one or more input devices, the verification information from the second electronic device on the first electronic device. In response to receiving the verification information, the method includes initiating a process for sharing authentication credentials for the service from the first electronic device to the second electronic device.

In accordance with some embodiments, a method is performed at an electronic device with a display device and one or more input devices. The method includes detecting, via the one or more input devices, a verbal request to display password information. In response to receiving the verbal request to display the password information, the method includes, in accordance with a determination that the request is for a password for a first user account that is accessible by the device and that the user is authenticated, displaying the password for the first user account and, in accordance with a determination that the request is for a password for a second user account that is accessible by the device and that the user is authenticated, displaying the password for the second user account.

In accordance with some embodiments, an electronic device includes a display device configured to display a user interface, one or more input devices configured to receive user inputs, and a processing device coupled with the display device and the one or more input devices. The processing device is configured to display, via the display device, a user interface that includes a new-password field. The processing is configured to detect, via the one or more input devices, a user input that corresponds to selection of the new-password field. In response to detecting the user input that corresponds to selection of the new-password field, the processing device is configured to display, on the display device, a representation of a new automatically-generated password in the new-password field and display, on the display device, an affordance to accept the new automatically-generated password and an affordance to decline to use the new automatically-generated password.

In accordance with some embodiments, an electronic device includes a display device configured to display a user interface, one or more input devices configured to receive user inputs, and a processing device coupled with the display device and the one or more input devices. The processing device is configured to receive, via the one or more input devices, a request to access a resource protected by a verification code. After receiving the request to access the resource, the processing device is configured to receive, at the electronic device, an electronic message. After receiving the electronic message and while displaying, via the display device, a user interface for inputting the verification code, the processing device is configured to, in accordance with a determination that the electronic message includes content that meets respective criteria, wherein the respective criteria include a format requirement that the electronic message includes content that matches a predetermined format, display an insertion affordance that, when selected, automatically inserts the content that matches the predetermined format as a verification code in the user interface.

In accordance with some embodiments, a first electronic device includes a display device configured to display a user interface, one or more input devices configured to receive user inputs, and a processing device coupled with the display device and the one or more input devices. The processing device is configured to receive, at the first electronic device, an indication that a second electronic device is in need of authentication credentials for a service. In response to receiving the indication that the second electronic device is in need of authentication credentials for the service, in accordance with a determination that the first electronic device meets respective criteria, wherein the respective criteria include a requirement that the first electronic device is within a predetermined proximity to the second electronic device, the processing device is configured to display, via the display device in order for the respective criteria to be met, a verification prompt that requires input of verification information from the second electronic device on the first electronic device in order to proceed. While displaying the verification prompt, the processing device is configured to receive, via the one or more input devices, the verification information from the second electronic device on the first electronic device. In response to receiving the verification information, the processing device is configured to initiate a process for sharing authentication credentials for the service from the first electronic device to the second electronic device.

In accordance with some embodiments, a first electronic device includes a display device configured to display a user interface, one or more input devices configured to receive user inputs, and a processing device coupled with the display device and the one or more input devices. The processing device is configured to detect, via the one or more input devices, a verbal request to display password information. In response to receiving the verbal request to display the password information, the processing device is configured to, in accordance with a determination that the request is for a password for a first user account that is accessible by the device and that the user is authenticated, display the password for the first user account and, in accordance with a determination that the request is for a password for a second user account that is accessible by the device and that the user is authenticated, display the password for the second user account In accordance with some embodiments, an electronic device includes a display device, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer-readable storage medium has stored therein instructions which when executed by one or more processors of an electronic device with a display device and one or more input devices, cause the electronic device to perform or cause performance of the operations of any of the methods described herein. In accordance with some embodiments, a graphical user interface on an electronic device with a display device, one or more input devices, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display device, one or more input devices, and means for performing or causing performance of the operations of any of the methods described herein. In accordance with some embodiments, an information processing apparatus, for use in an electronic device with a display device and one or more input devices, includes means for performing or causing performance of the operations of any of the methods described herein.

Thus, electronic devices with display devices and one or more input devices are provided with faster, more efficient methods and interfaces for managing authentication credentials for user accounts, thereby increasing the effectiveness, efficiency, and user satisfaction with such devices. Such methods and interfaces may complement or replace conventional methods for managing authentication credentials for user accounts.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8C are flow diagrams illustrating a method of generating a new password for a user account in accordance with some embodiments.

FIGS. 9A-9D are flow diagrams illustrating a method of inserting a verification code into a user interface in accordance with some embodiments.

FIGS. 10A-10C are flow diagrams illustrating a method of sharing authentication credentials in accordance with some embodiments.

FIGS. 11A-11C are flow diagrams illustrating a method of displaying password information in accordance with some embodiments.

DESCRIPTION OF EMBODIMENTS

As the number of service providers offering services (e.g., web services and mobile applications) increases, the number of user accounts associated with a user also grows. Many user accounts are associated with authentication credentials, such as a username and a password, that are provided in order to access resources provided as part of the service. Many users have difficulty remembering a large number of username/password combinations. Accordingly, many users choose simple, weak, and/or insecure passwords or use the same password for many different user accounts, also resulting in a lack of security. When providing the password to login to a user account a new device, the user may easily forget a strong password or be required to input further authentication credentials in the form of a verification code.

Accordingly, in various implementations, when provided the option to generate a new password for a user account, a device automatically generates a strong new password. Further, the device stores the new password for simple retrieval via a verbal request. In various implementations, the device shares the password (and/or other authentication credentials) with other devices and automatically recognizes received verification codes.

Figure 2:
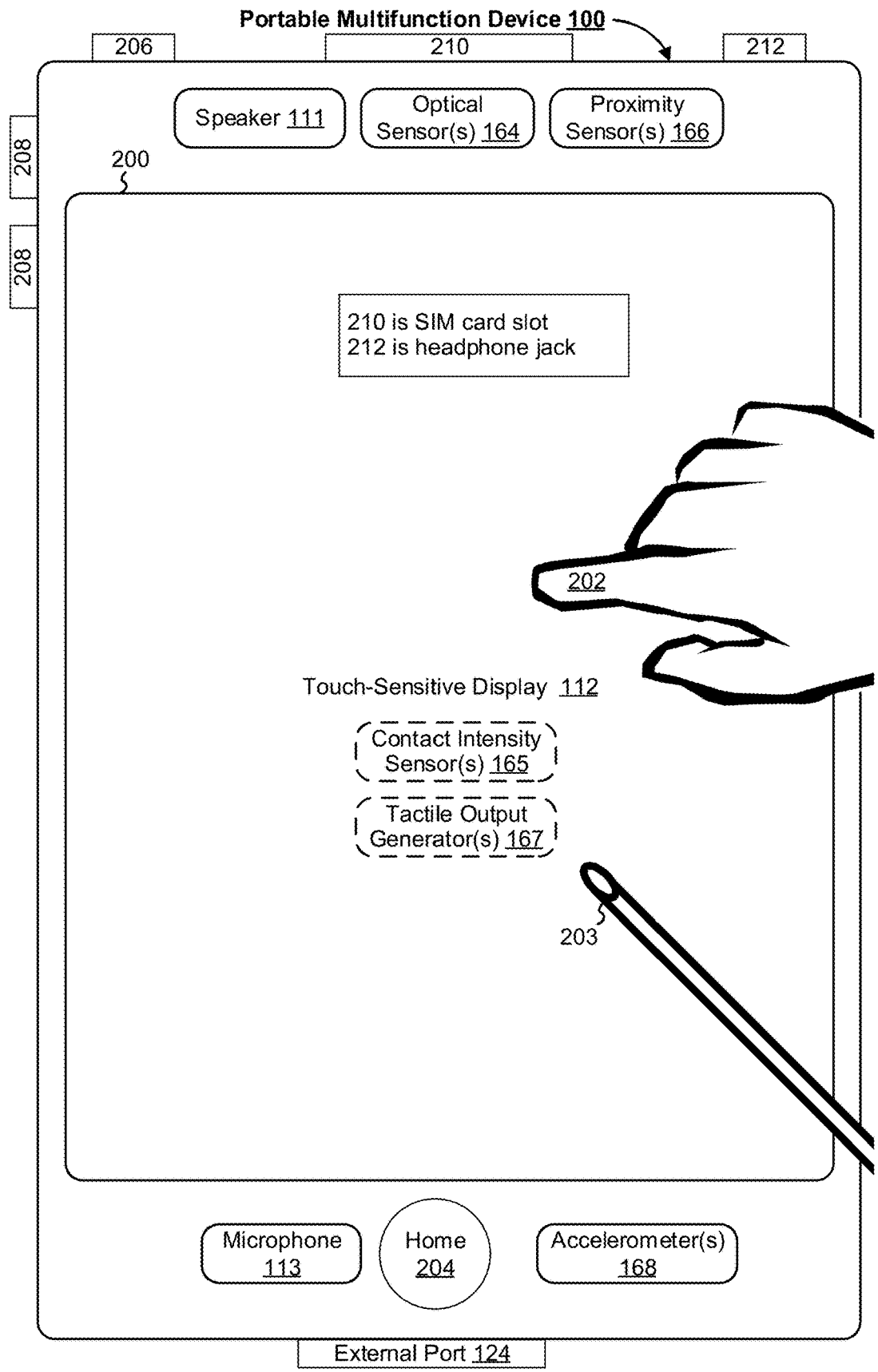
FIG. 2 illustrates a portable multifunction device having a touch screen in accordance with some embodiments.
Figure 3:
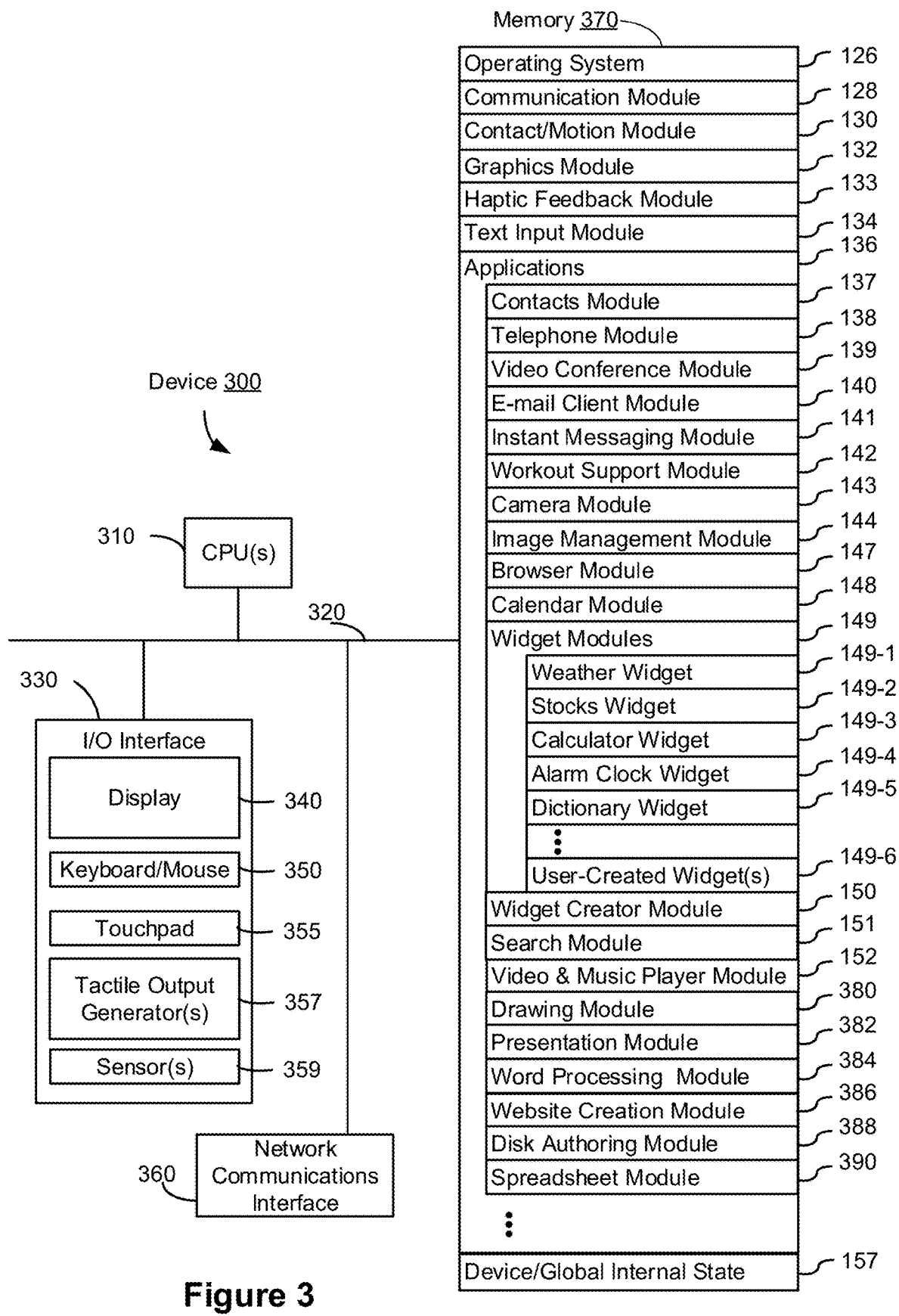
FIG. 3 is a block diagram of an example multifunction device with a display and a touch-sensitive surface in accordance with some embodiments.
Figure 4A:
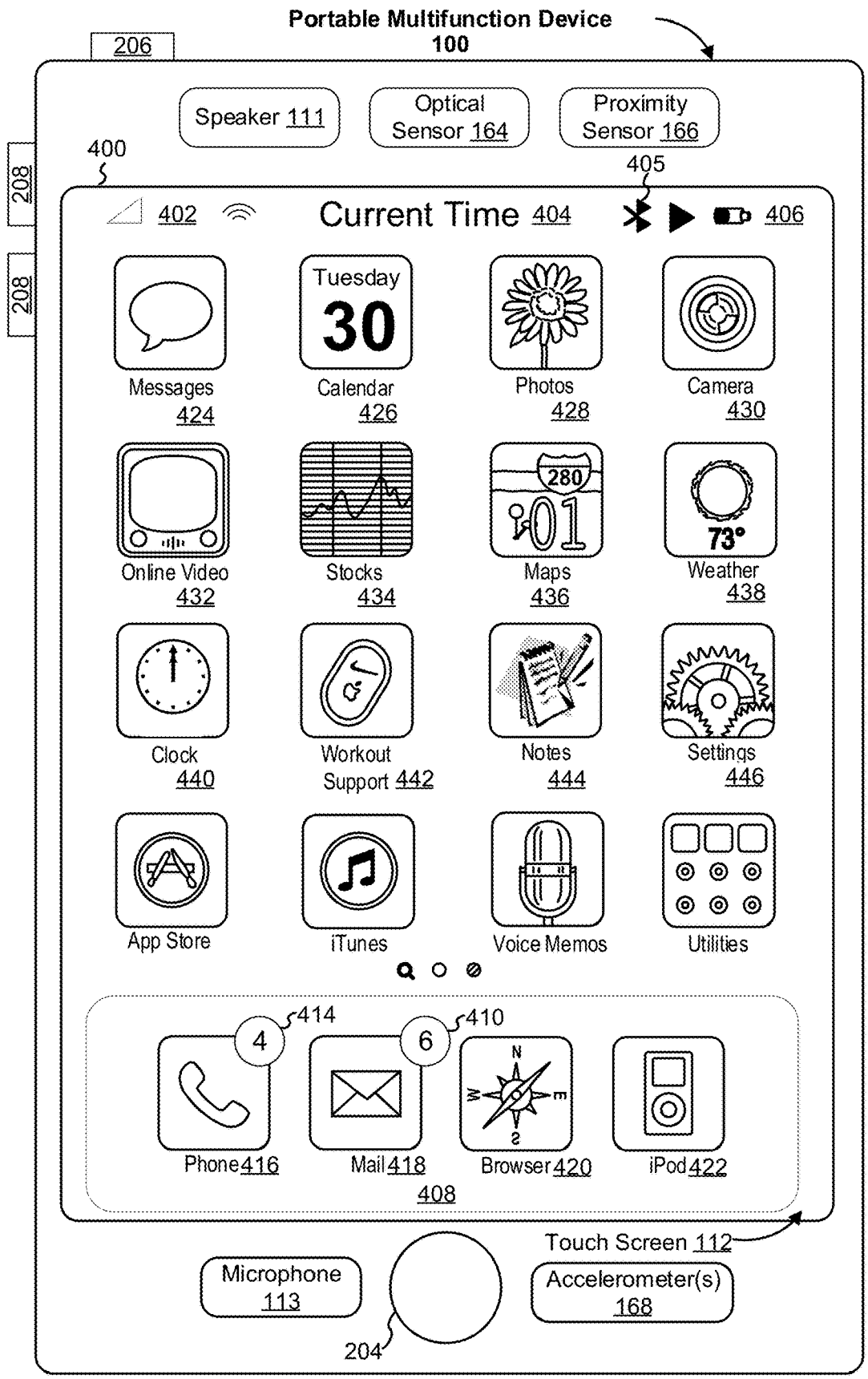
FIG. 4A illustrates an example user interface for a menu of applications on a portable multifunction device in accordance with some embodiments.
Figure 4B:
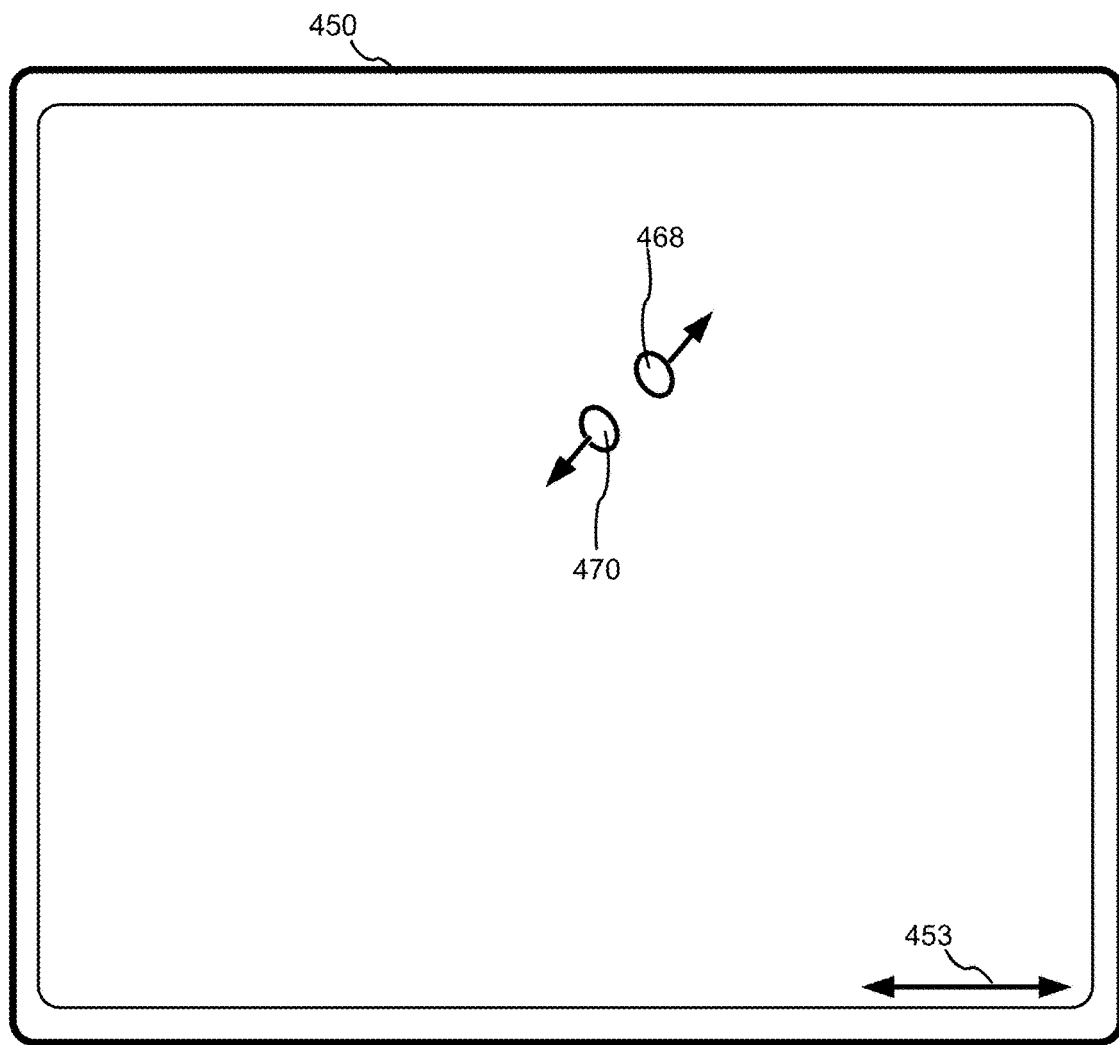
FIG. 4B illustrates an example user interface for a multifunction device with a touch-sensitive surface that is separate from the display in accordance with some embodiments.
Figure 4B:
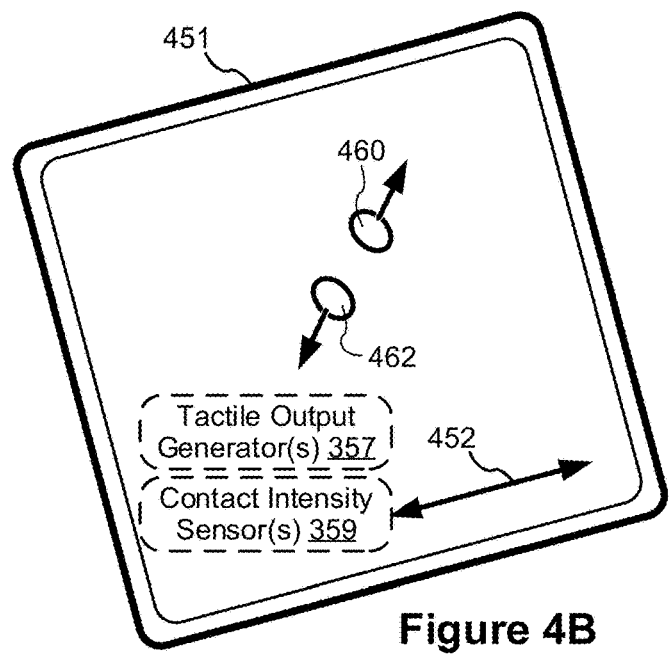
Figure 5A:
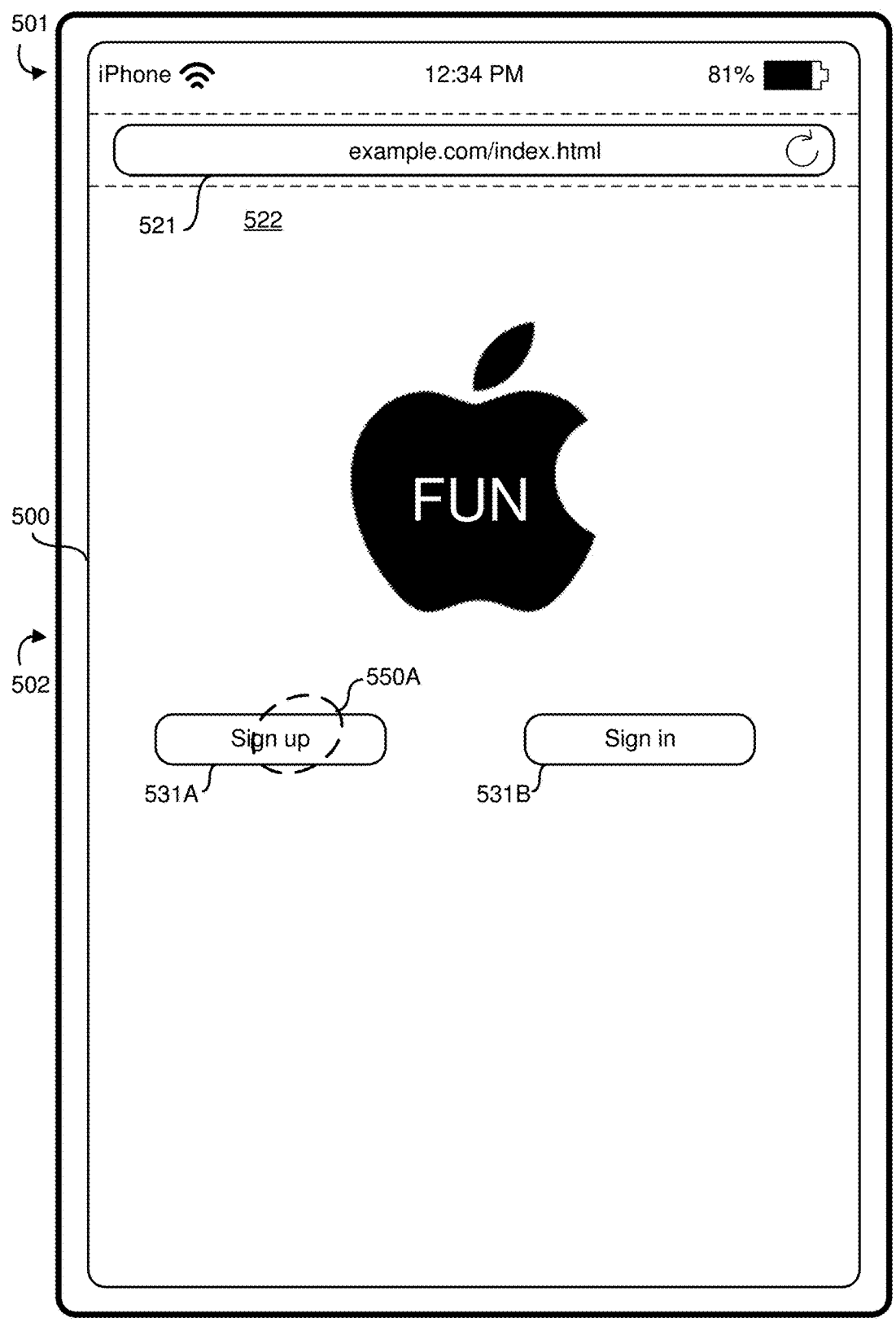
FIGS. 5A-5AD illustrate example user interfaces for generating a new password for a user account and inserting a verification code into a user interface in accordance with some embodiments.
Figure 8C:
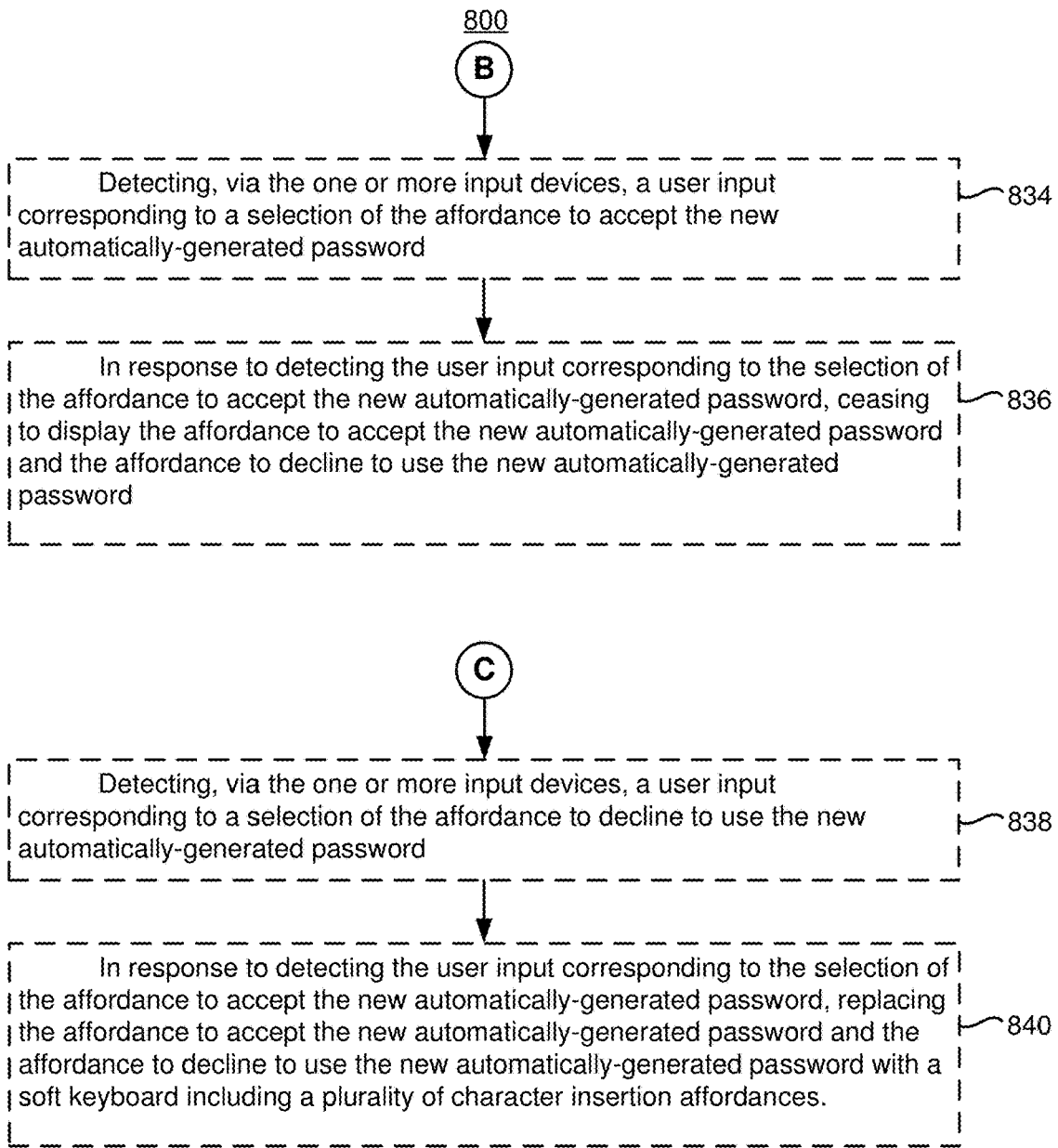
Figure 9B:
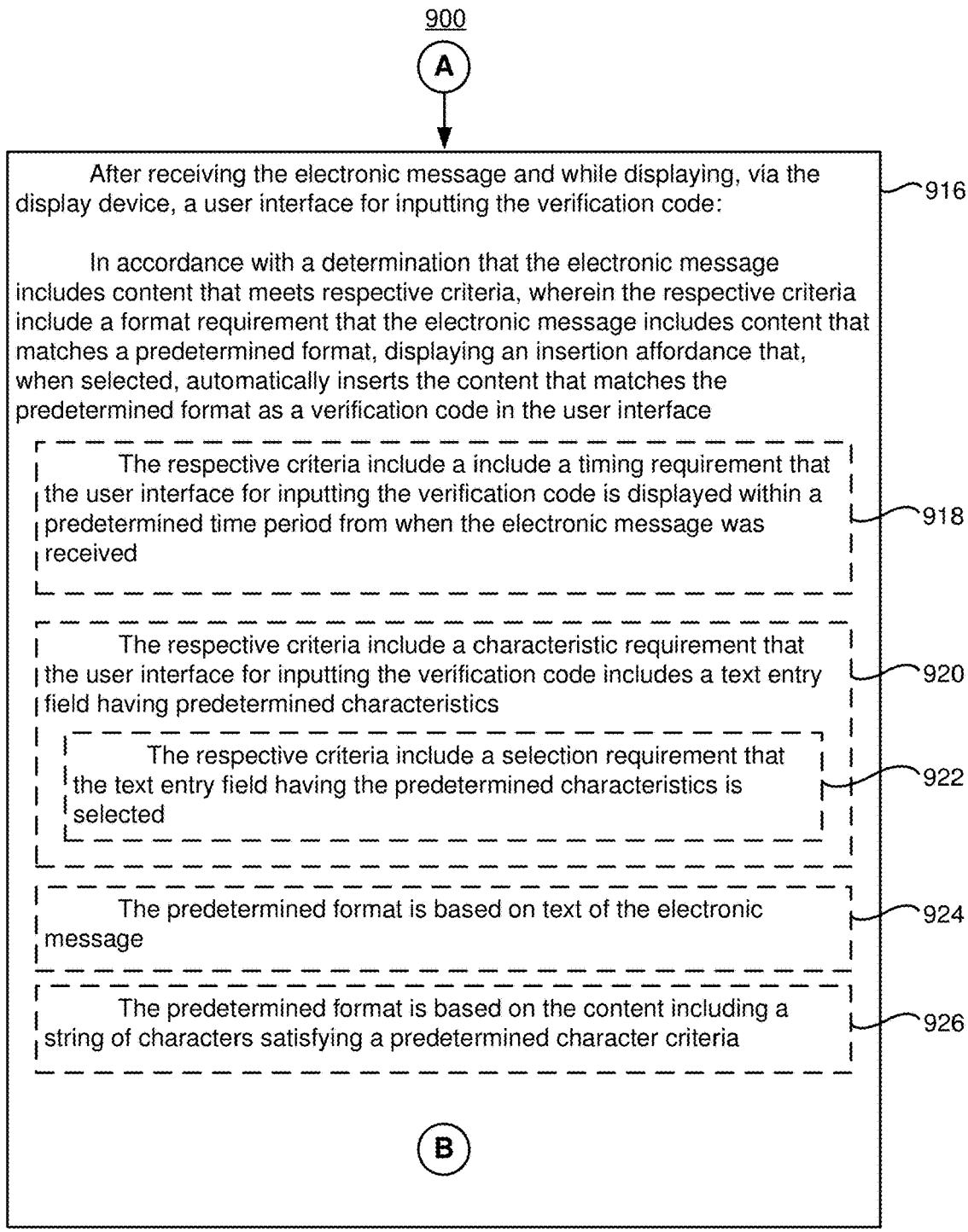
Figure 9C:
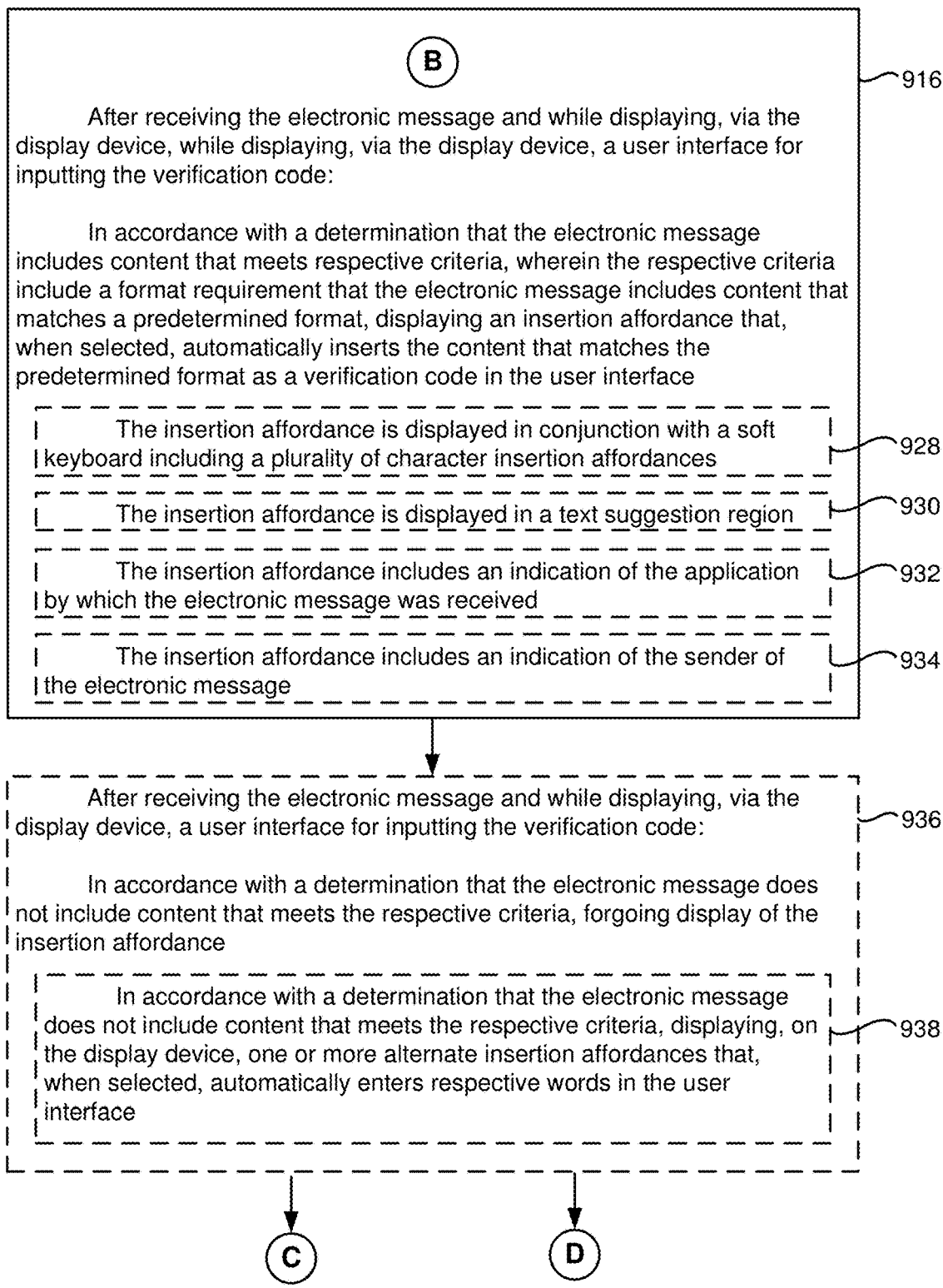
Figure 9D:
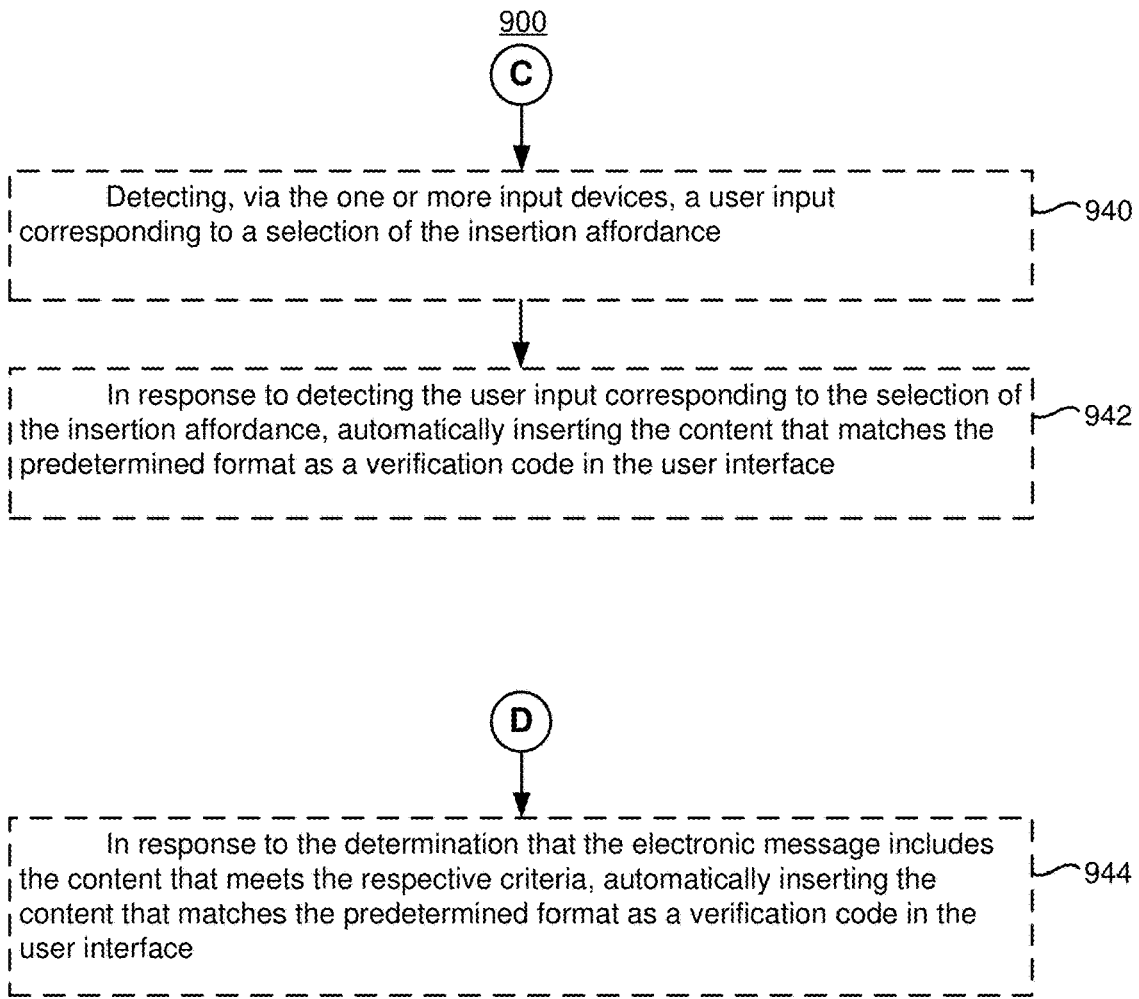
Figure 10B:
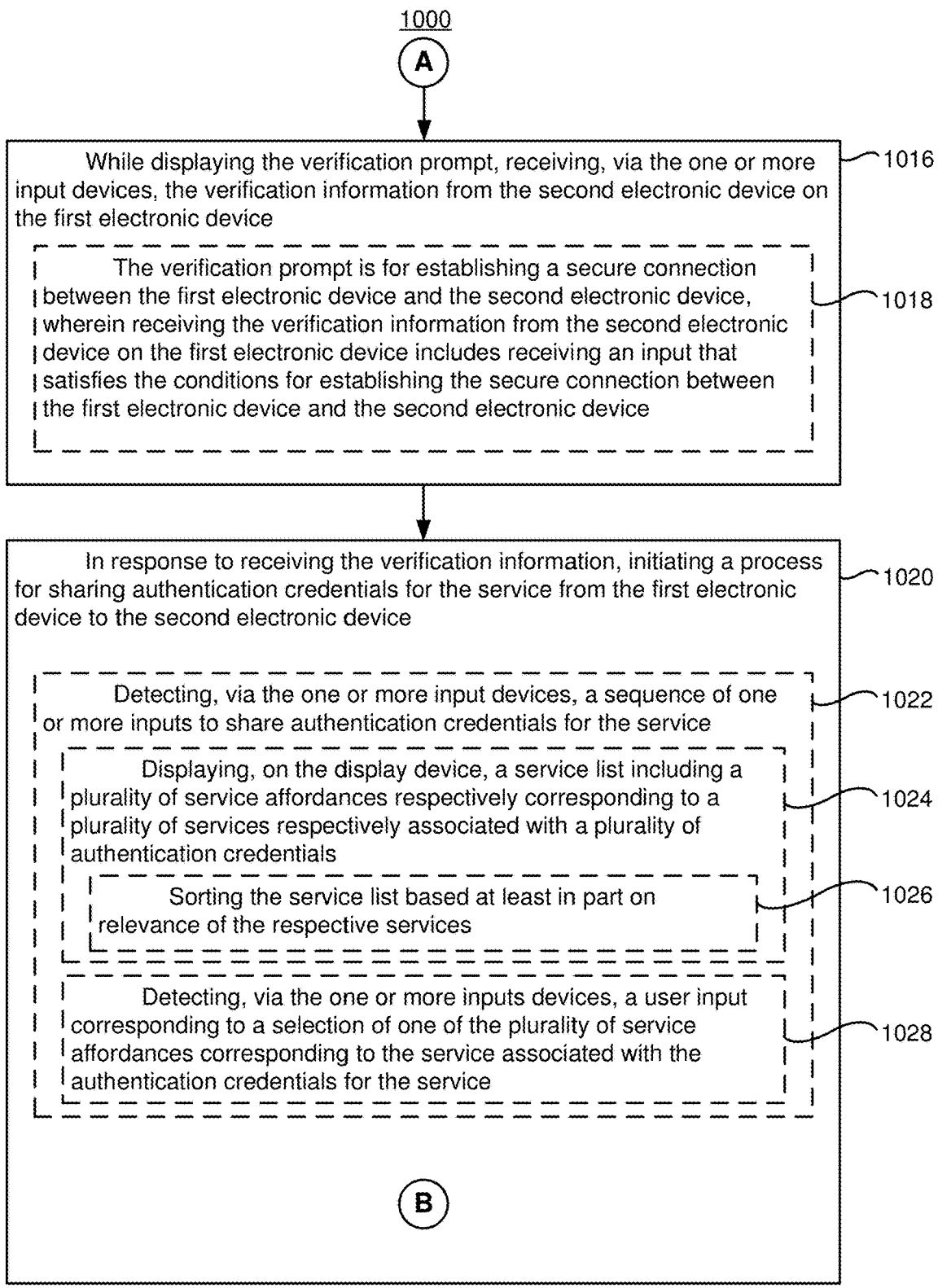
Figure 11B:
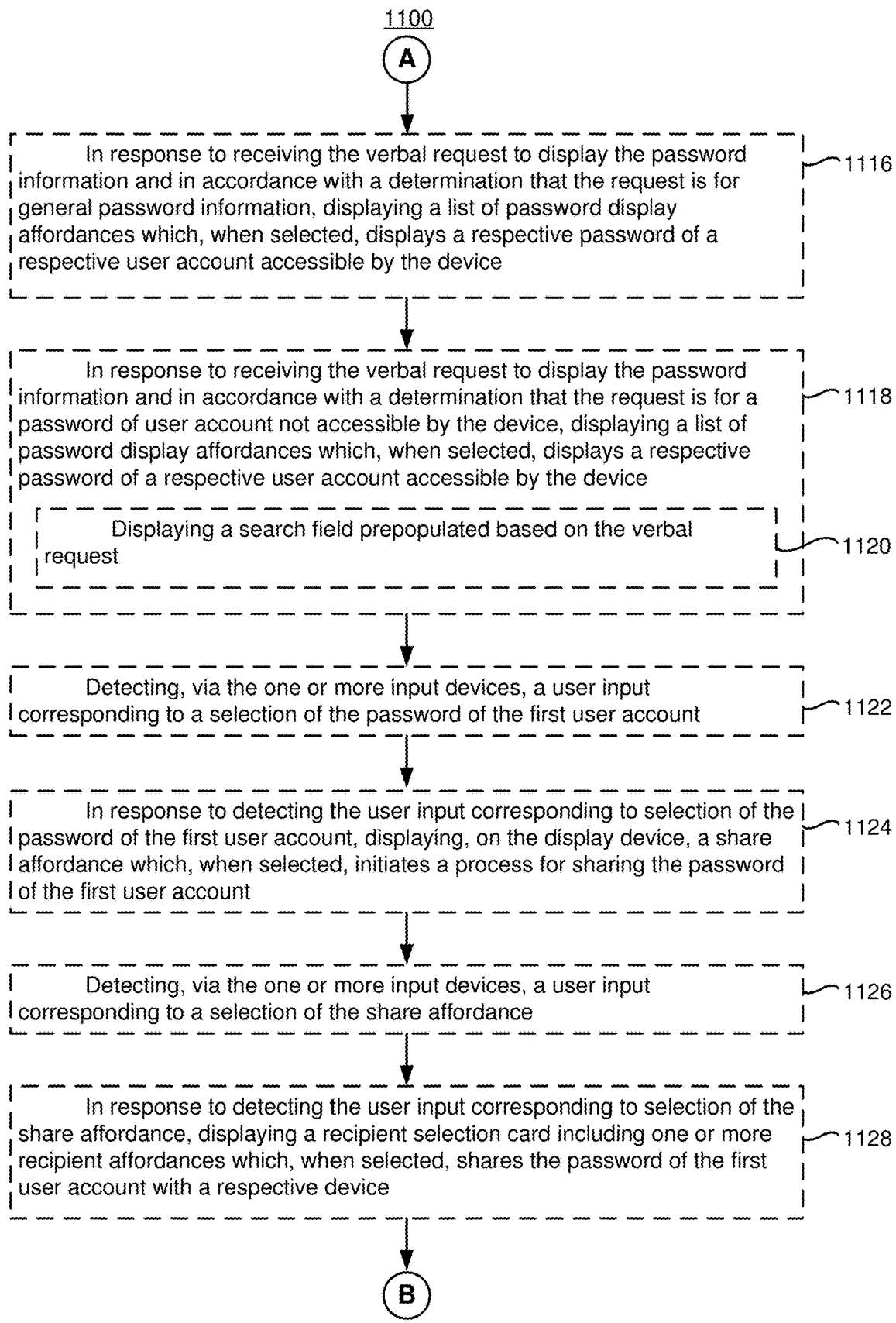
Figure 11C:
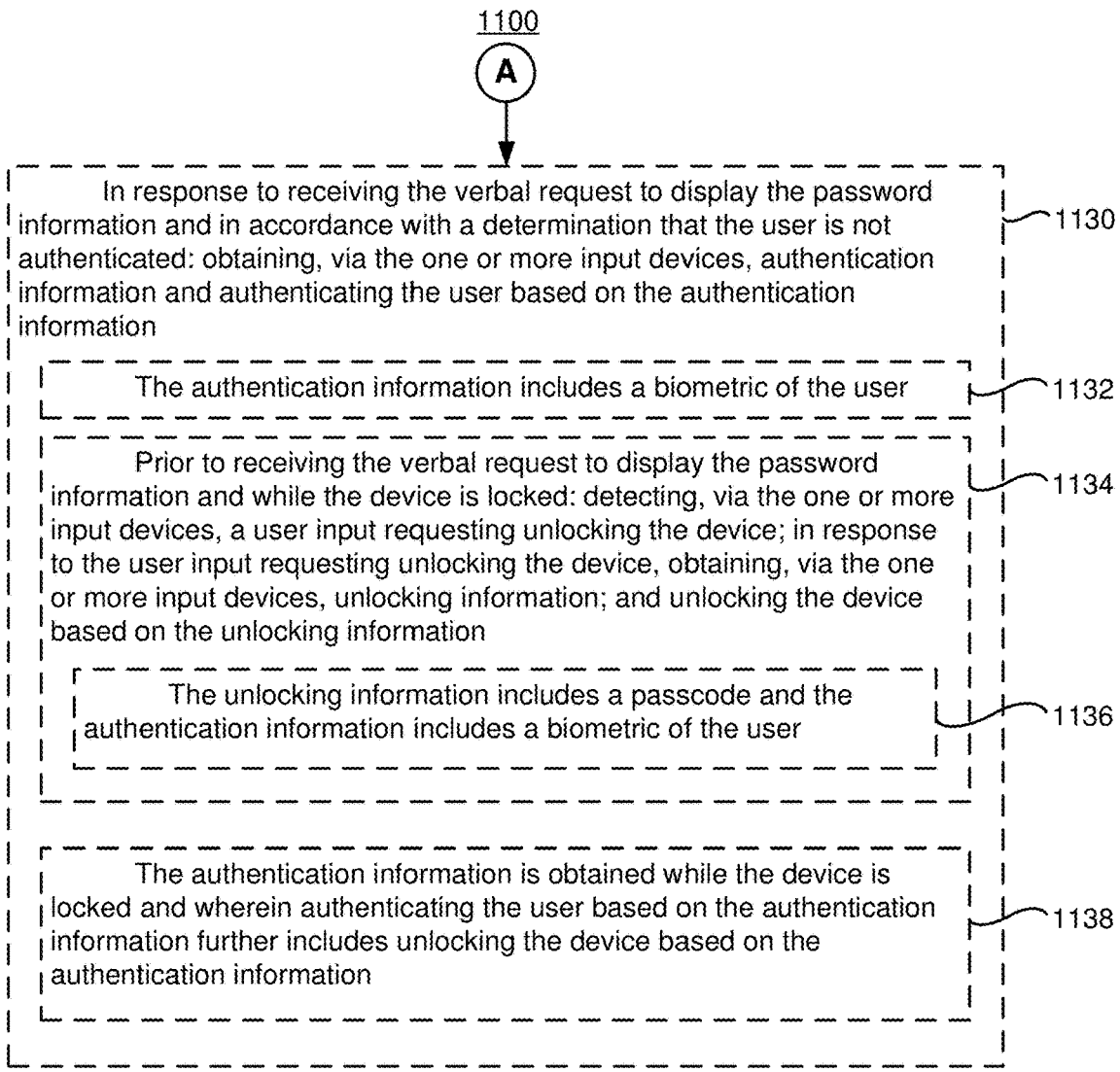

Below, FIGS. 1A-1B, 2, and 3 provide a description of example devices. FIGS. 4A-4B, 5A-5AD, 6A-6H, and 7A-7Y illustrate example user interfaces for managing authentication credentials for user accounts. FIGS. 8A-8C illustrate a flow diagram of a method of generating a new password for a user account. FIGS. 9A-9D illustrate a flow diagram of a method of inserting a verification code into a user interface. FIGS. 10A-10C illustrate a flow diagram of a method of sharing authentication credentials in accordance with some embodiments. FIGS. 11A-11C illustrate a flow diagram of a method of displaying password information. The user interfaces in FIGS. 5A-5AD, 6A-6H, and 7A-7Y are used to illustrate the processes in FIGS. 8A-8C, 9A-9D, 10A-10C, and 11A-11C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, iPad®, Apple TV®, and HomePod® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
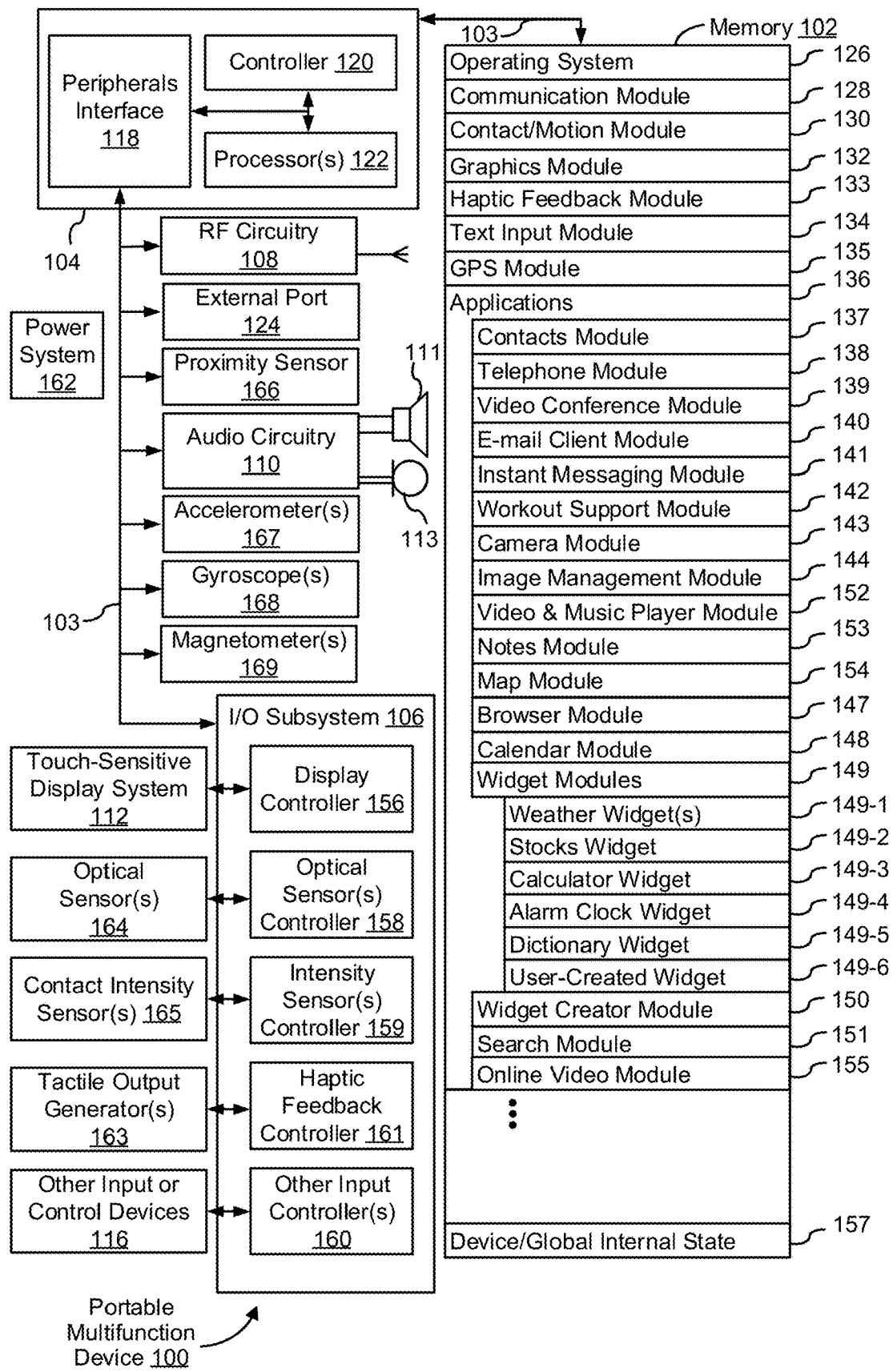
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
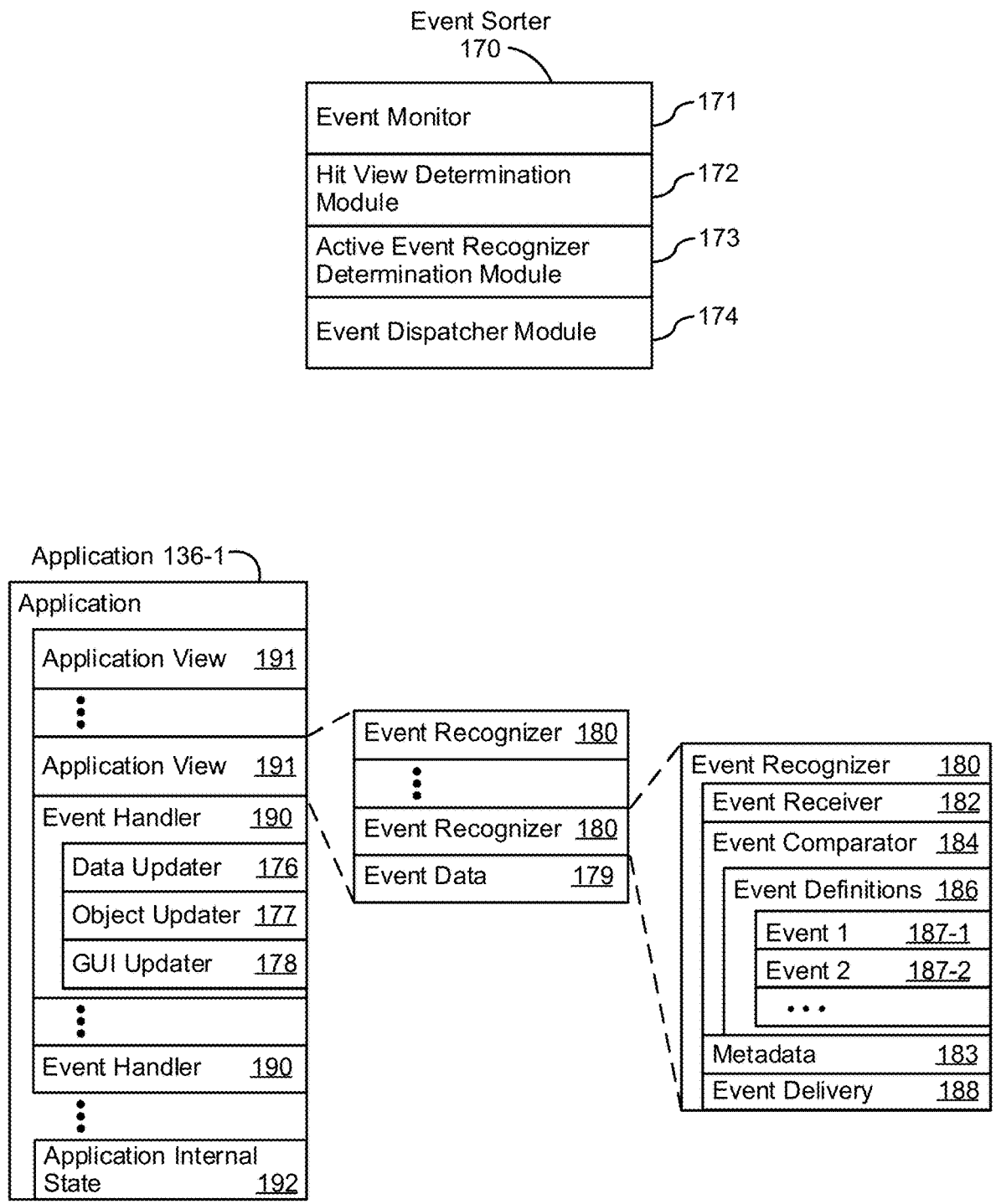
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2) includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device, such as portable multifunction device (PMD) 100 or device 300, with a display, a touch-sensitive surface, and one or more sensors to detect intensity of contacts with the touch-sensitive surface.

FIGS. 5A-5K illustrate example user interfaces for generating a new password for a user account in accordance with some embodiments. FIGS. 5L-5AD illustrate example user interfaces for inserting a verification code into a user interface in accordance with some embodiments. FIG. 6A-6H illustrate example user interfaces for sharing authentication credentials in accordance with some embodiments. FIG. 7A-7Y illustrate example user interface for displaying password information in accordance with some embodiments. The user interfaces in these figures are used to illustrate the processes described below, including the processes in FIGS. 8A-8C, 9A-9D, 10A-10C, and 11A-11C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates a web browser user interface 502 as part of a user interface 500 displayed by a portable multifunctional device 100 (hereinafter "device 100"). The user interface 500 includes, in addition to the web browser user interface 502, a device bar 501 at the top of the display including an identifier of the device 100 (e.g., "iPhone"), a wireless connection indicator, a current time, and a battery indicator indicating a charge level of the device 100.

The user interface 500 includes, below the device bar 501, and spanning the rest of the display, a web browser user interface 502. The web browser user interface 502 includes an address bar 521 and a content region 522. The address bar 521 includes the address (e.g., a URL) of a webpage having content displayed in the content region 522. The address bar 521 also includes a reload affordance that, when selected, reloads the content of the webpage in the content region 522. In FIG. 5A, the address bar 521 displays the address of a homepage of a service.

In FIG. 5A, the content displayed in the content region 522 includes an image (of an apple), a sign-up affordance 531A, and a sign-in affordance 531B. The sign-up affordance 531A, when selected, allows a user to register with the service, e.g., create a user account for the service, in order to access resources (e.g., content) protected by authentication credentials of the user account. The sign-in affordance 531B, when selected, allows a user to provide authentication credentials to access the resources of the service.

FIG. 5A illustrates a contact 550A detected at a location of the sign-up affordance 531A.

Figure 5B:
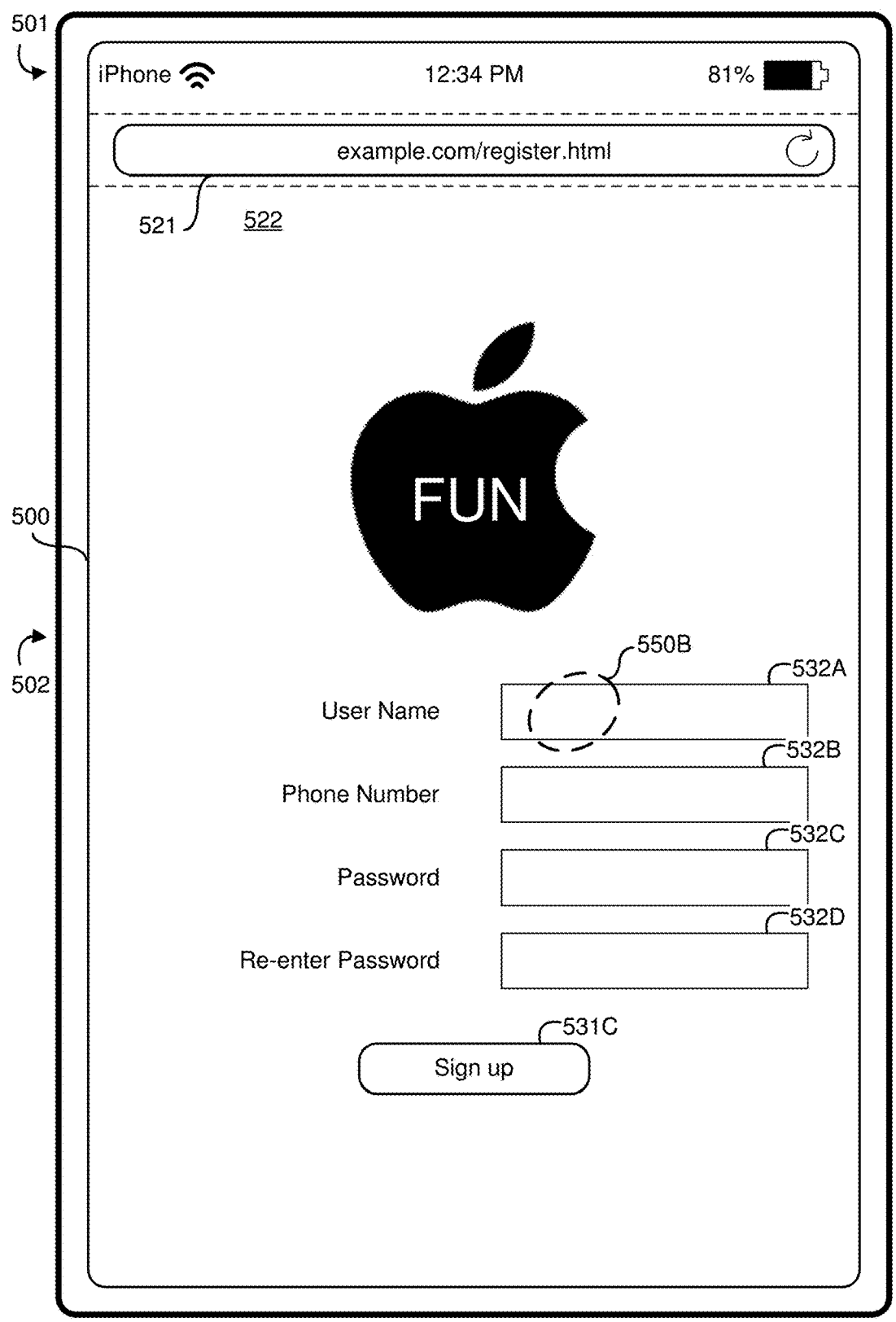

FIG. 5B illustrates the user interface 500 of FIG. 5A in response to detecting the contact 550A at the location of the sign-up affordance 531A. In FIG. 5B, the address bar 521 includes the address of a sign-up page of the web service. In FIG. 5B, the content region 522 includes the image (of an apple), a plurality of fields 532A-532D for receiving text input, text respectively associated with and describing the plurality of fields 532A-532D, and a complete-sign-up affordance 531C that, when selected, creates a user account with the authentication credentials input into the plurality of fields 532A-532D.

The plurality of fields 532A-532D includes a new-username field 532A for receiving text input indicative of a username to be associated with a user account. The plurality of fields 532A-532D includes a phone number field 532B for receiving text input indicative of a phone number (e.g., a phone number of the device 100 and/or the user) to be associated with the user account. The plurality of fields 532A-532D includes a new-password field 532C for receiving text input indicative of a password to be associated with the user account. The plurality of fields 532A-532D includes a password-confirmation field 532D for receiving text input matching the password input into the new-password field 532C.

FIG. 5B illustrates a contact 550B detected at a location of the new-username field 532A.

Figure 5C:
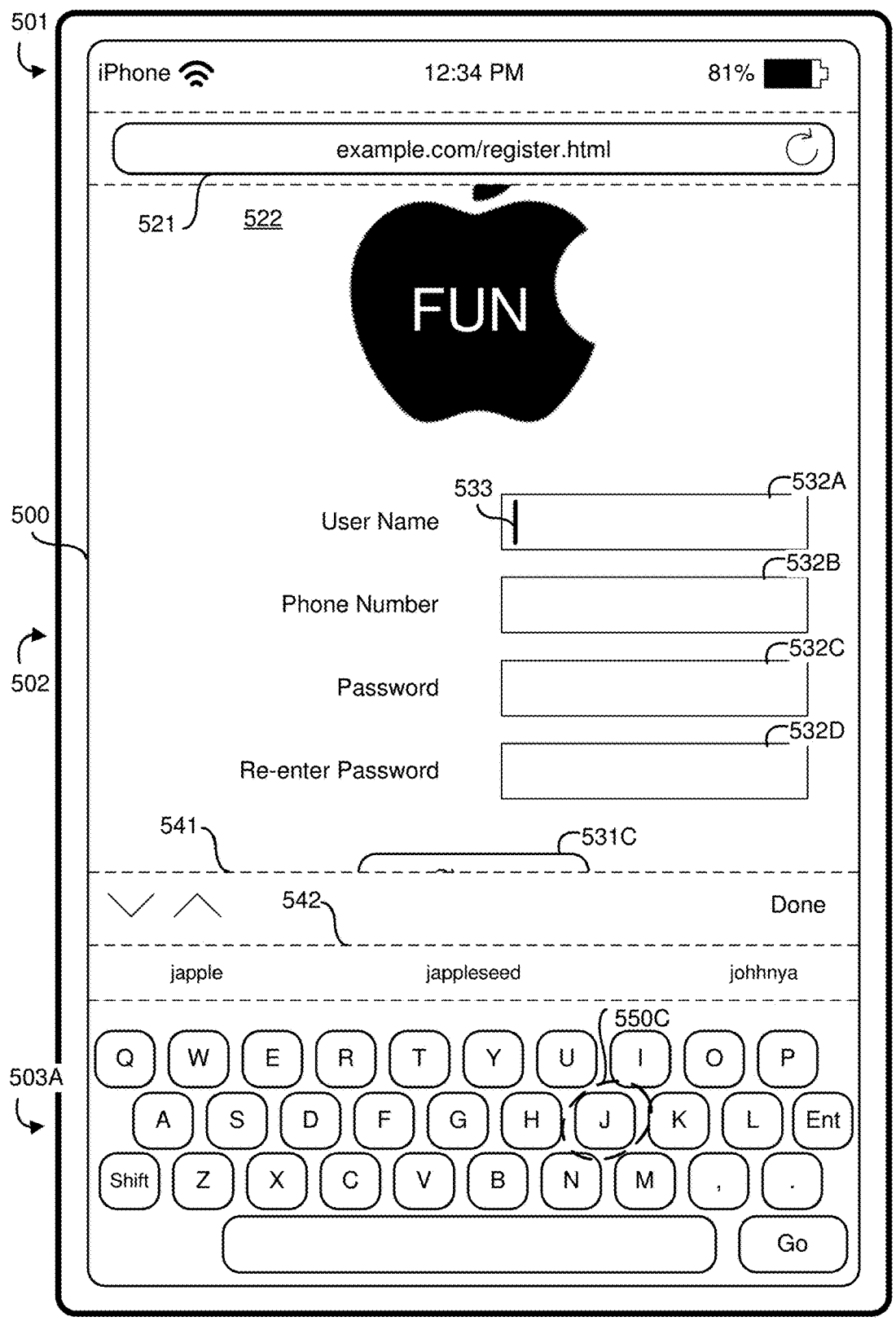

FIG. 5C illustrates the user interface 500 of FIG. 5B in response to detecting the contact 550B at the location of the new-username field 532A. In response to detecting selection of the new-username field 532A, the content region 522 includes a cursor 533 displayed in the new-username field 532A. Further, the user interface 500 includes a soft keyboard 503A with a plurality of character insertion affordances that, when selected, inserts a respective character into the selected field. The soft keyboard 503A includes a navigation region 541. The navigation region 541 includes a previous affordance (indicated with an up arrow) that, when selected, selects and moves the cursor 533 to a previous field; a next affordance (indicated with a down arrow) that, when selected, selects and moves the cursor 533 to a next field; and a done affordance (indicated with text reading "Done") that, when selected, deselects the selected field and ceases display of the cursor 533 and the soft keyboard 503A.

The soft keyboard 503A includes a text suggestion region 542 that includes text suggestion affordances that indicate suggested text and that, when selected, inserts the suggested text into the selected field.

FIG. 5C illustrates a contact 550C at a location of one of the plurality of character insertion affordances of the soft keyboard 503A.

Figure 5D:
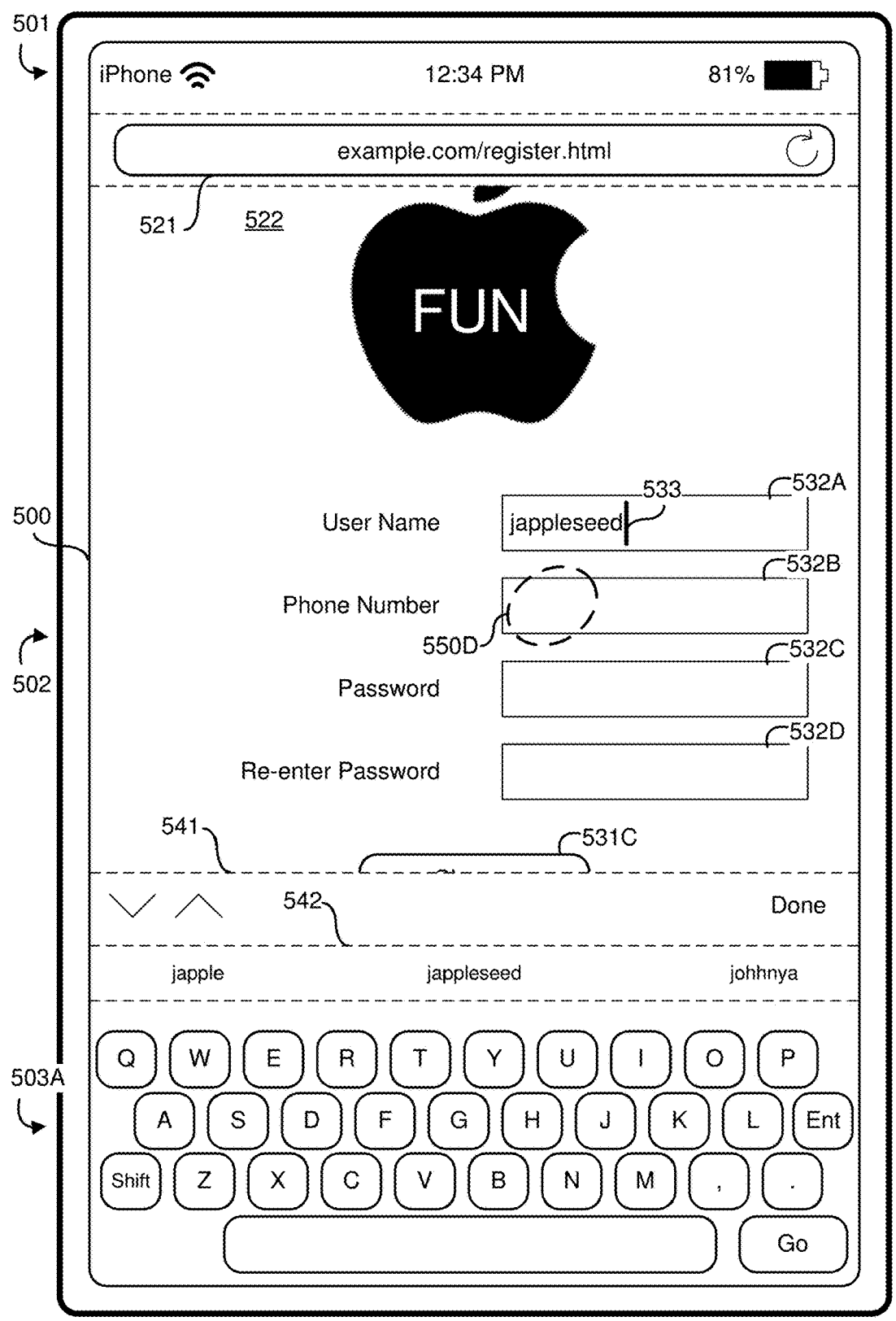

FIG. 5D illustrates the user interface 500 of FIG. 5C in response to detecting the contact 550C at the location of the one of the plurality of character insertion affordances (and additional contacts at others of the character insertion affordances to complete insertion of the username "jappleseed" in the new-username field 532A).

FIG. 5D illustrates a contact 550D detected at the location of the phone number field 532B.

Figure 5E:
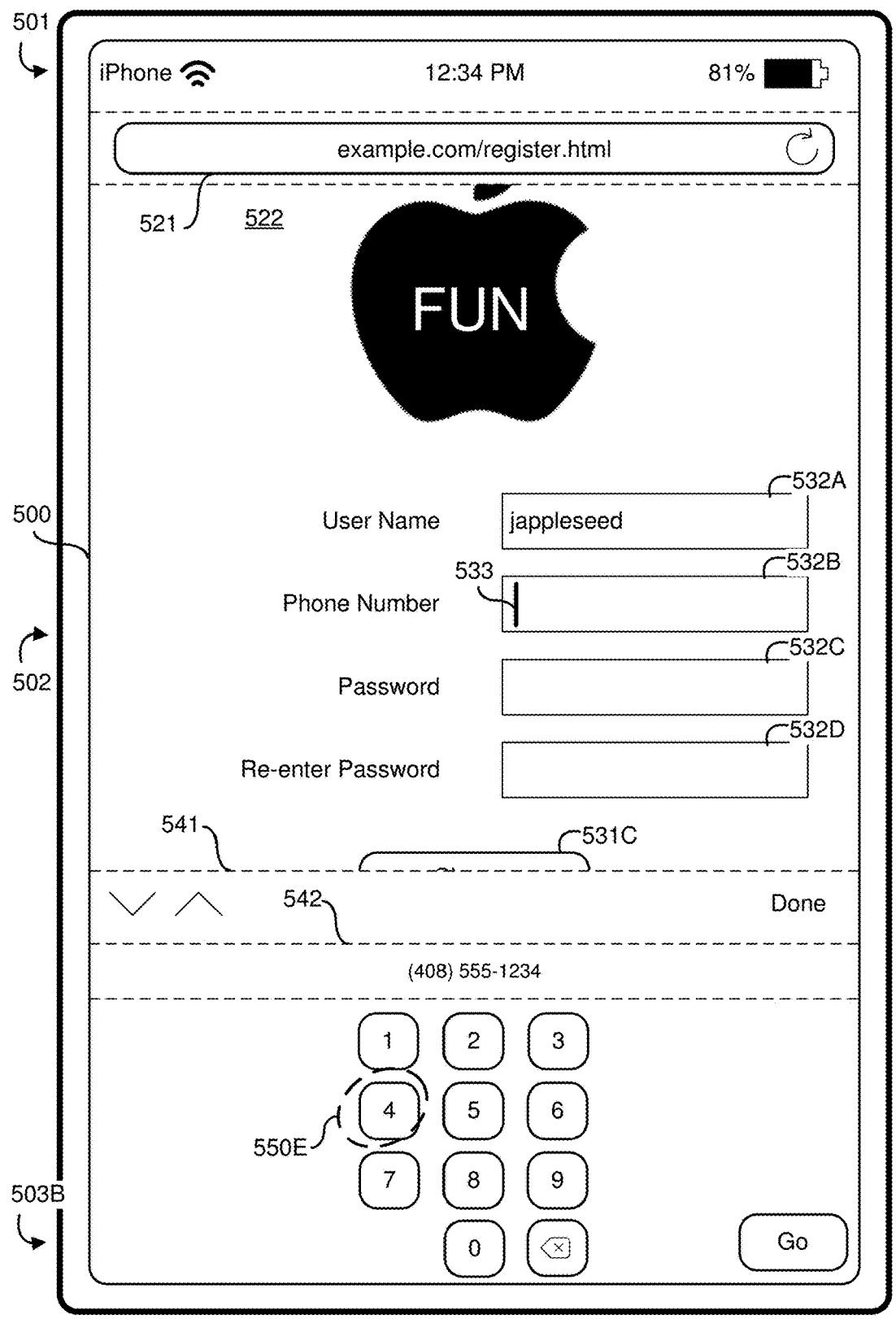

FIG. 5E illustrates the user interface 500 of FIG. 5D in response to detecting the contact 550D at the location of the phone number field 532B. In response to detecting selection of the phone number field 532B, the cursor 533 is displayed in the phone number field 532B. Further, the soft keyboard 503A is replaced by a numeric soft keyboard 503B with a plurality of character insertion affordances that, when selected, inserts a respective numeric character into the selected field. Like the soft keyboard 503A, the numeric soft keyboard 503B includes the navigation region 541 and the text suggestion region 542.

FIG. 5E illustrates a contact 550E detected at the location of one of the plurality of character insertion affordances.

Figure 5F:
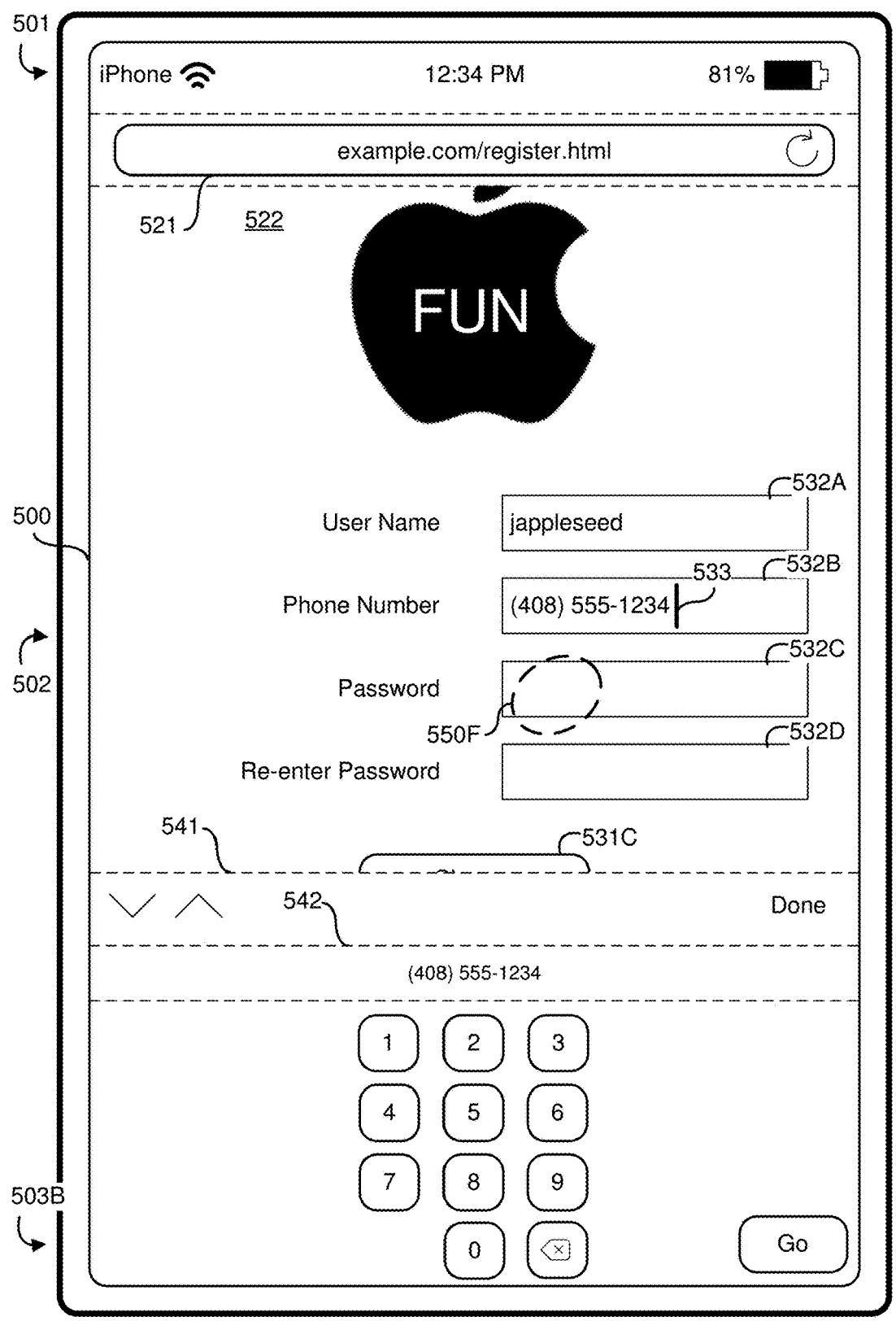

FIG. 5F illustrates the user interface 500 of FIG. 5E in response to detecting the contact 550E at the location of the one of the plurality of character insertion affordances (and additional contacts at others of the character insertion affordances to complete insertion of the phone number "(408) 555-1234" in the phone number field 532B).

FIG. 5F illustrates a contact 550F detected at the location of the new-password field 532C.

FIG. 5G1 illustrates a first embodiment of the user interface 500 of FIG. 5F in response to detecting the contact 550F at the location of the new-password field 532C. In response to detecting selection of the new-password field 532C, the cursor 533 ceases to be displayed. Thus, the cursor 533 is not displayed in the new-password field 532C. Rather, a representation of an automatically-generated password is displayed in the new-password field 532C (and the password-confirmation field 532D). Further, the numeric soft keyboard 503B is replaced by a new-password user interface 503C (also referred to as a "password keyboard" or a "password soft keyboard"). In various implementations, the new-password user interface 503C is displayed at the bottom of the display, e.g., in the same location as the soft keyboard 503A and/or numeric soft keyboard 503B.

In various implementations, the automatically-generated password is generated by the device 100 based on one or more password constraints of the user interface, e.g., include at least a threshold number of characters, at least one capital letter, at least one number, and/or at least one special character. In various implementations, the device 100 determines the one or more password constraints based on text in the content region 522 of the user interface 500 and/or other information provided by the service.

The new-password user interface 503C includes text 544 including a description of the new automatically-generated password and instructions for retrieval of the new automatically-generated password. For example, the text 544 indicates that the new automatically-generated password has been automatically generated and satisfies a password strength requirement. The text 544 indicates that the new automatically-generated password will be saved by the device 100 and can be accessed by the user, e.g., via a verbal request as described in further detail below.

The new-password user interface 503C includes an accept affordance 543A to accept the new automatically-generated password and a decline affordance 543B to decline to use the new automatically-generated password. A secondary decline affordance 543BB to decline to use the new automatically-generated password is displayed separate from the new-password user interface 503C, in particular, next to the representation of the new automatically-generated password in the new-password field 532C.

In response to selection of a particular field, the device 100 determines whether to display the soft keyboard 503A (as in FIG. 5C), the numeric soft keyboard 503B (as in FIG. 5E), or the new-password user interface 503C based on a type of the particular field. In various implementations, the device 100 determines the type of the field using a field detection and classification algorithm. In various implementations, the device 100 classifies a field based on one or more of (1) text associated with the content in the content region 522 of the user interface 500 or (2) a number of fields in the content region 522 of the user interface 500. For example, in response to detecting a field located next to text including the word "password" and in response to detecting "register" or "sign up" in the text in content region 522, the device classifies the field as a new-password field (and displays the new-password user interface 503C). In contrast, in response to detecting a field located to text including the word "password" and in response to detecting "log in" or "sign in" in the text in the content region 522, the device classifies the field as a password field (and displays a soft keyboard 503A for receiving user input of the password or automatically inserting a known password into the password field). As another example, in response to detecting two fields in the content region 522, one of which is located next to text including the word "password," the device 100 classifies the field as a password field for signing in to a user account. In contrast, in response to detecting more than two fields in the content region 522, one of which is located next to text including the word "password," the device classifies the field as a new-password field for creating a user account. Similarly, in response to detecting at least two fields in the content region 522, two of which are located next to text including the word "password," the device 100 classifies the first field as a new-password field and the second field as a password-confirmation field.

In FIG. 5G1, the representation of the new automatically-generated password displayed in the new-password field 532C is the new automatically-generated password itself. FIG. 5G2 illustrates a second embodiment of the user interface 500 of FIG. 5F in response to detecting the contact 550F at the location of the new-password field 532C which differs from FIG. 5G1 in that the representation of the new automatically-generated password displayed in the new-password field 532C (and the password-confirmation field 532D) is a generic password indicator, e.g., a series of asterisks or bullets. FIG. 5G3 illustrates a third embodiment of the user interface 500 of FIG. 5F in response to detecting the contact 550F at the location of the new-password field 532C which differs from FIG. 5G1 in that the representation of the new automatically-generated password displayed in the new-password field 532C (and the password-confirmation field 532D) is a portion of the new automatically-generated password and an indication that a portion of the new automatically-generated password is not displayed, e.g., the visibility of the new automatically-generated password decreases along its length by fading. In some embodiments, the new automatically-generated password is displayed with an ellipse (e.g., "Y2v'GS . . . ").

FIG. 5G3 illustrates a contact 550G detected at the location of the decline affordance 543B.

Figure 5H:
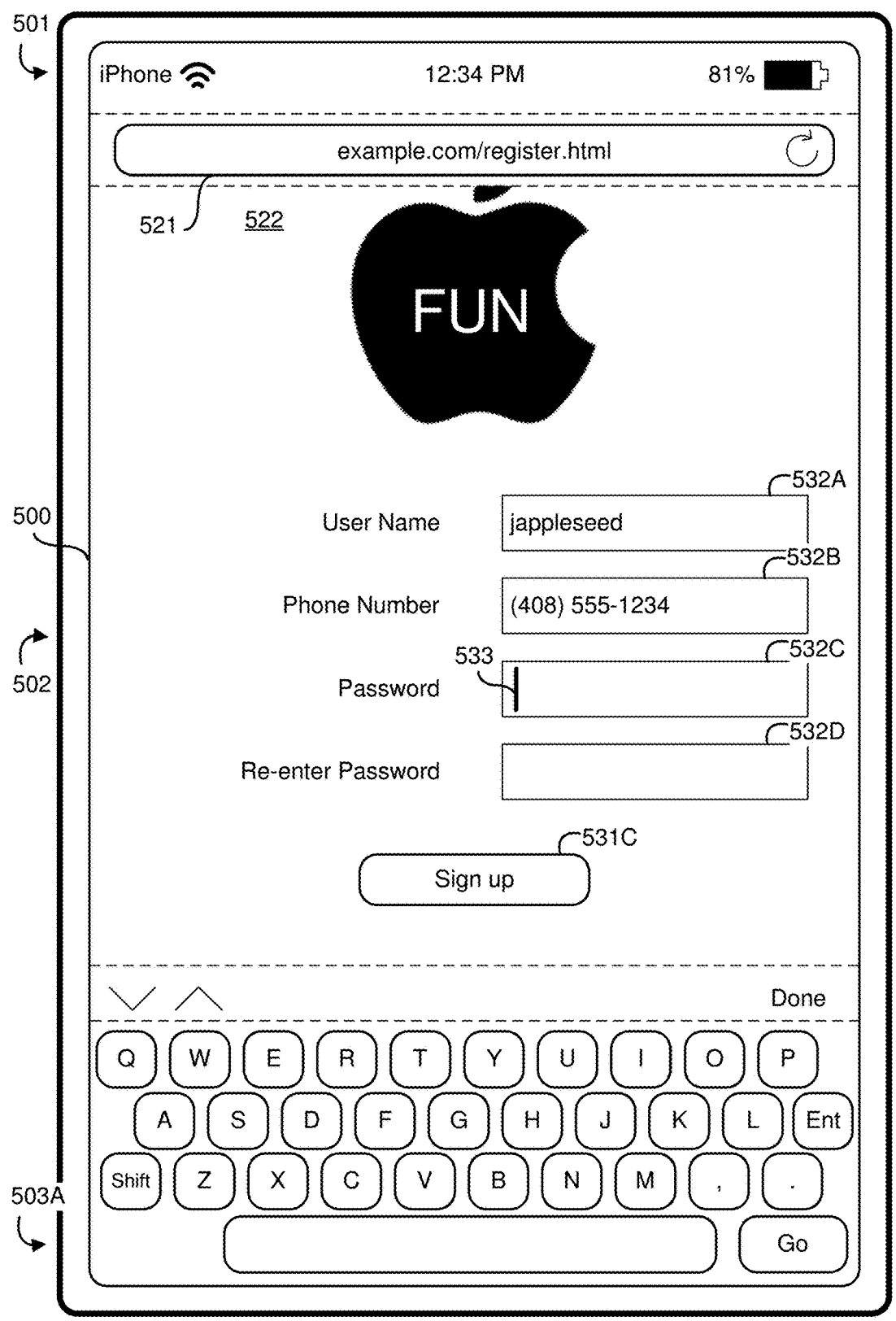

FIG. 5H illustrates the user interface 500 of FIG. 5G3 in response to detecting the contact 550G at the location of the decline affordance 543B (or, in various implementations, a contact at the location of the secondary decline affordance 543BB). In response to detecting selection of the decline affordance 543B, the new-password user interface 503C (including the accept affordance 543A and decline affordance 543B) is replaced with a soft keyboard 503A including a plurality of character insertion affordances. Further, the cursor 533 is displayed in the new-password field 532C.

In various implementations (as in FIG. 5H), in response to detecting selection of the decline affordance 543B, the representation of the new automatically-generated password ceases to be displayed. Accordingly, by using the soft keyboard 503A, a user can input a password created and/or chosen by the user. In various implementations, the representation of the new automatically-generated password remains displayed. Accordingly, by using the soft keyboard 503A, a user can edit the new automatically-generated password to the user's preferences or to comply with requirements for the new password, e.g., a requirement that certain characters (e.g., a question mark or an asterisk) not be used.

Figure 5I:
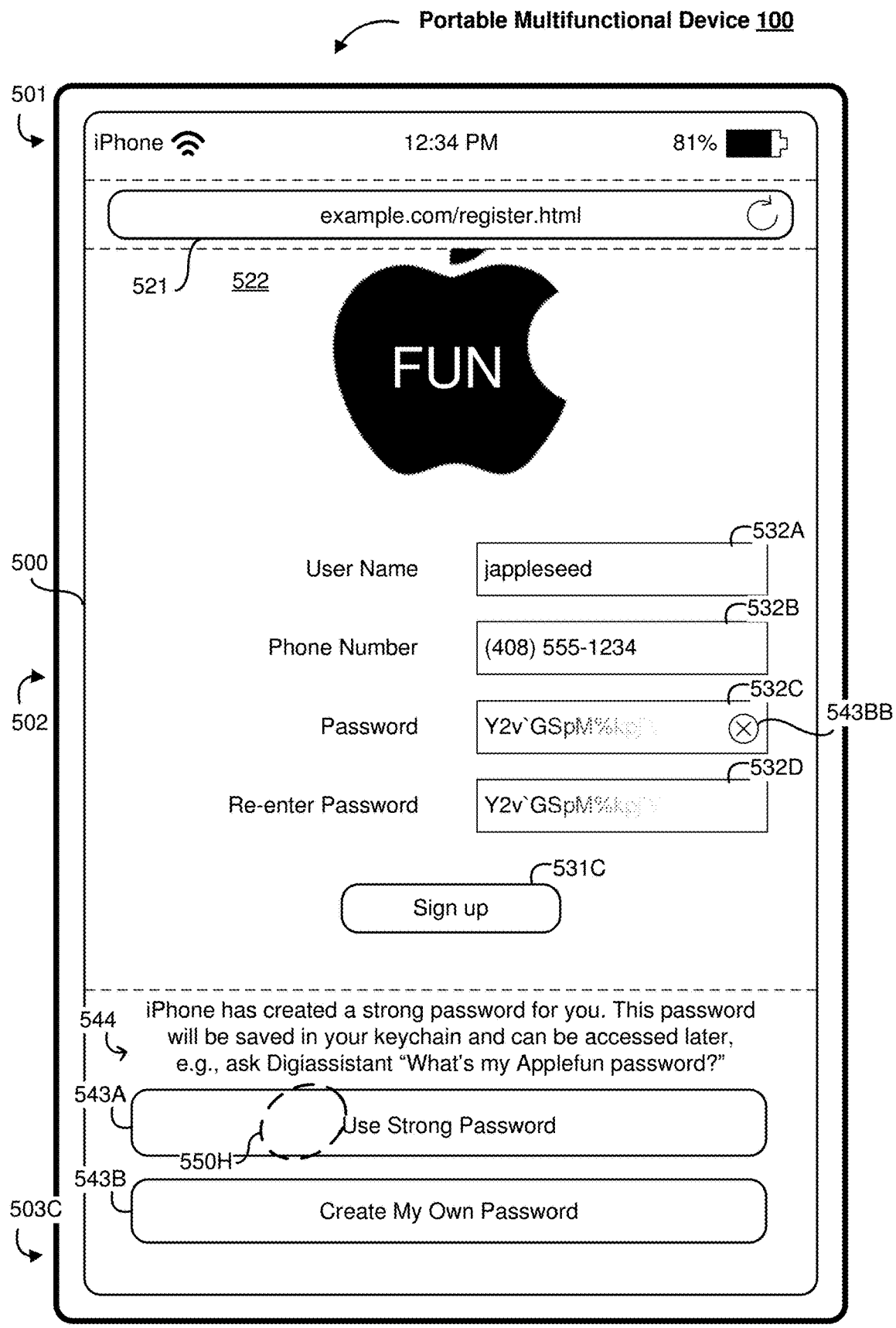

FIG. 5I illustrates the user interface 500 of FIG. 5G3 with a contact 550H detected at the location of the accept affordance 543A (rather than the contact 550G detected at the location of the decline affordance 543B).

Figure 5J:
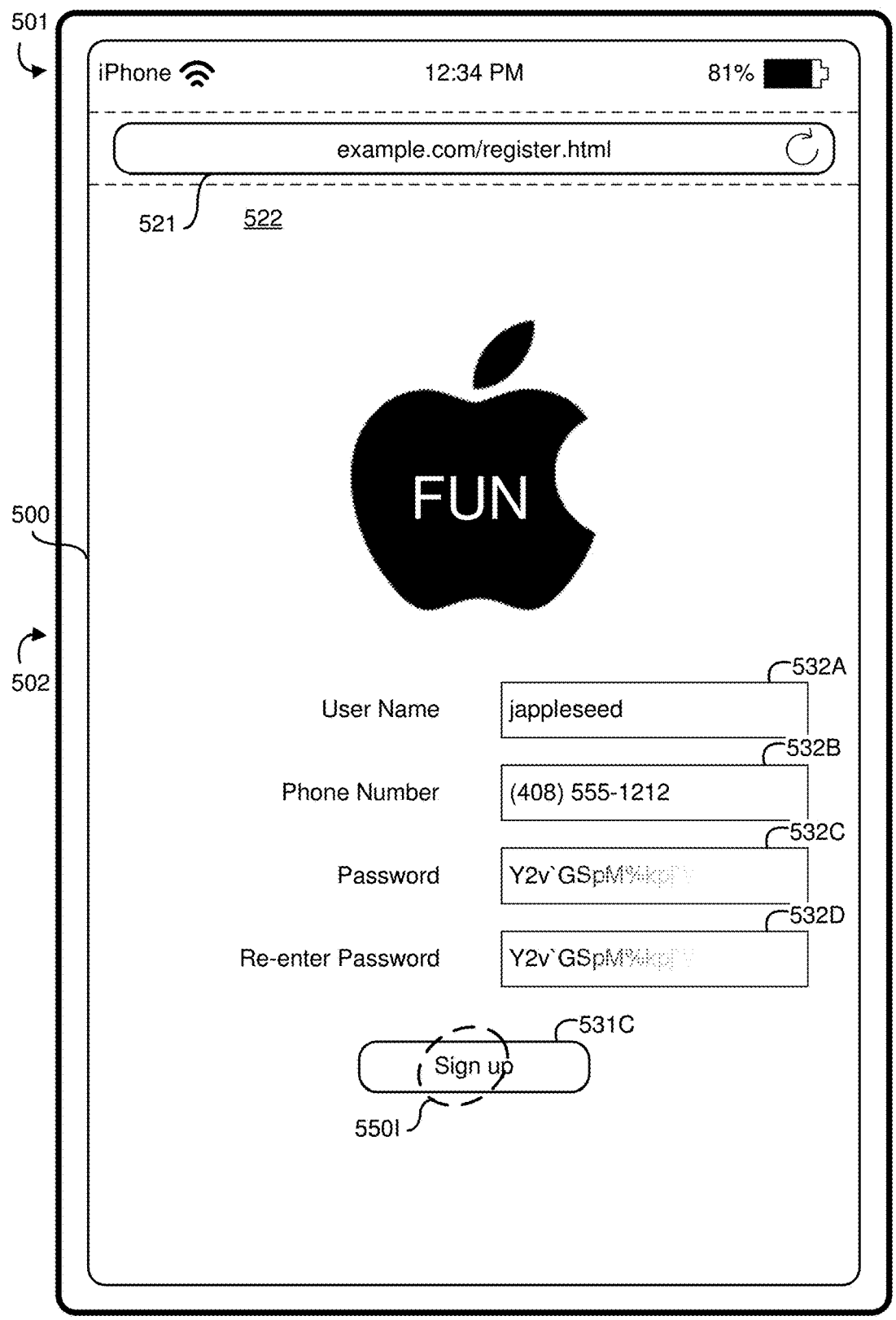

FIG. 5J illustrates the user interface 500 of FIG. 5I in response to detecting the contact 550H at the location of the accept affordance 543A. In response to detecting selection of the accept affordance 543A, the new-password user interface 503C (including the accept affordance 543A and the decline affordance 543B) ceases to be displayed.

FIG. 5J illustrates a contact 550I detected at the location of the complete-sign-up affordance 531C.

Figure 5K:
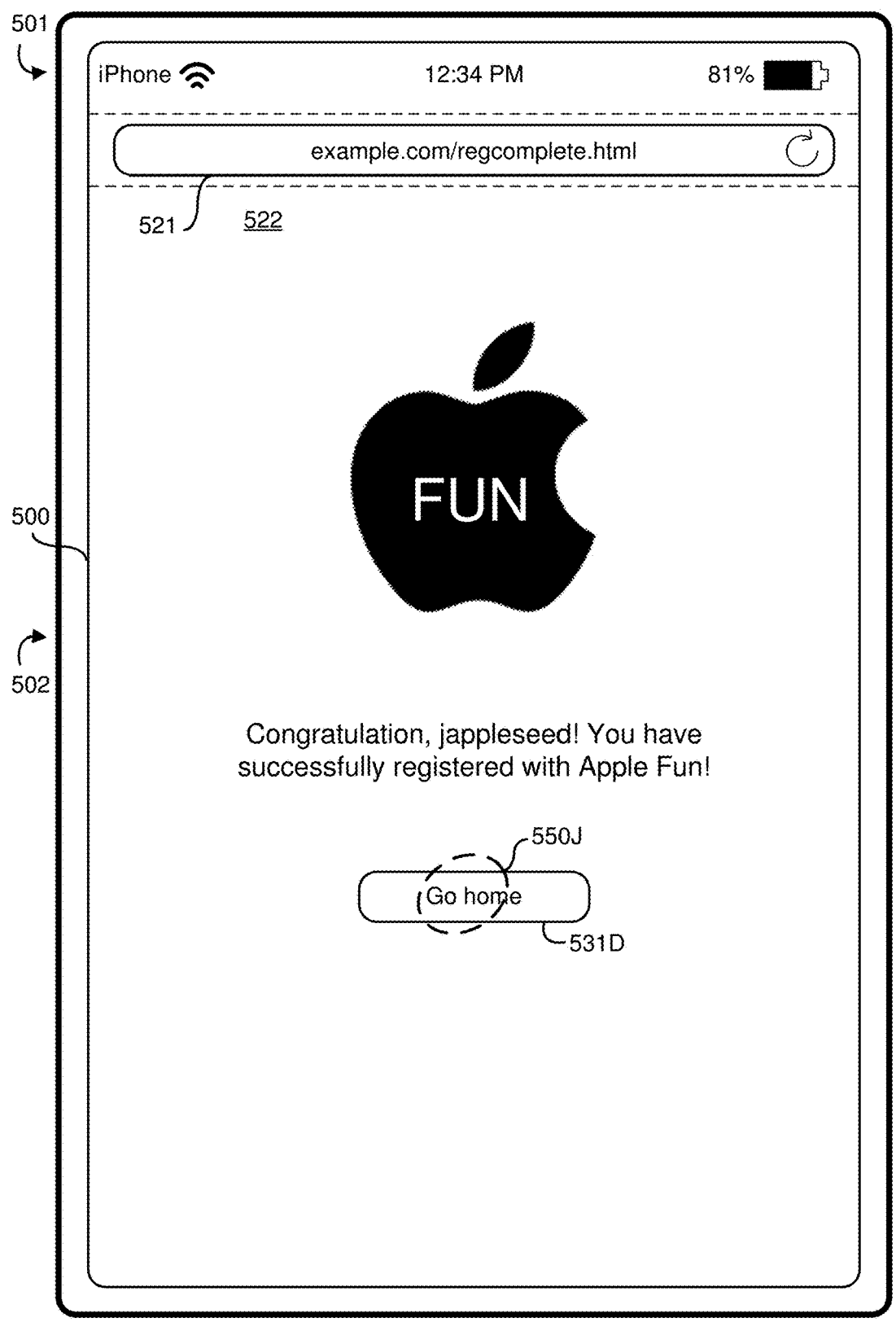
Figure 5L:
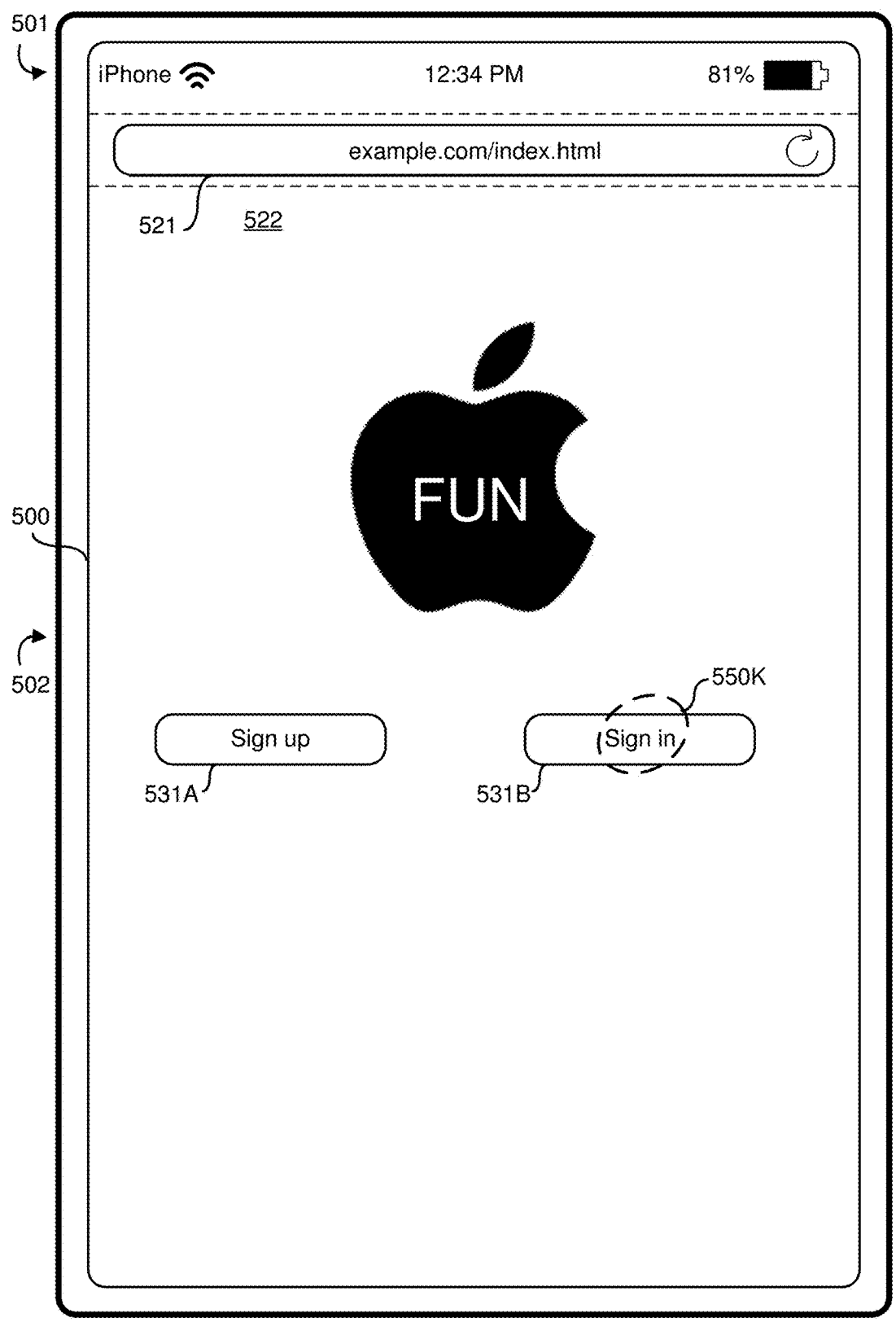

FIG. 5K illustrates the user interface 500 of FIG. 5J in response to detecting the contact 550I at the location of the complete-sign-up affordance 531C. In FIG. 5K, the address bar 521 includes the address of a completed-sign-up page of the service. In FIG. 5K, the content region 522 includes the image (of an apple), text indicating that a registration process is complete, and home affordance 531D that, when selected, returns the web browser user interface 502 to the homepage of the web service.

FIG. 5K illustrates a contact 550J detected at the location of the home affordance 531D.

FIG. 5L illustrates the user interface 500 of FIG. 5K in response to detecting the contact 550J at the location of the home affordance 531D. In FIG. 5K, the address bar 521 includes the address of the homepage and the content displayed in the content region 222 includes the image (of an apple), the sign-up affordance 531A, and the sign-in affordance 531B.

FIG. 5L illustrates a contact 550K detected at the location of the sign-in affordance 531B.

Figure 5M:
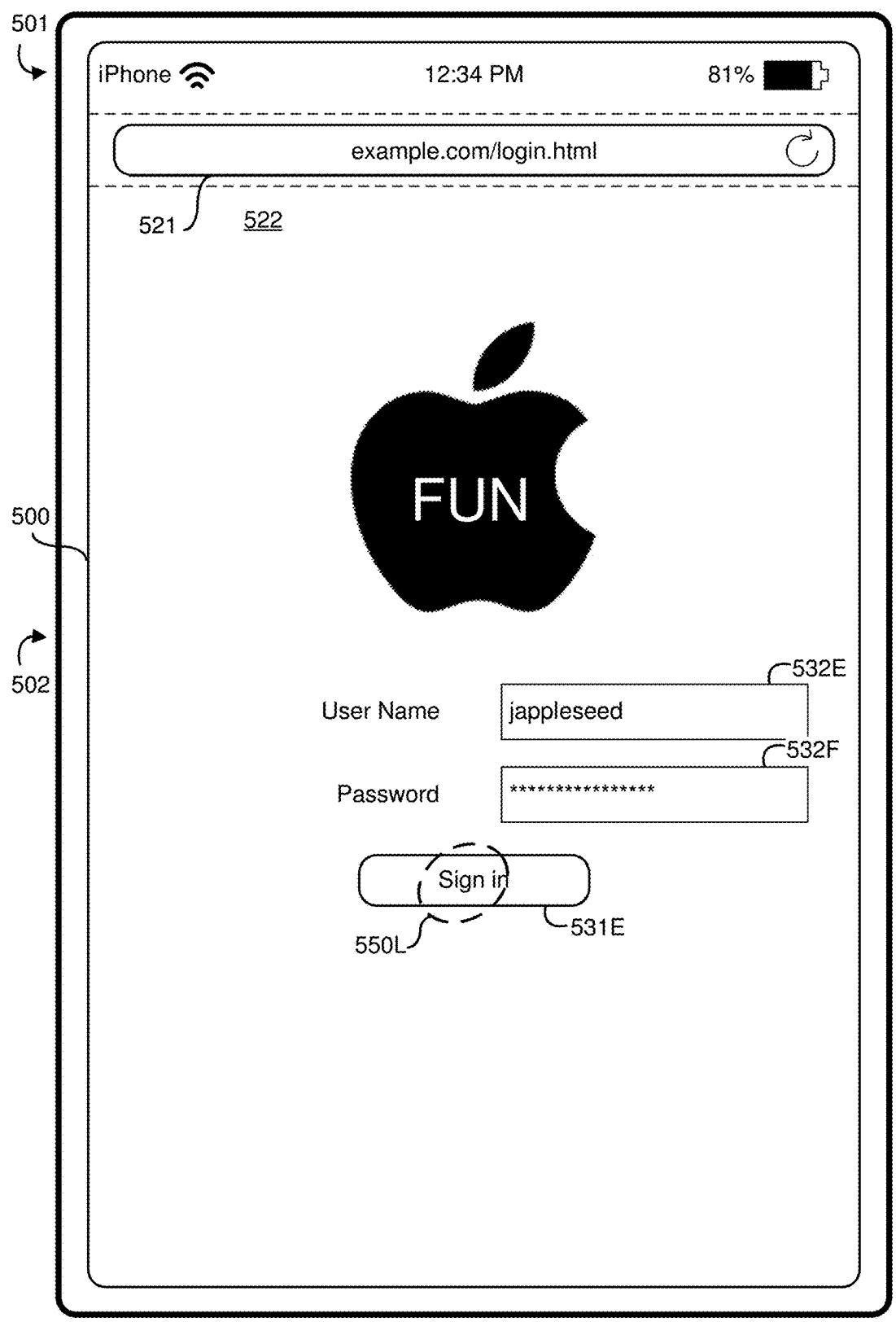

FIG. 5M illustrates the user interface 500 of FIG. 5L in response to detecting the contact 550K at the location of the sign-in affordance 531B. In FIG. 5M, the address bar 521 includes the address of a sign-in page of the service. In FIG. 5M, the content region 522 includes the image (of an apple), a plurality of fields 532E-532F for receiving text input, text respectively associated with and describing the plurality of fields 532E-532F, and a continue-sign-in affordance 531E that, when selected, requests access to the resources of the service based on authentication credentials input into the plurality of fields 532E-532F.

The plurality of fields 532E-532F includes a username field 532E for receiving text input indicative of a username associated with an existing user account. The plurality of fields 532E-532F includes a password field 532F for receiving text input indicative of a password associated with the user account. In FIG. 5M, the username field 532E and password field 532F have been automatically populated based on the detection and classification of the fields 532E-532F and authentication credentials stored by the device 100.

FIG. 5M illustrates a contact 550L at a location of the continue-sign-in affordance 531E.

Figure 5N:
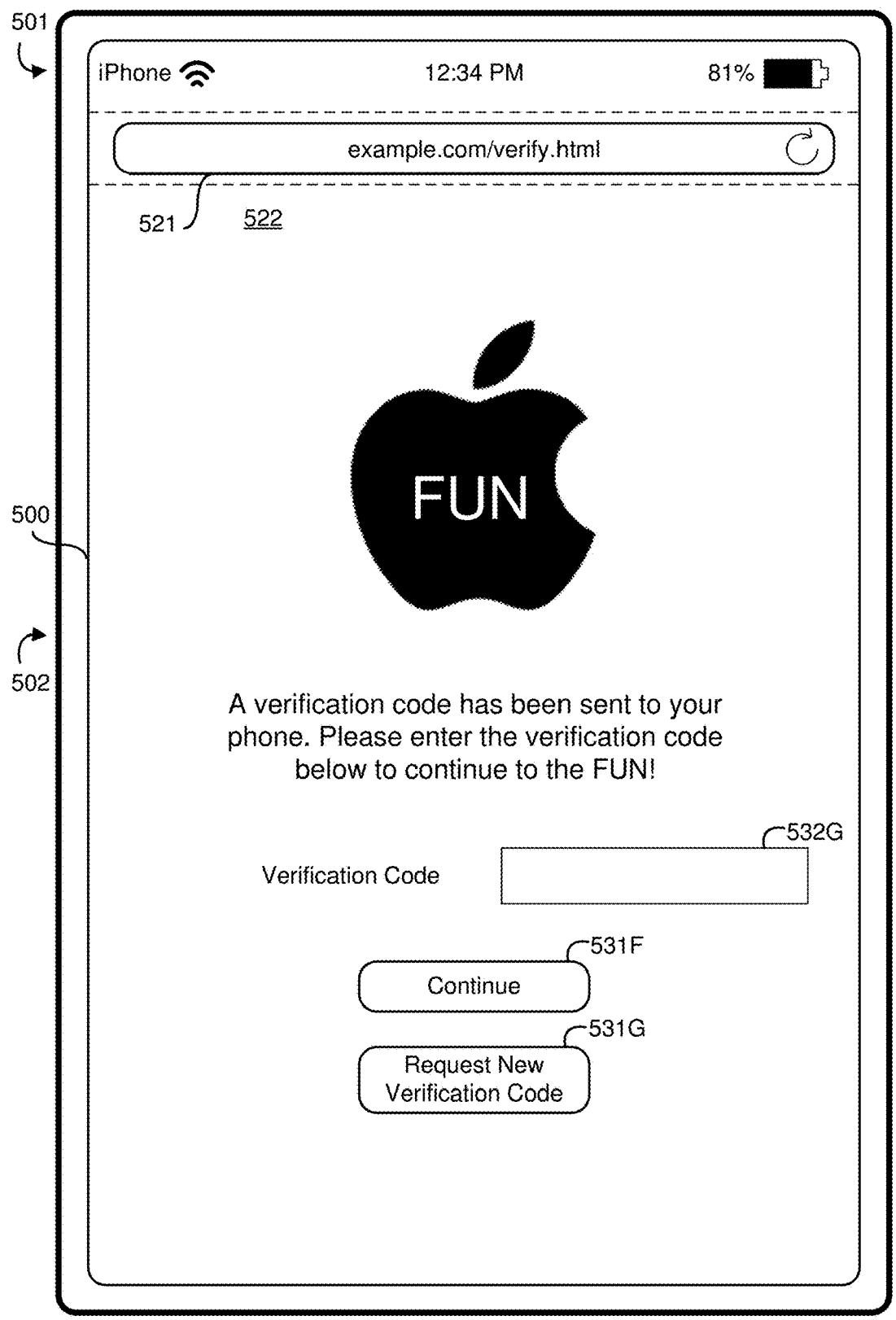

FIG. 5N illustrates the user interface 500 of FIG. 5M in response to detecting the contact 550L at the location of the continue-sign-in affordance 531E. In FIG. 5N, the address bar 521 includes the address of a verification page of the service. In FIG. 5N, the content region 522 includes the image (of an apple), a verification code field 532G for receiving text input, text respectively associated with and describing the verification code field 532G, and another continue-sign-in affordance 531F that, when selected, requests access to the resources of the service based on authentication credentials, in particular, a verification code, input into the verification code field 532G. The content region 522 also includes a request-code affordance 531G that, when selected, requests that an electronic message including a verification code be sent to the user, e.g., as a text message sent to the phone number provided in FIG. 5E.

Figure 5O:
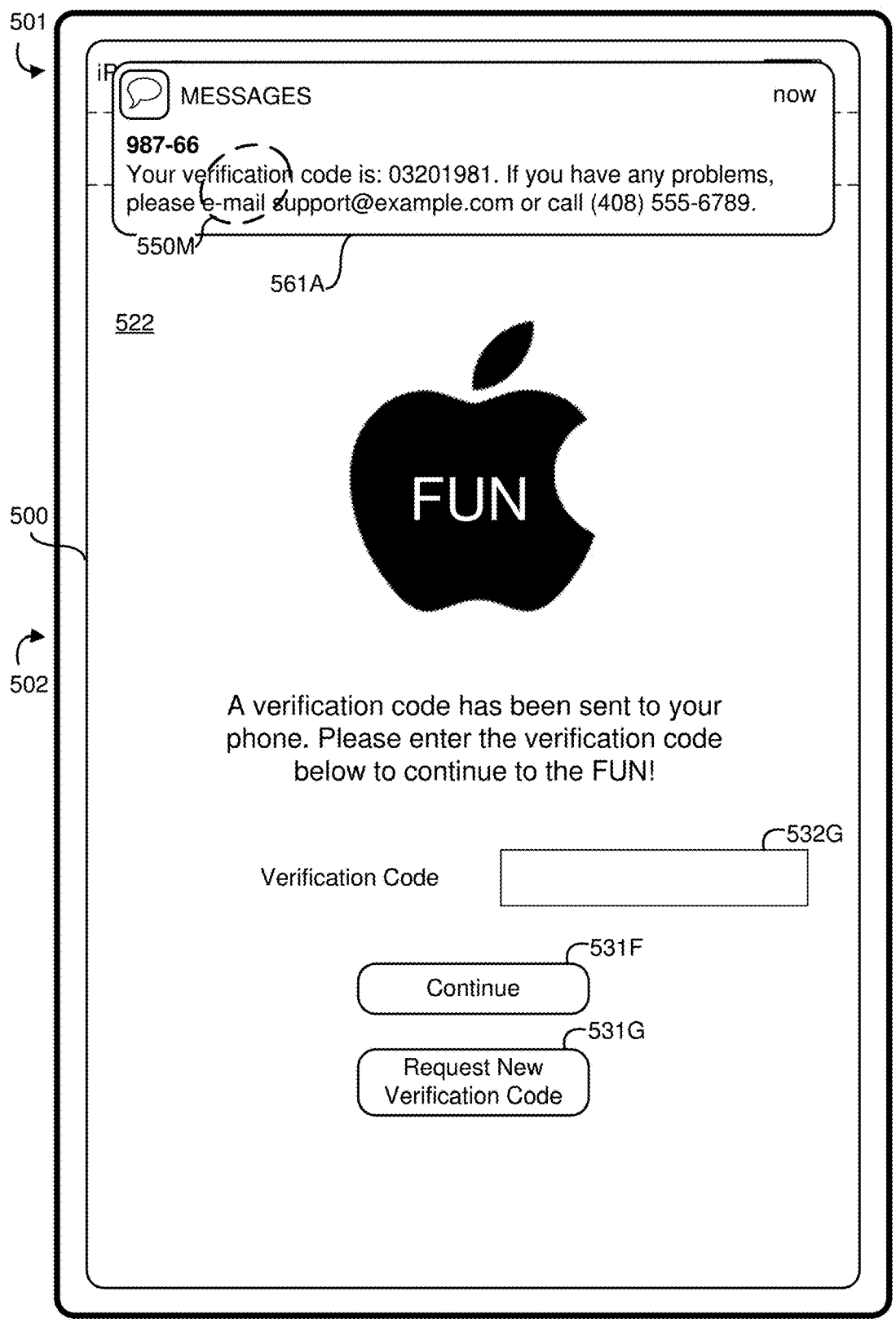

FIG. 5O illustrates the user interface 500 of FIG. 5N after an electronic message is received by the device 100. In response to receiving the electronic message, a message notification 561A is displayed. The message notification 561A includes text indicating a source of the electronic message (e.g., phone number "987-66") and preview text previewing the content of the electronic message.

FIG. 5O illustrates a contact 550M detected at a location of the message notification 561A.

Figure 5P:
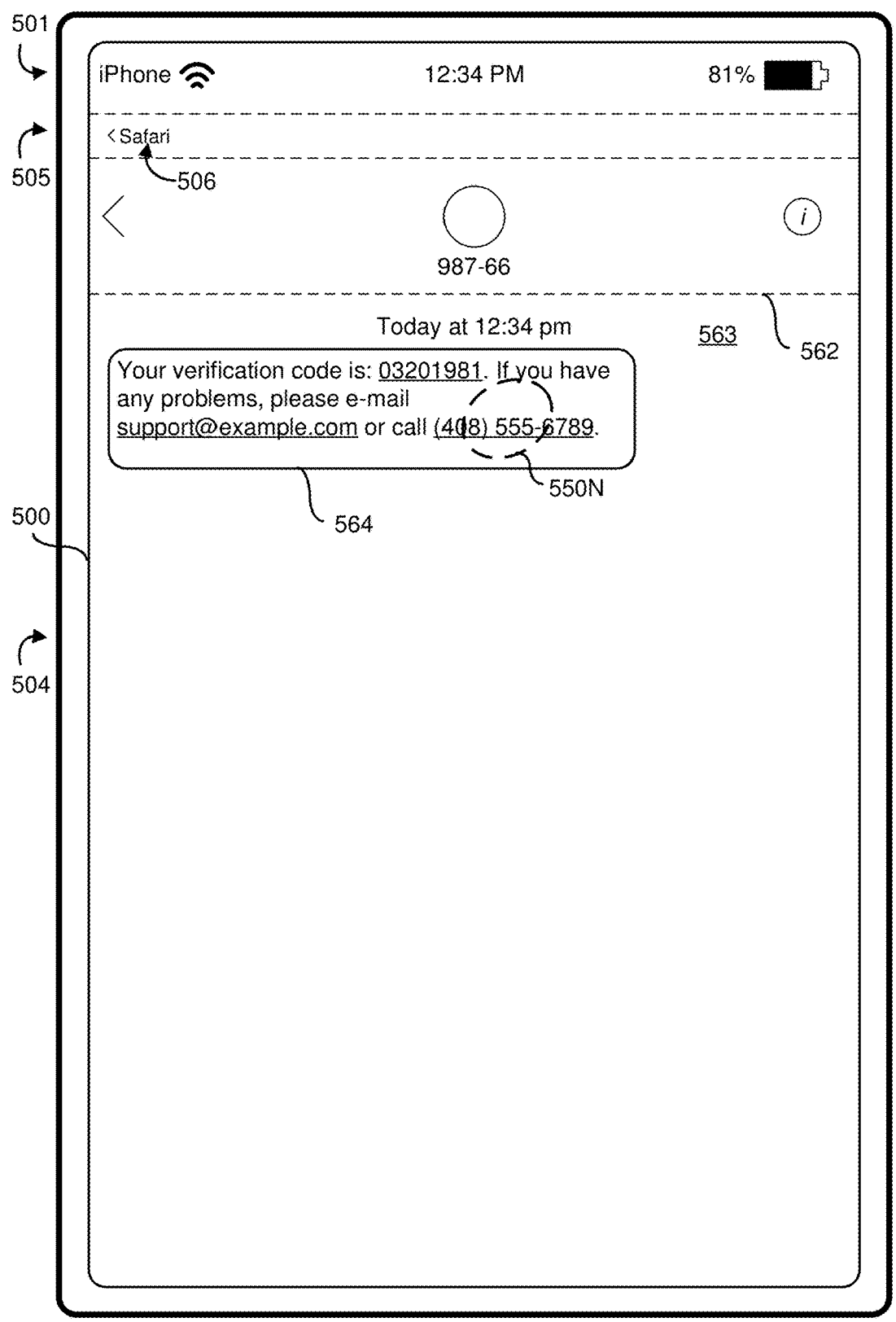

FIG. 5P illustrates the user interface 500 of FIG. 5O in response to detecting the contact 550M at the location of the message notification 561A. The user interface 500 includes, below the device bar 501, a navigation bar 505 including a return affordance 506 that, when selected, returns to the web browser user interface 502. The user interface 500 includes, below the navigation bar 505 and spanning the rest of the display, a text messenger user interface 504. The text messenger user interface 504 includes a contact bar 562 and a content region 563. The contact bar 562 includes text indicating a source of the content displayed in the content region 563. The contact bar 562 also includes a back affordance (indicated with a "<") that, when selected, displays a list of contact affordances for accessing content (e.g., SMS text messages) provided by respective contacts. The contact bar 562 also includes an information affordance (a circled "i") that, when selected provides information regarding the source of the content displayed in the content region 563.

The content region 563 includes a message window 564 including the content of the electronic message received from the source. In the message window 564, content of the text message that meet respective criteria is displayed in a different manner than the remainder of the content (e.g., is emphasized). In particular, in FIG. 5P, content of the text message that meet respective criteria is displayed as underlined, whereas the remainder of the content is not underlined. In various implementations, the content of the text message that meet respective criteria is displayed in a different color (e.g., blue) than the remainder of the content (e.g., black). In various implementations, the respective criteria include an e-mail format requirement that the content matches an e-mail format (e.g., includes characters preceding an at sign ("@") and characters following the at sign.) In various implementations, the respective criteria includes a phone number format requirement that the content matches a phone number format (e.g., includes at least a threshold number of numeric characters). In various implementations, the respective criteria include a verification code format requirement that the content matches a verification code format (e.g., a numeric or an alphanumeric value, such as 123456 or ab3d5f, in close proximity to a keyword or short group of words denoting the presence of a security code, such as "passcode", "authentication code", "2FA", "is your <service name> code" or "to confirm your account").

FIG. 5P illustrates a contact 550N detected at the location of content displayed in the message window 564 meeting a phone number format requirement.

Figure 5Q:
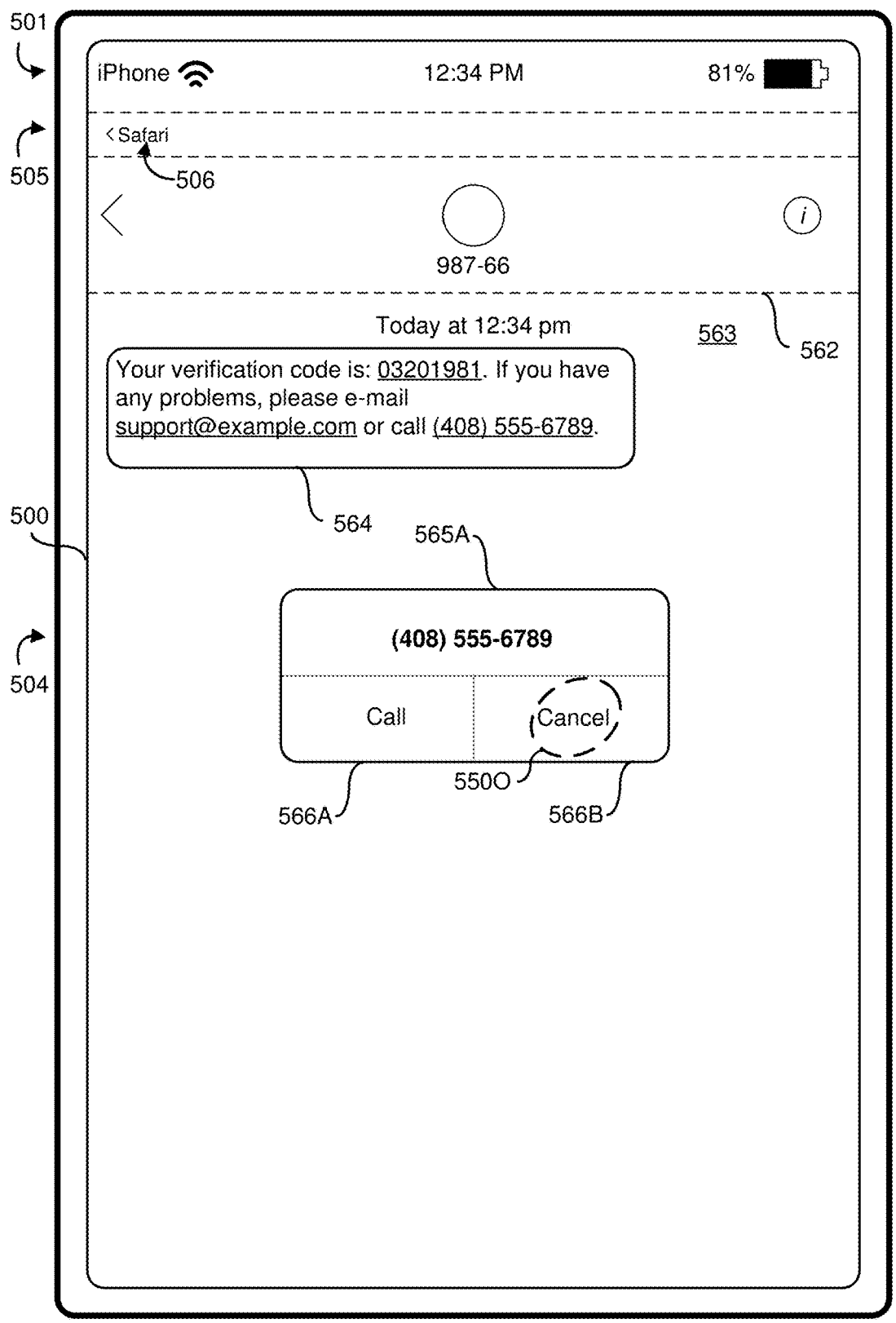

FIG. 5Q illustrates the user interface 500 of FIG. 5P in response to detecting the contact 550N at the location of content displayed in the message window 564 meeting a phone number format requirement. In FIG. 5Q, the user interface 500 includes a phone call window 565A including text indicating a phone number, a call affordance 566A that, when selected, causes the device 100 to place a telephone call to the phone number, and a cancel affordance 566B that, when selected, dismisses the phone call window 565A.

FIG. 5Q illustrates a contact 550O detected at the location the cancel affordance 566B.

Figure 5R:
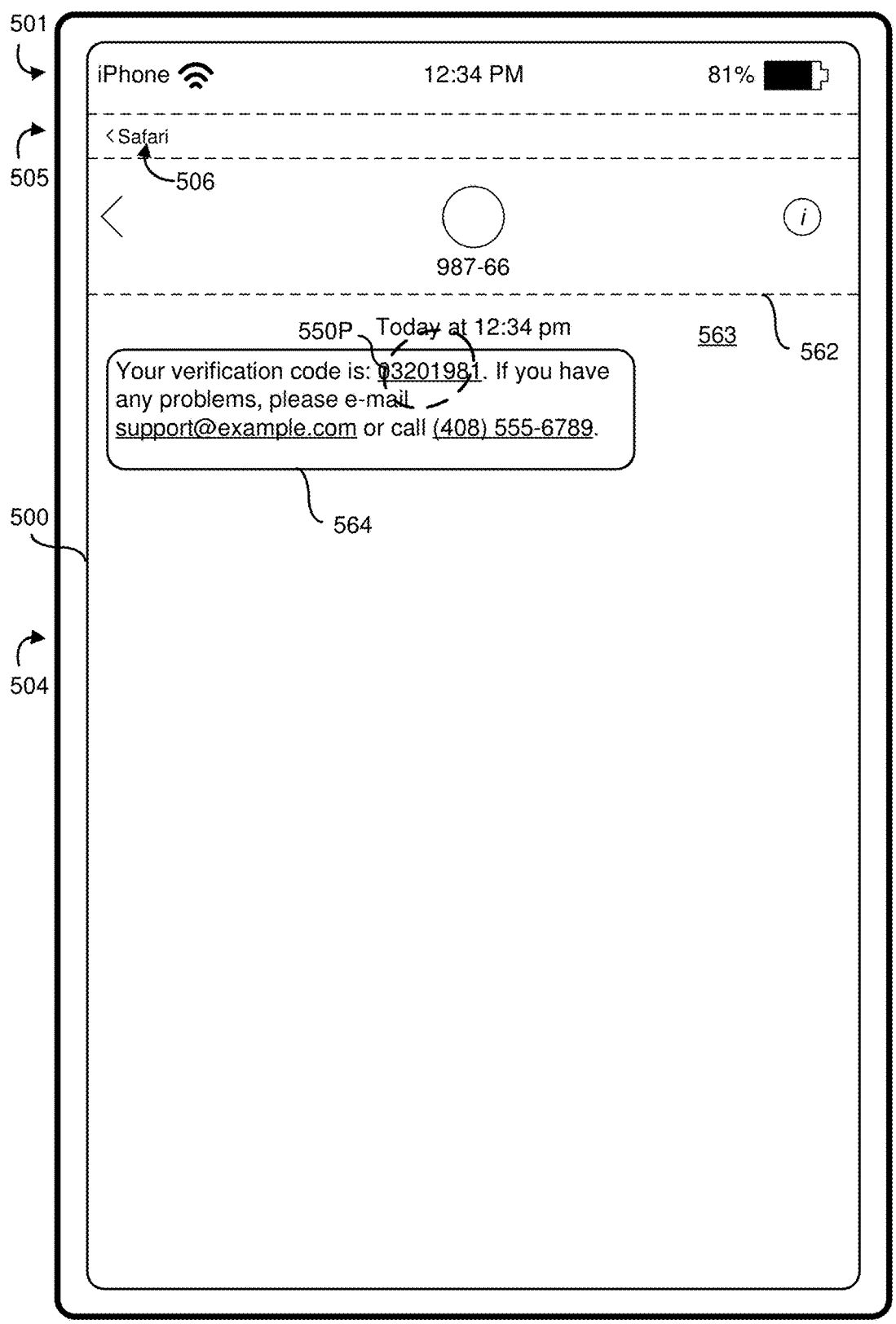

FIG. 5R illustrates the user interface 500 of FIG. 5Q in response to detecting the contact 550O at the location of the cancel affordance 566B. In FIG. 5R, the phone call window 565A ceases to be displayed.

FIG. 5R illustrates a contact 550P at the location of content displayed in the message window 564 meeting a verification code format requirement.

Figure 5S:
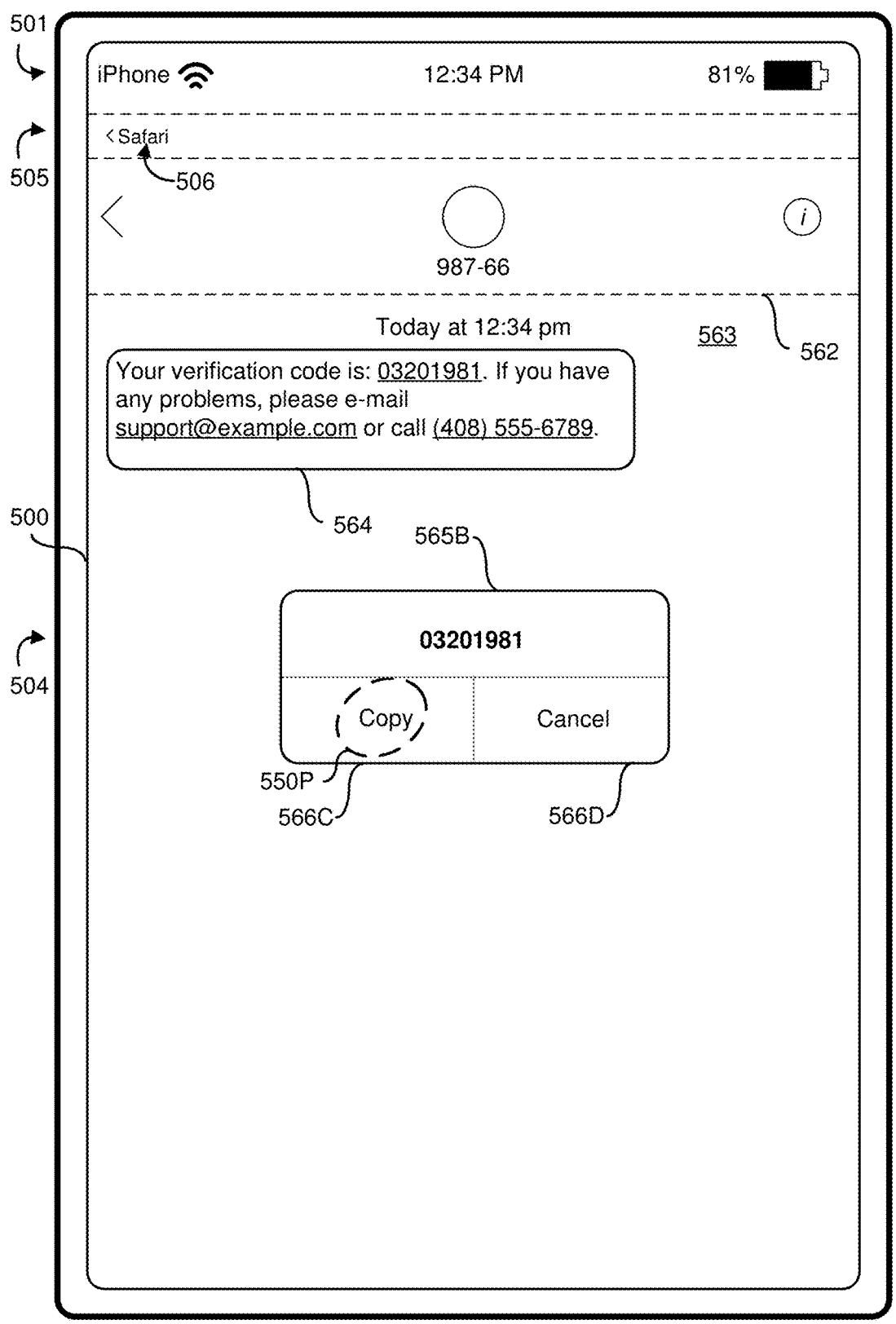

FIG. 5S illustrates the user interface 500 of FIG. 5R in response to detecting the contact 550P at the location of content displayed in the message window 564 meeting the verification code format requirement. In FIG. 5S, the user interface 500 includes a verification code window 565B including text indicating a verification code, a copy affordance 566C that, when selected, causes the device 100 to store the verification code in a cache (e.g., to copy the verification code to a clipboard), and a cancel affordance 566D that, when selected, dismisses the verification code window 565B.

FIG. 5S illustrates a contact 550P detected at the location of the copy affordance 566C.

Figure 5T:
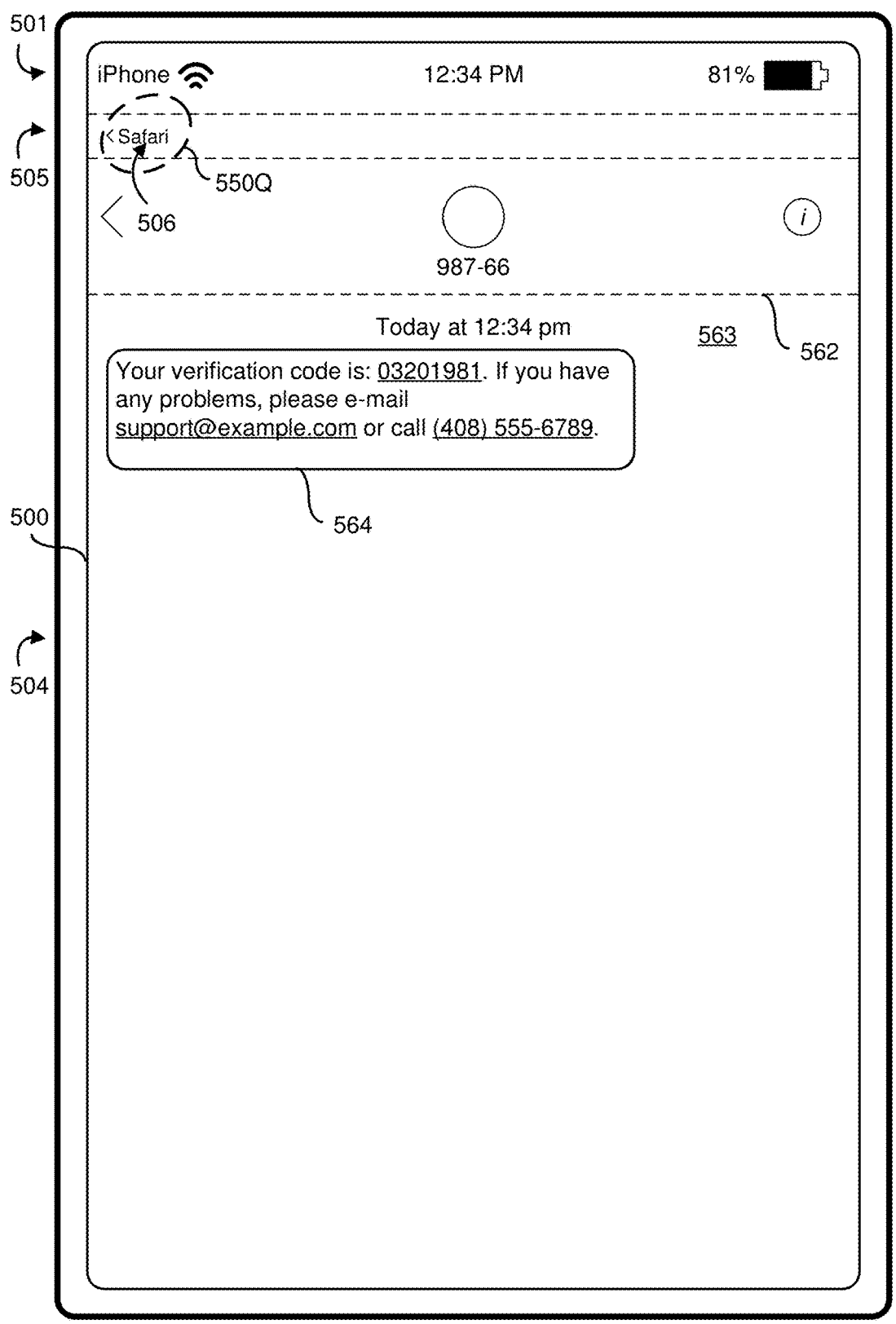

FIG. 5T illustrates the user interface 500 in response to detecting the contact 550P at the location of the copy affordance 566C. In FIG. 5T, the verification code window 565B ceases to be displayed.

FIG. 5T illustrates a contact 550Q detected at the location of the return affordance 506.

FIG. 5U1 illustrates the user interface 500 in response to detecting the contact 550Q at the location of the return affordance 506. In FIG. 5U1, the text messenger user interface 504 is replaced with the web browser user interface 502 of FIG. 5N. Accordingly, FIG. 5U1 differs from FIG. 5N in that, unillustrated, the device 100 has received an electronic message and has stored the verification code in a cache (e.g., copied the verification code to a clipboard).

As compared to FIG. 5O, FIG. 5U2 illustrates another embodiment of the user interface 500 of FIG. 5N after an electronic message is received by the device 100. In response to receiving the electronic message, a message notification 561B is displayed. The message notification 561B includes text indicating a source of the electronic message (e.g., phone number "987-66") and preview text previewing the content of the electronic message. The message notification 561B also includes, in response to detecting content of the electronic message meeting respective criteria include a verification code format requirement, a copy affordance 561C that, when selected, causes the device 100 to store the verification code in a cache (e.g., to copy the verification code to a clipboard), and a read affordance 561D that, when selected, dismisses the message notification 561B.

FIG. 5U2 illustrates a contact 550R detected at the location of the copy affordance 561C.

FIG. 5U3 illustrates the user interface 500 of FIG. 5U2 in response to detecting the contact 550R at the location of the copy affordance 561C. The user interface 500 of FIG. 5U3 is the same as the user interface 500 of FIG. 5U1.

FIG. 5U3 illustrates a contact 550S detected at the location of the verification code field 532G.

Figure 5V:
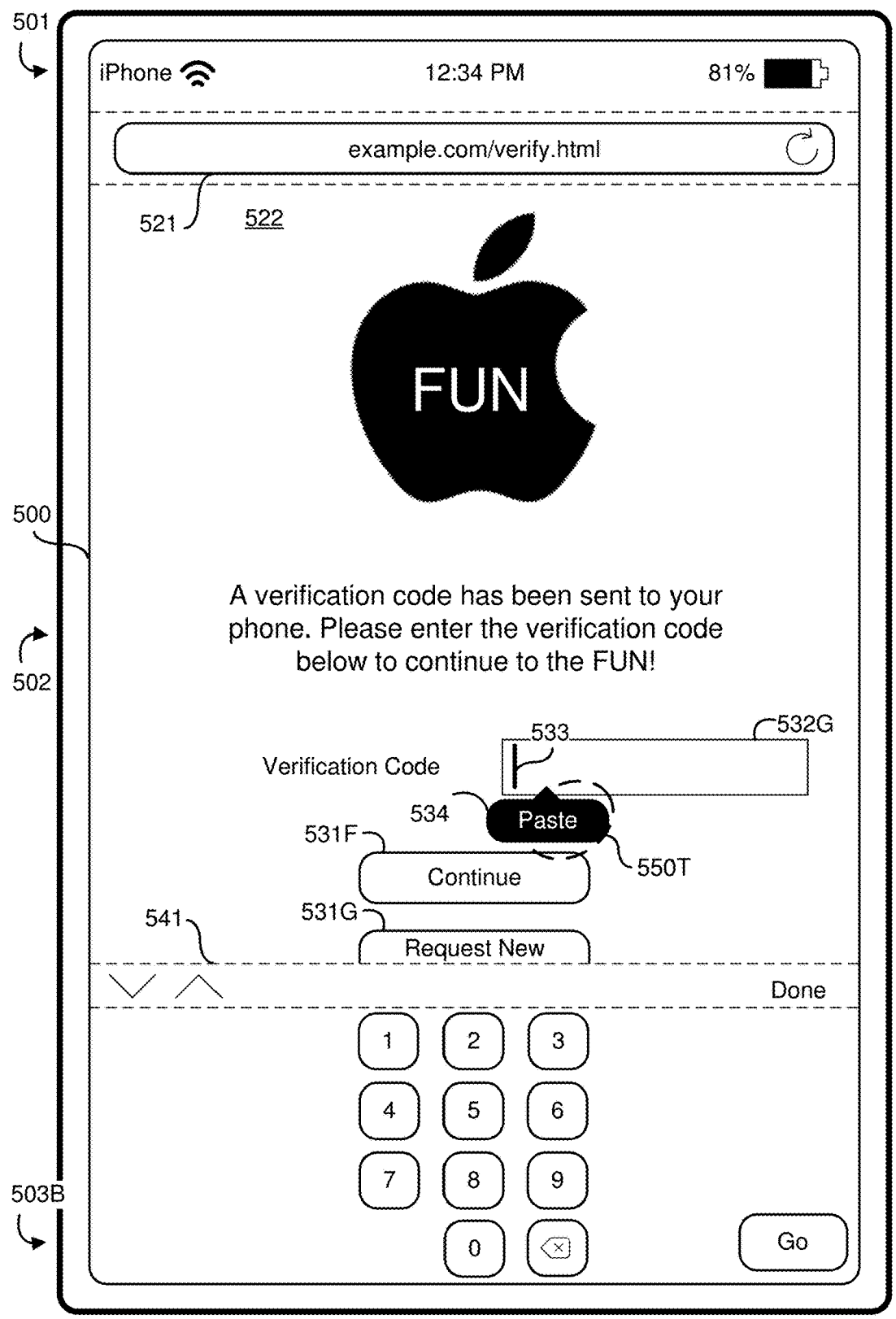

FIG. 5V illustrates the user interface 500 of FIG. 5U3 (or, similarly, of FIG. 5U1) in response to detecting the contact 550S at the location of the verification code field 532G. In response to detecting selection of the verification code field 532G, the cursor 533 is displayed in the verification code field 532G. Further, the user interface 500 includes the numeric soft keyboard 503B.

In response to including text stored in the cache, e.g., copied to the clipboard, the user interface 500 includes a paste affordance 534 that, when selected, inserts the text stored in the cache into the selected field.

FIG. 5V illustrates a contact 550T detected at the location of the paste affordance 534.

Figure 5W:
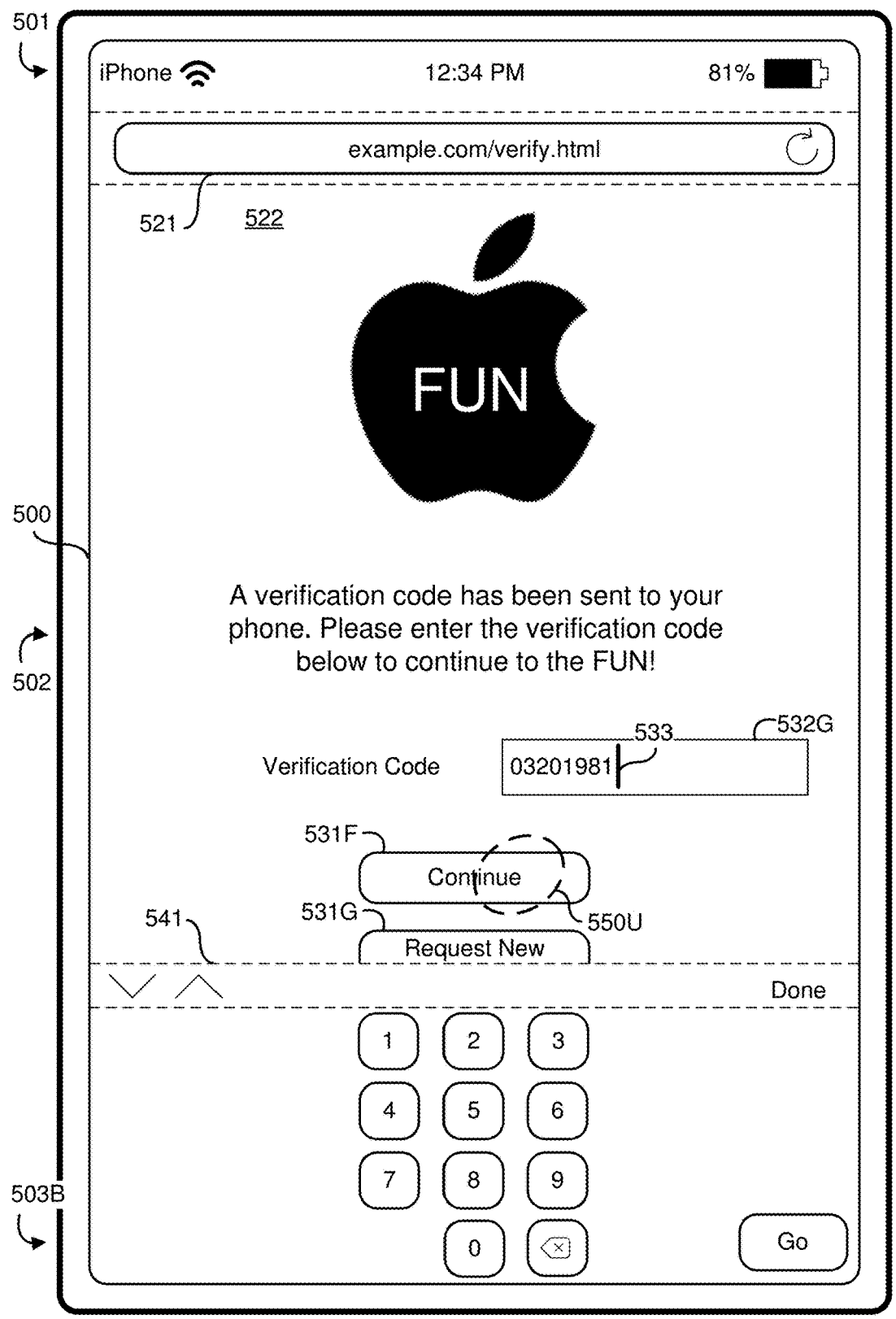

FIG. 5W illustrates the user interface 500 of FIG. 5V in response to detecting the contact 550T at the location of the paste affordance 534. In FIG. 5W, the verification code from the cache has been inserted into the verification code field 532G.

FIG. 5W illustrates a contact 550U detected at the location of the continue-sign-in affordance 531F.

Figure 5X:

FIG. 5X illustrates the user interface 500 of FIG. 5W in response to detecting the contact 550U at the location of the continue-sign-in affordance 531F. In FIG. 5X, the address bar 521 includes the address of a content page of the service. In FIG. 5X, the content region 522 includes resources provided by the service protected by authentication credentials (potentially including the verification code).

Figure 5Y:
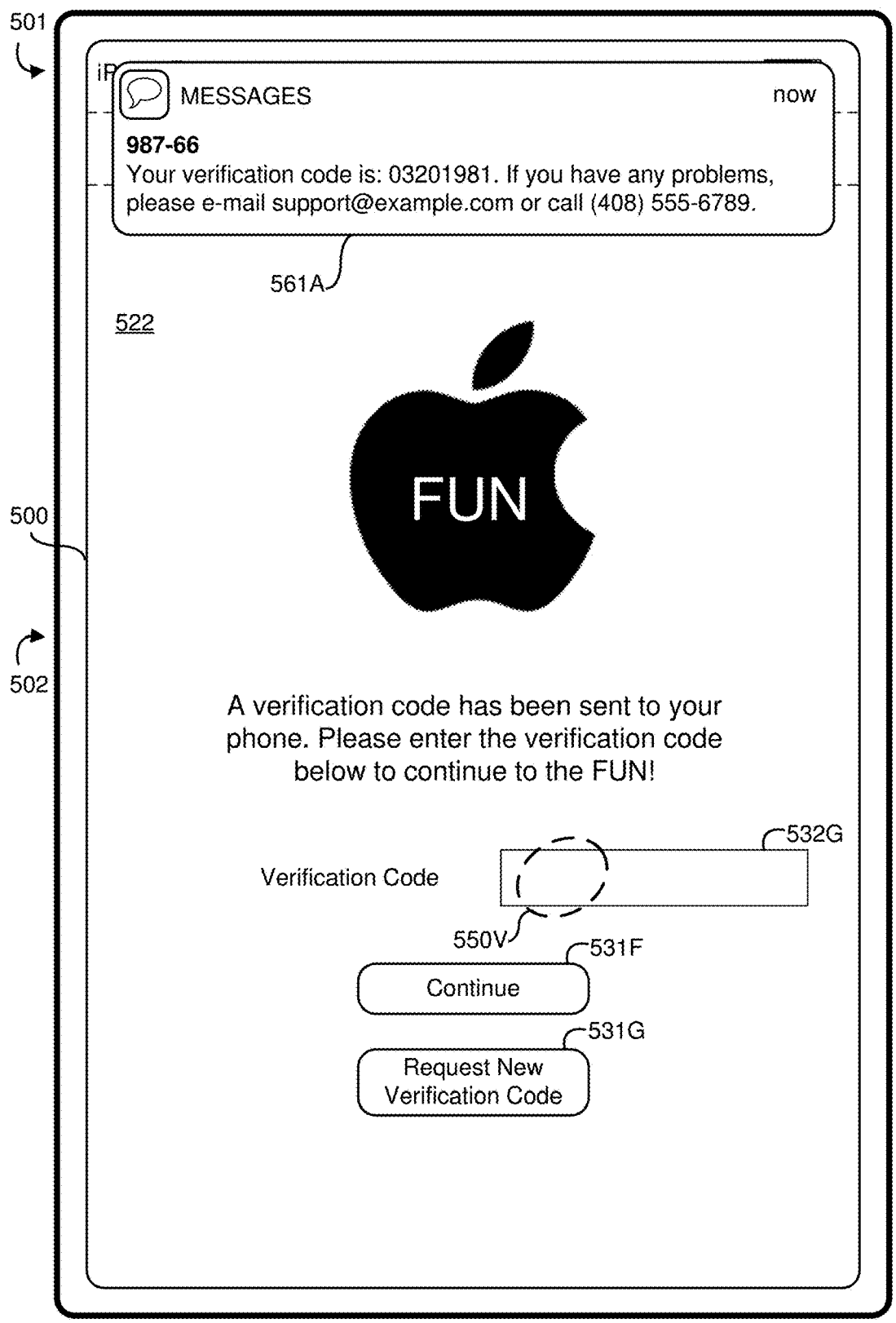

As compared to FIG. 5O, FIG. 5Y illustrates another embodiment of the user interface 500 of FIG. 5N after an electronic message is received by the device 100. In response to receiving the electronic message, a message notification 561A is displayed. The message notification 561A includes text indicating a source of the electronic message (e.g., phone number "987-66") and preview text previewing the content of the electronic message.

Whereas FIG. 5O illustrates a contact 550M at the location of the message notification 561A, FIG. 5Y illustrates a contact 550V at the location of the verification code field 532G.

Figure 5Z:
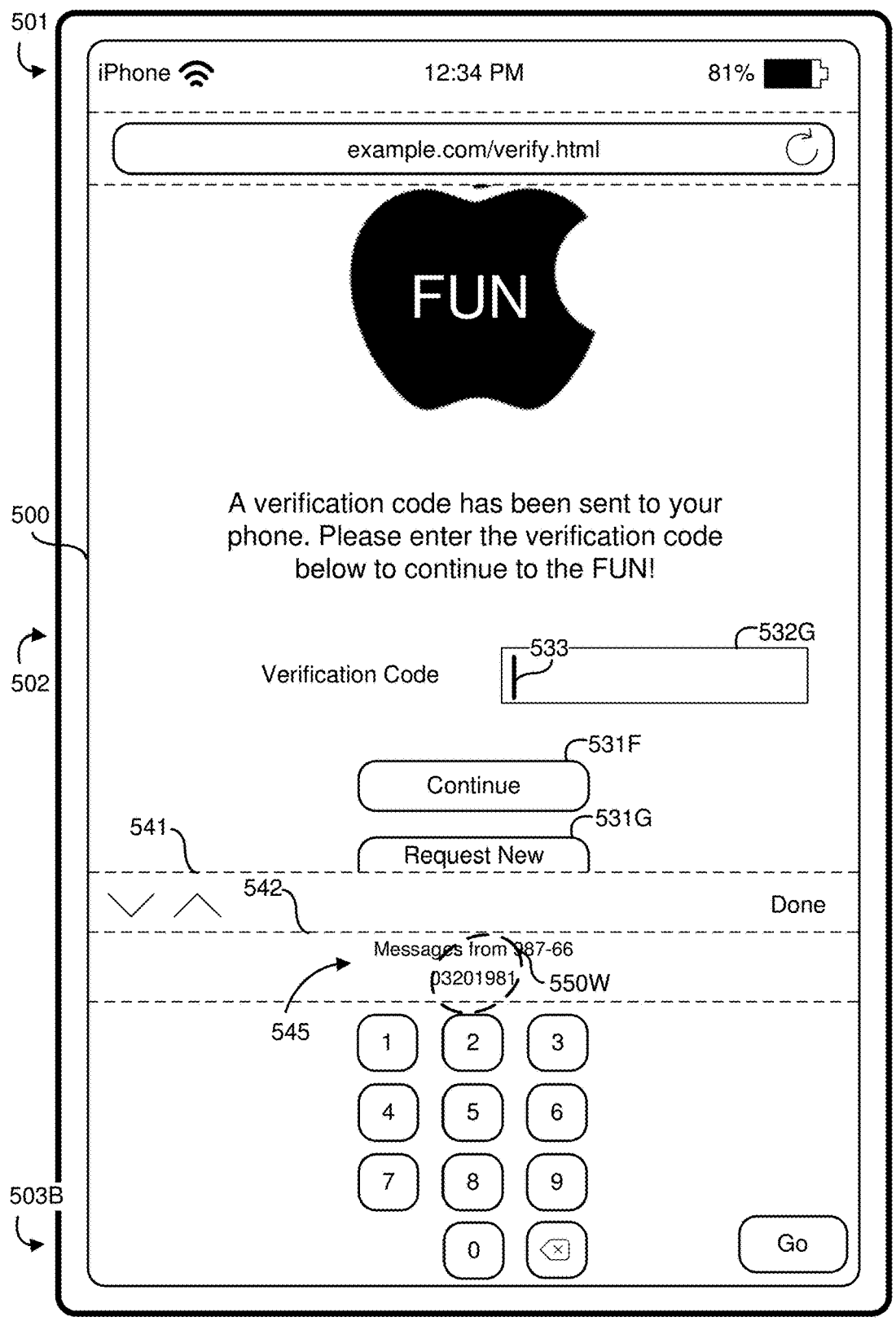
Figure 5A:
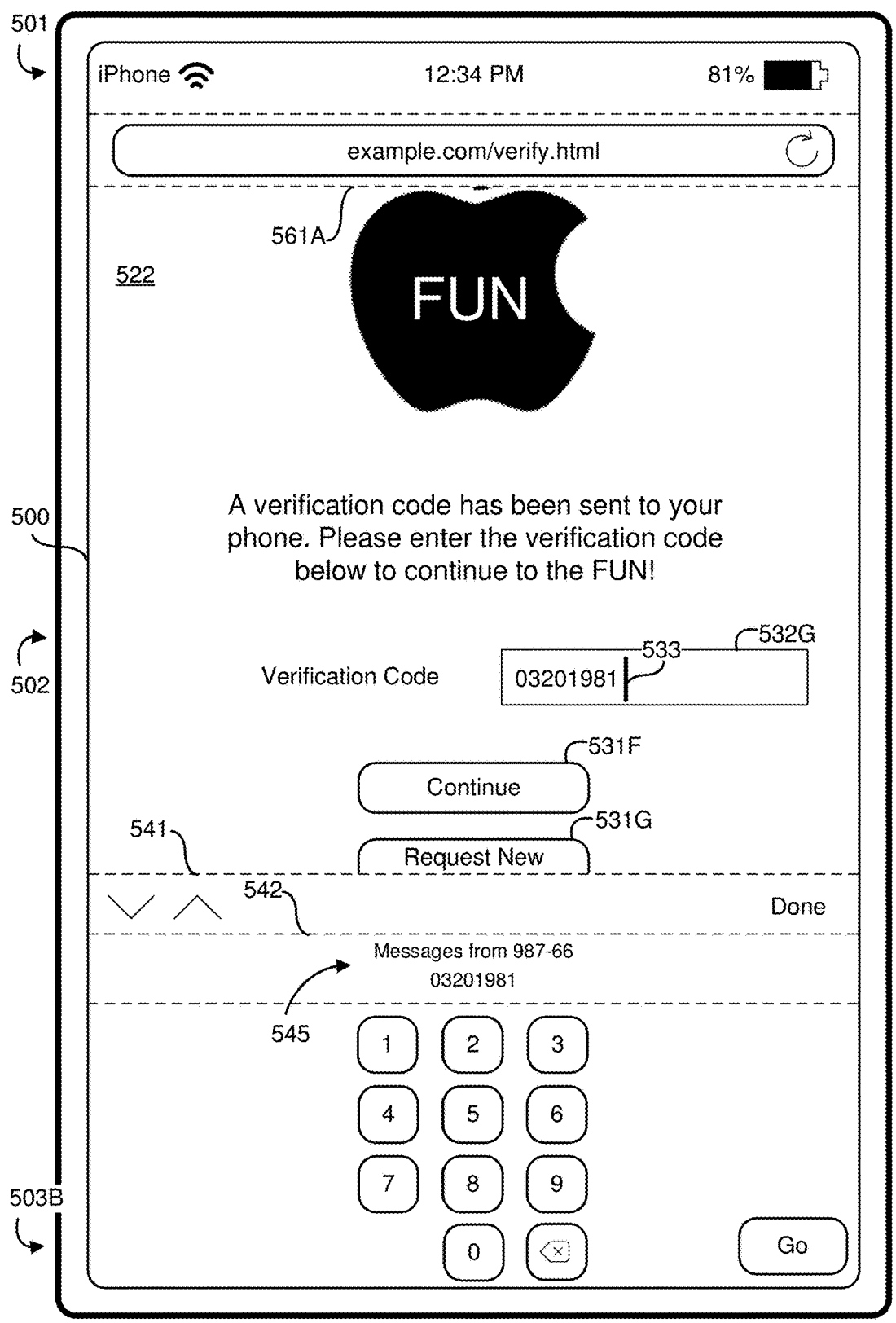
Figure 5A:
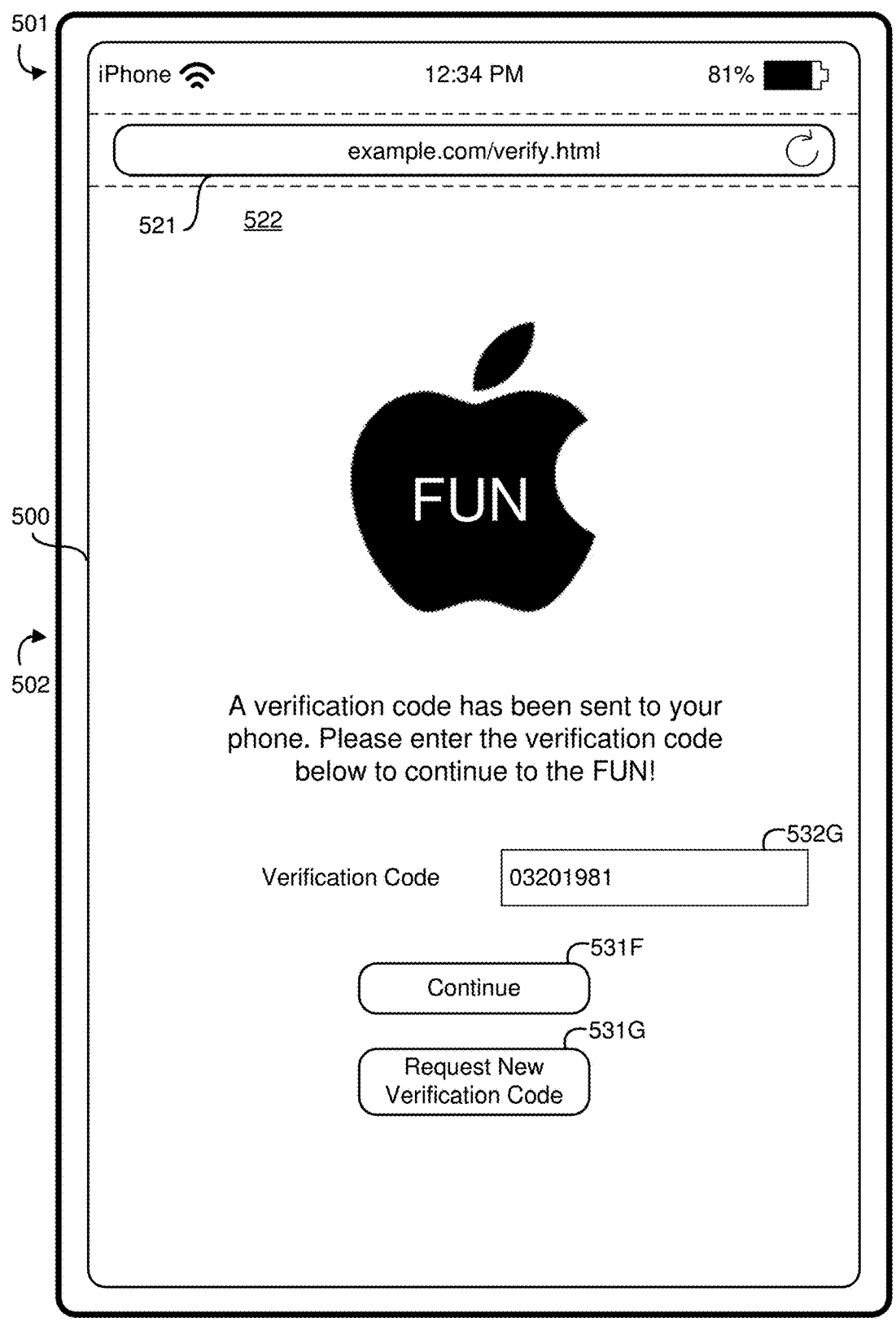
Figure 5A:
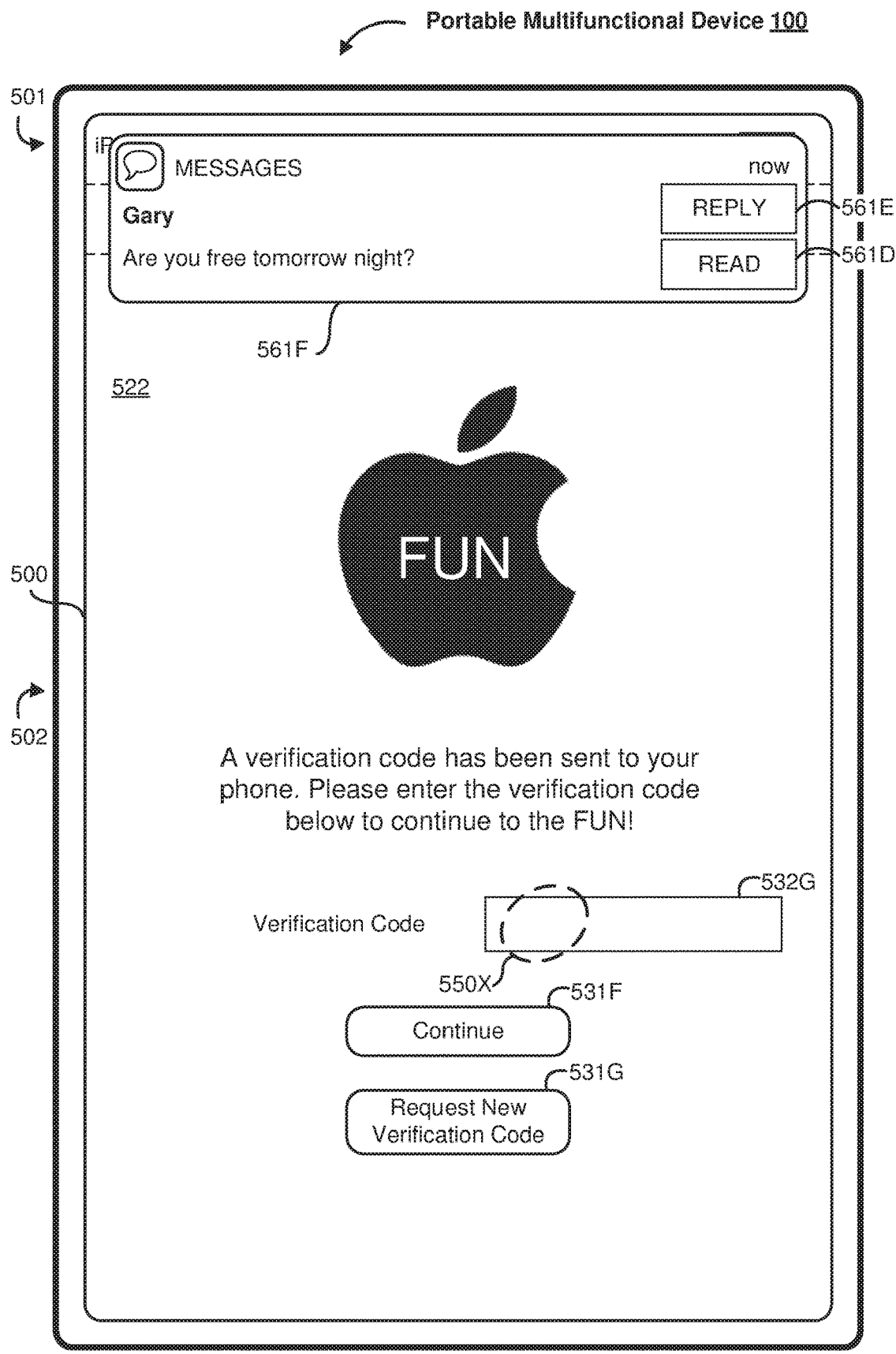
Figure 5A:
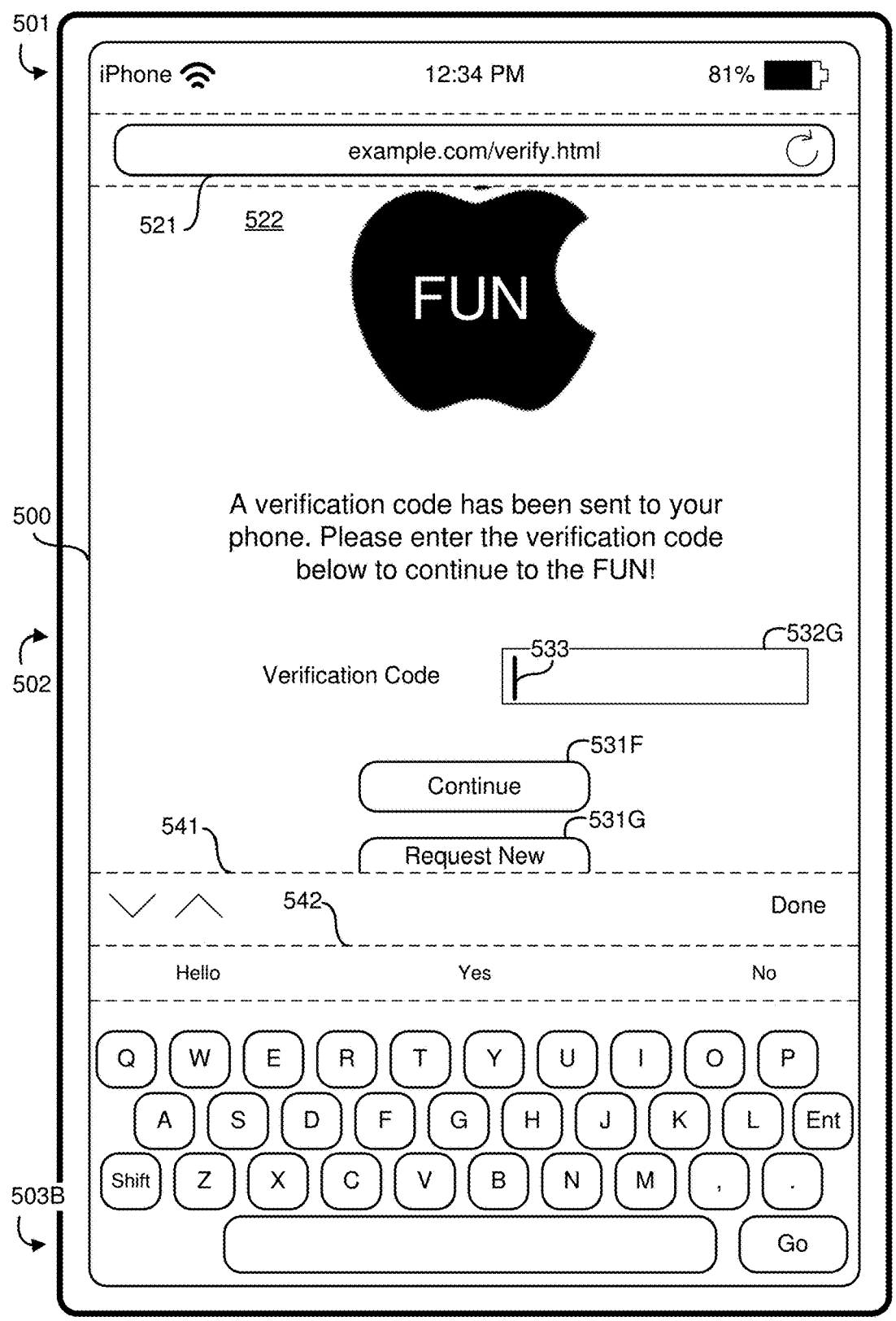

FIG. 5Z illustrates the user interface of FIG. 5Y in response to detecting the contact 550V at the location of the verification code field 532G. In response to detecting selection of the verification code field 532G, the cursor 533 is displayed in the verification code field 532G. Further, the user interface 500 includes the numeric soft keyboard 503B. The numeric soft keyboard 503B includes the navigation region 541 and the text suggestion region 542. In accordance that respective criteria are met, the text suggestion region 542 includes an insertion affordance 545 that, when selected, automatically inserts the verification code in the verification code field 532G. Although FIG. 5Z illustrates the numeric soft keyboard 503B, in various implementations, the insertion affordance 545 is displayed in a text suggestion region 542 above the soft keyboard 503A, a handwriting recognition user interface, or other user input region.

In various implementations, the respective criteria include a requirement that the electronic message includes content that meets a verification code format requirement. In various implementations, the respective criteria include a timing requirement that the user interface is displayed within a predetermined time period from when the electronic message was received. Thus, in various implementations, the insertion affordance is only displayed for a limited time from when the electronic message is received, e.g., three minutes. In various implementations, the respective criteria include a characteristic requirement that the user interface includes a text entry field having predetermined characteristics. In various implementations, the respective criteria includes a selection requirement that a text entry field is selected. For example, the insertion affordance 545 is displayed when a field is selected that is classified as a verification code field (e.g., based on analysis or metadata regarding the field provided by the service). As another example, the insertion affordance 545 is only displayed when a field is selected that is not otherwise classified as, e.g., username, password, e-mail address, phone number, credit card number, address, multi-line input field, etc.

In various implementations, the insertion affordance 545 includes an indication of the application by which the electronic message was received. For example, in FIG. 5Z, the insertion affordance 545 indicates a text messaging application ("Messages"). In other implementations, the insertion affordance indicates an e-mail application or a chat application. In various implementations, the insertion affordance 545 includes an indication of the sender of the electronic message. For example, in FIG. 5Z, the insertion affordance indicates a phone number ("987-66"). In other implementations, the insertion affordance indicates a name of the service, e.g. "Apple Fun." In some embodiments, the indication of the application or the indication of the sender is not displayed with the other.

FIG. 5Z illustrates a contact 550W at the location of the insertion affordance in the text suggestion region 542.

FIG. AA illustrates the user interface 500 of FIG. 5Z in response to detecting the contact 550W at the location of the insertion affordance 545. In FIG. 5AA, the verification code has been inserted into the verification code field 532G.

In various implementations, the user interface 500 of FIG. 5AA is reached directly from the user interface of FIG. 5Y, without requiring a selection of the insertion affordance 545. Thus, in various implementations, in response to the determination that the electronic message includes content that meets the respective criteria, the device 100 automatically inserts the content as a verification code in the user interface.

As compared to FIG. 5O, FIG. 5AB illustrates another embodiment of the user interface 500 of FIG. 5N after an electronic message is received by the device 100. In contrast to FIG. 5O, in response to receiving the electronic message, no message notification 561A is displayed. Further, in response to the determination that the electronic message includes content that meets the verification code format requirement, without display or selection of an insertion affordance 545, the device 100 automatically inserts the content as a verification code in the verification code field 532G.

As compared to FIG. 5O, FIG. 5AC illustrates another embodiment of the user interface 500 of FIG. 5N after an electronic message is received by the device 100. In response to receiving the electronic message, a message notification 561F is displayed. The message notification 561F includes text indicating a source of the electronic message (e.g., contact name "Gary") and preview text previewing the content of the electronic message. In contrast to FIG. 5O, the content of the electronic message does not include content meeting respective criteria. In particular, the content of the electronic message does not include content meeting a verification code format requirement. Accordingly, the message notification 561C 561F does not include a copy affordance 561C, but rather, includes a reply affordance 561E for composing a text message reply to the sender of the electronic message.

FIG. 5AC illustrates a contact 550X at the location of the verification code field 532G.

FIG. 5AD illustrates the user interface 500 of FIG. 5AC in response to detecting the contact 550X at the location of the verification code field 532G. In response to detecting selection of the verification code field 532G, the content region 522 includes the cursor 533 displayed in the verification code field 532G. Further, the user interface 500 includes a soft keyboard 503A with a plurality of character insertion affordances that, when selected, inserts a character into the selected field. The soft keyboard 503A includes navigation region 541 and a text suggestion region 542 which includes text suggestion affordances that indicate suggested text and that, when selected, inserts the suggested text into the selected field. In FIG. 5AD, in contrast to FIG. 5Z, the text suggestion region 542 does not include an insertion affordance 545 for inserting a verification code because the electronic message displayed in the message notification 561F of FIG. 5AC did not include a verification code.

Figure 6A:
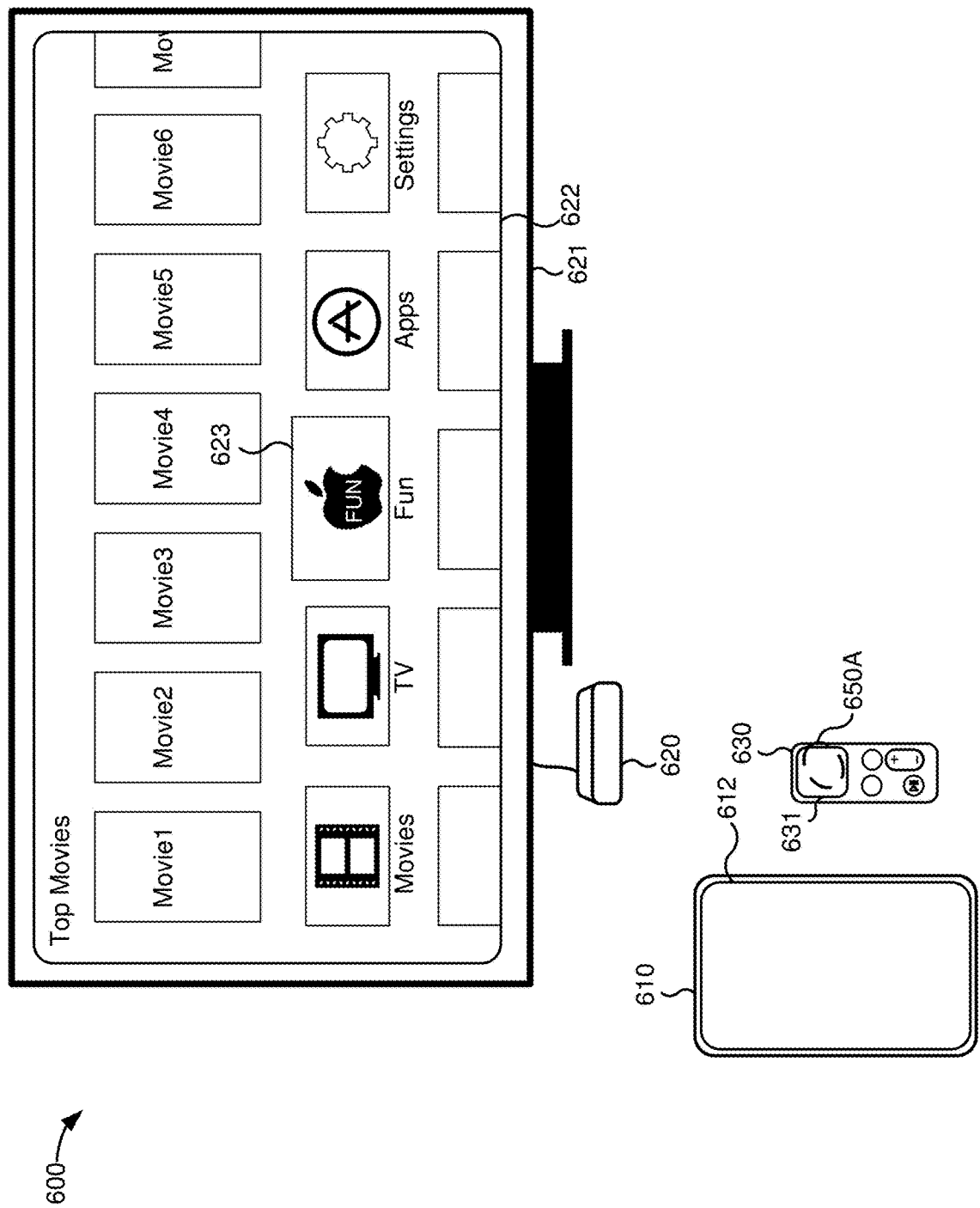
FIGS. 6A-6H illustrate example user interfaces for sharing authentication credentials in accordance with some embodiments.
Figure 7A:
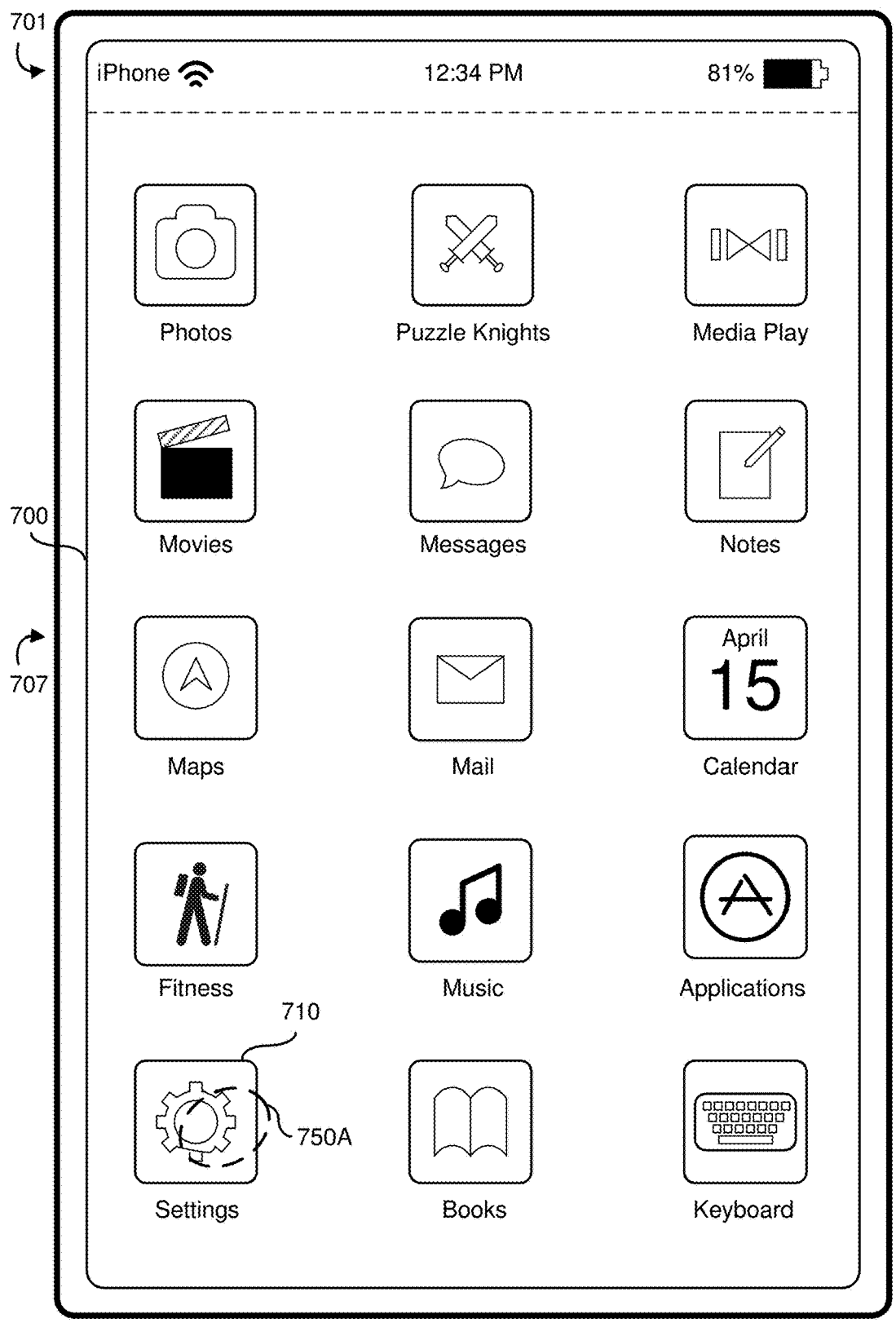
FIGS. 7A-7Y illustrate example user interfaces for displaying password information in accordance with some embodiments.

FIG. 6A illustrates an operating environment 600 including a first electronic device 610, a second electronic device 620, and a third electronic device 630. The first electronic device 610 corresponds to a portable electronic device, such as the portable electronic device 100 of FIG. 1 or the device 300 of FIG. 3. The first electronic device 610 includes a display that provides a first user interface 612. The second electronic device 620 is a media playback device coupled to a display device 621 that provides a second user interface 622. The third electronic device 630 is a remote control for the second electronic device 620. The third electronic device 630 includes a touch-sensitive input device 631 for producing user inputs that are transmitted to the second electronic device 620.

The second user interface 622 includes a plurality of affordances that, when selected, open applications or provide media content via the second user interface 622. In FIG. 6A, an application affordance 623 of the plurality of affordances is selected.

FIG. 6A illustrates a contact 650A detected on the touch-sensitive input device 631 while the application affordance 623 is selected.

Figure 6B:
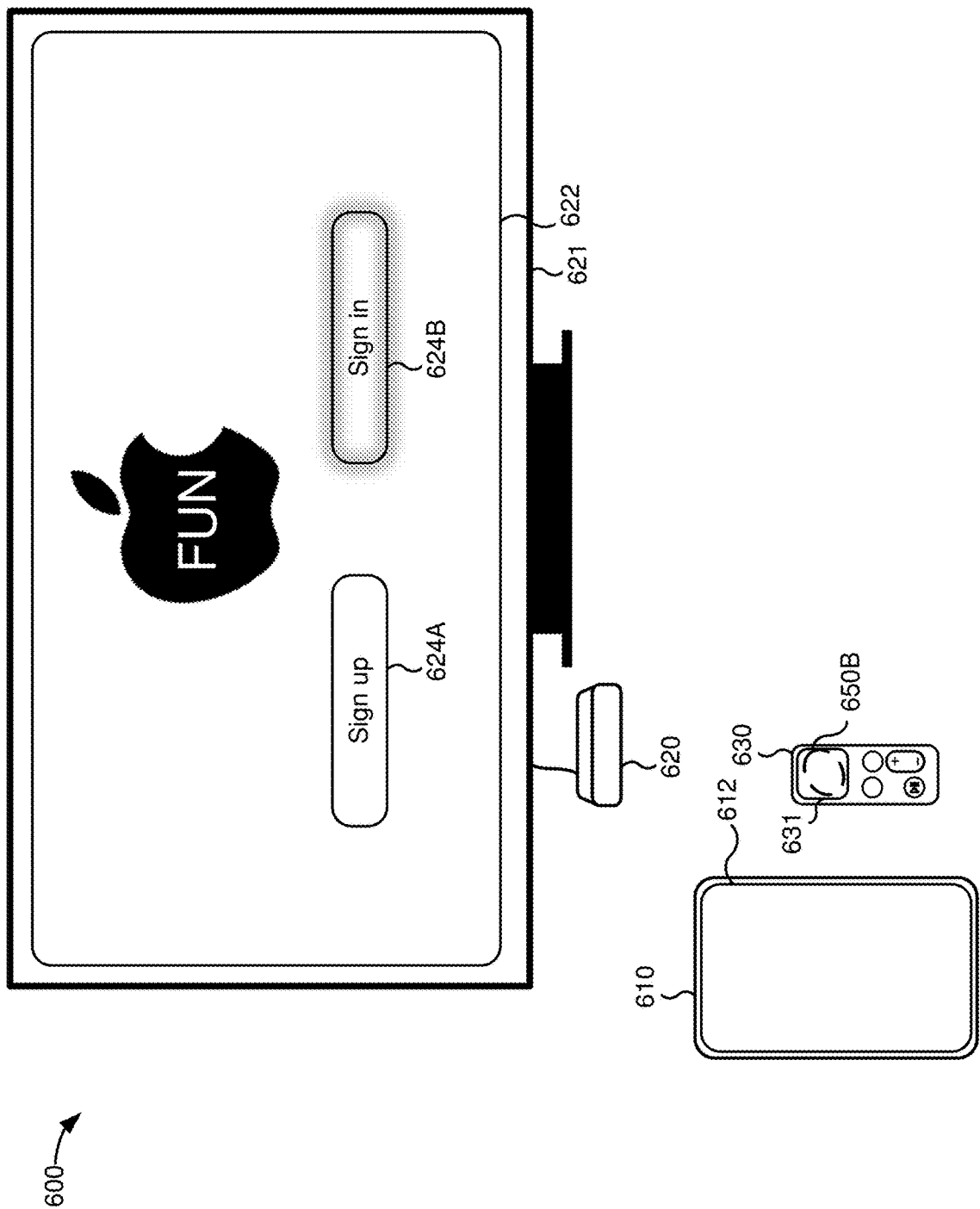

FIG. 6B illustrates the operating environment 600 of FIG. 6A in response to detecting the contact 650A on the touch-sensitive input device 631 while the application affordance 623 is selected. In FIG. 6B, the second user interface 622 includes a home screen of a service that includes an image (of an apple), a sign-up affordance 624A, and a sign-in affordance 624B. The sign-up affordance 624A, when selected, allows a user to register with the service, e.g., create a user account, to access resources (e.g., content) protected by authentication credentials of the user account. The sign-in affordance 624B, when selected, allows a user to provide authentication credentials to access the resources of the service. In FIG. 6B, the sign-in affordance 624B is selected.

FIG. 6B illustrates a contact 650B detected on the touch-sensitive input device 631 while the sign-in affordance 624B is selected.

Figure 6C:
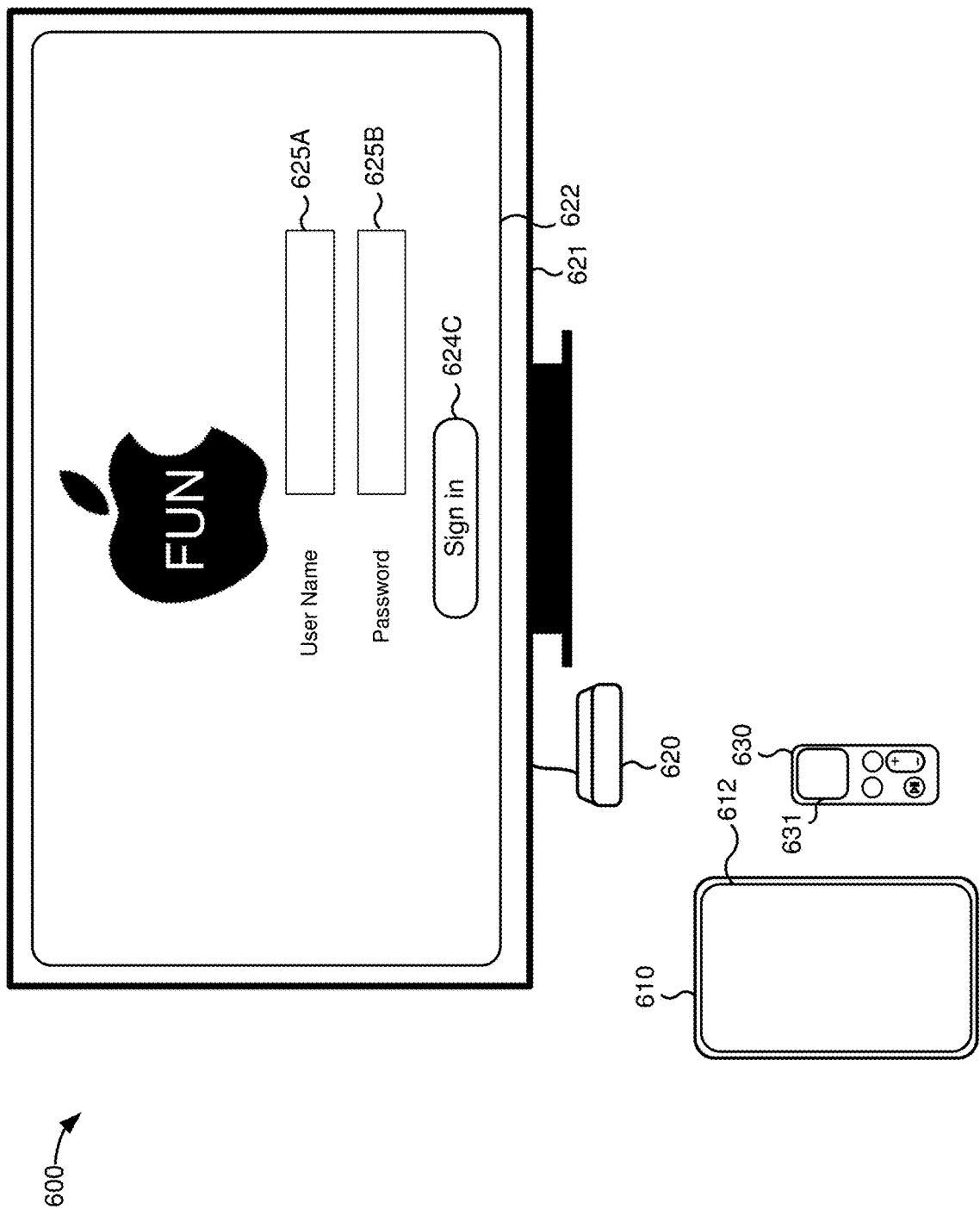

FIG. 6C illustrates the operating environment 600 of FIG. 6B in response to detecting the contact 650B on the touch-sensitive input device 631 while the sign-in affordance 624B is selected. In FIG. 6C, the second user interface 622 includes a sign-in screen of the service that includes an image (of an apple), a username field 625A for receiving text input indicative of a username associated with an existing user account, and a password field 625B for receiving text input indicative of a password associated with the user account. The second user interface 622 includes a continue-sign-in affordance 624C that, when selected, requests access to the resources of the service based on authentication credentials input into the fields 625A-625B.

In FIG. 6C, the second electronic device 620 transmits, to the first electronic device 610, an indication that the second electronic device 620 is in need of authentication credentials for a service (e.g., a username and password).

Figure 6D:
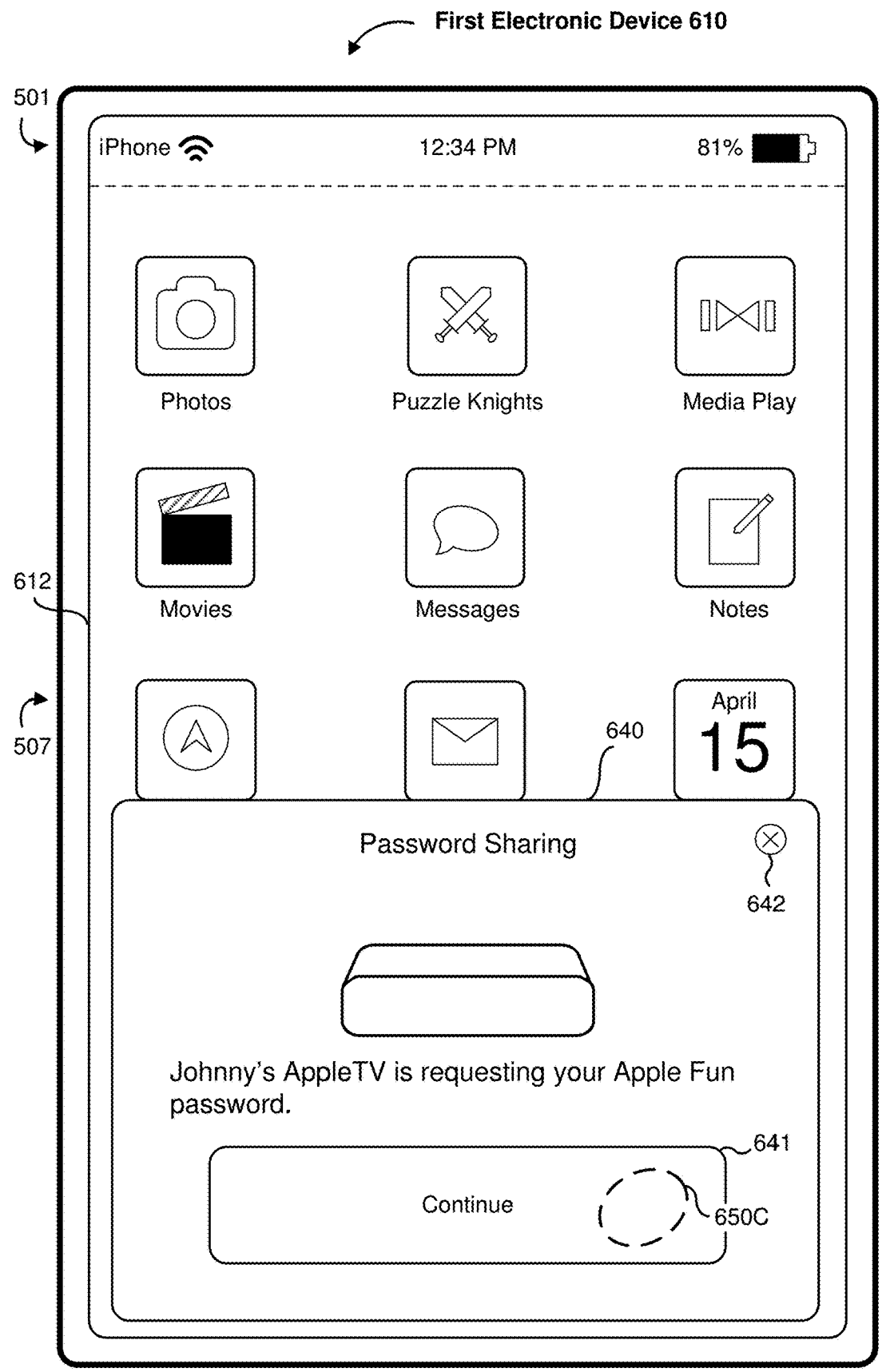

FIG. 6D illustrates the first electronic device 610 in response to receiving the indication that the second electronic device 620 is in need of authentication credentials for a service. In FIG. 6D, the first user interface 612 includes the device bar 501 and an application launcher user interface 507. The application launcher user interface 507 includes a plurality of representations of applications installed on the first electronic device 610 arranged in a grid. In front of the application launcher user interface 507 (or any other user interface currently displayed), the first user interface 612 includes a sharing confirmation window 640.

The sharing confirmation window 640 includes text describing the indication that the second electronic device 620 is in need of authentication credentials for a service. In various implementations, the text includes an indication of the service (e.g., "Apple Fun"). In various implementations, the text generically indicates that the second electronic device 620 is in need of authentication credentials for a service (e.g., "Johnny's AppleTV is requesting a password.") The sharing confirmation window 640 includes a sharing confirmation affordance 641 that, when selected, allows the sharing of credentials between the first electronic device 610 and the second electronic device 620 as described further below. The sharing confirmation window 640 includes a sharing cancelation affordance 642 that, when selected, disallows the sharing of credentials between the first electronic device 610 and the second electronic device 620.

In various implementations, the sharing confirmation window 640 is displayed on the first electronic device 610 in accordance with a determination that the first electronic device 610 is within a predetermined proximity to the second electronic device 620. In various implementations, the predetermined proximity is the distance to the closest device. In various implementations, the predetermined proximity is a predetermined range. In various implementations, the sharing confirmation window 640 is displayed on the first electronic device 610 in accordance with a determination that the first electronic device 610 is within a predetermined proximity to the third electronic device 630 associated with the second electronic device 620. In various implementations, the predetermined proximity is the distance to the closest device. In various implementations, the predetermined proximity is a predetermined range.

FIG. 6D illustrates a contact 650C detected at the location of the sharing confirmation affordance 641.

Figure 6E:
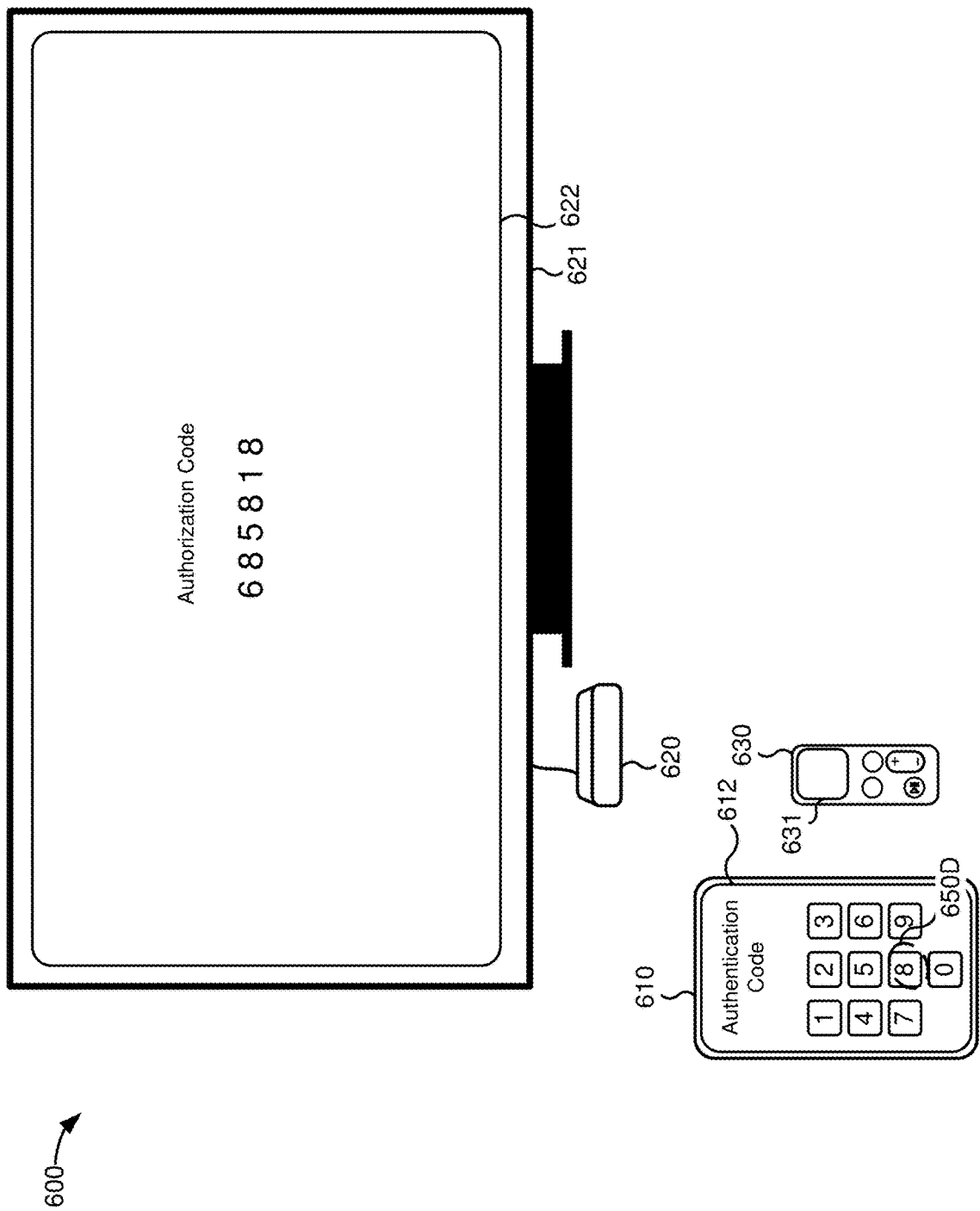

FIG. 6E illustrates the operating environment 600 of FIG. 6C in response to detecting the contact 650C at the location of the sharing confirmation affordance 641. In FIG. 6E, the second user interface 622 displays verification information, e.g., an authorization code. In FIG. 6E, the first user interface 612 displays a verification prompt that requires input of information from the second electronic device 620 (e.g., the verification information displayed by the second electronic device 620) on the first electronic device 610 in order to proceed. In particular, the verification prompt is for establishing a secure connection between the first electronic device 610 and the second electronic device 620. The verification prompt includes a plurality of numeric character affordances for inputting the information from the second electronic device 620 (e.g., the verification information displayed by the second electronic device 620). In various implementations, the verification prompt includes a soft keyboard, such as the soft keyboard 503B, or other input user interface.

FIG. 6E illustrates a contact 650D at a location of one of the plurality of numeric character affordances.

Figure 6F:
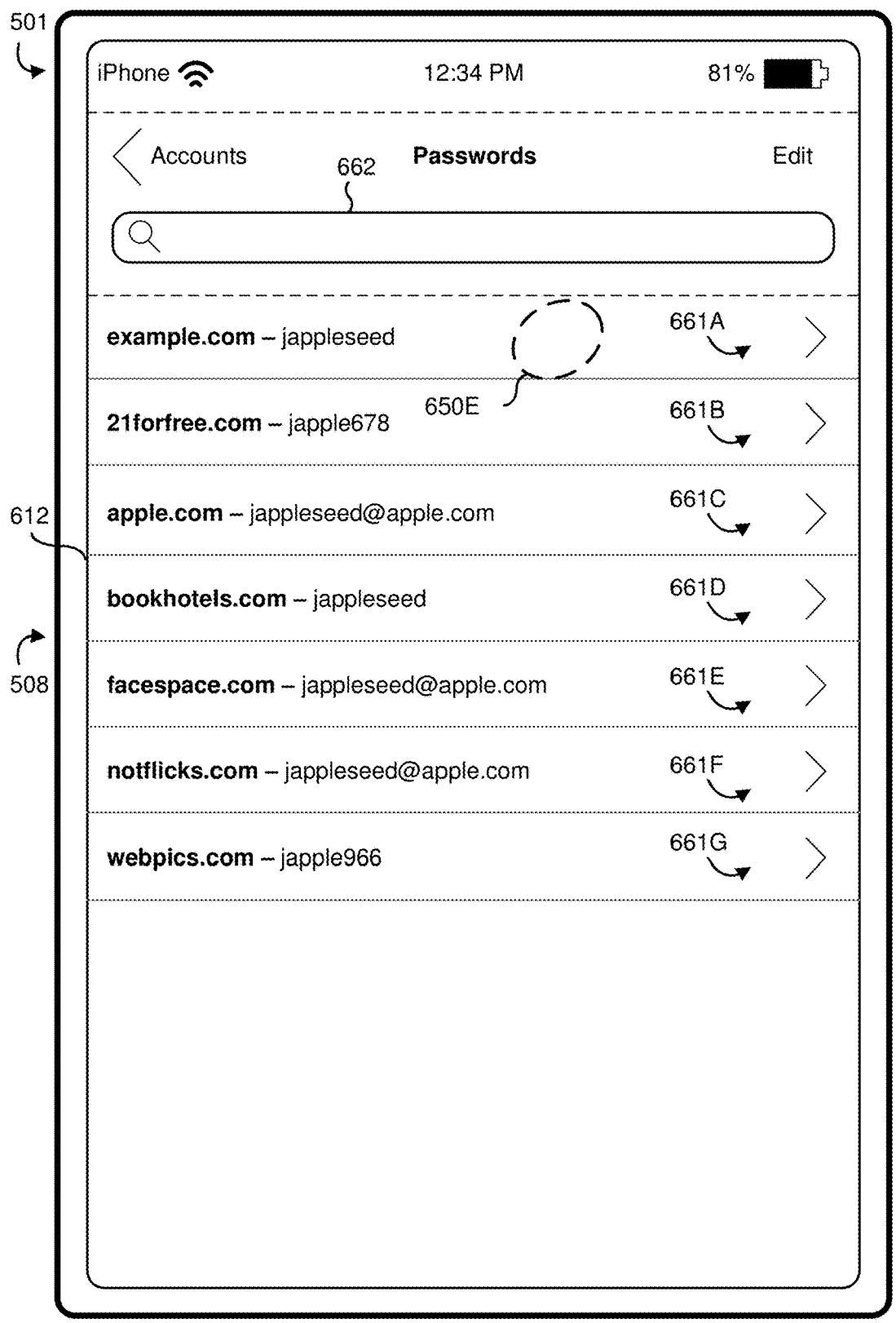

FIG. 6F illustrates first electronic device 610 in response to detecting the contact 650D at the location of the one of the plurality of numeric character affordances and other contacts corresponding to the verification information from the second electronic device 620. The first user interface 612 includes the device bar 501 and a service selection user interface 508. The service selection user interface 508 includes a list of service affordances 661A-661G respectively associated a plurality of services, user accounts for those services, and authentication credentials for those user accounts. The service selection user interface 508 includes a search field 662 for receiving a text input and searching the plurality of services based on the text input.

In FIG. 6F, the list of service affordances 661A-661G is sorted based at least in part on relevance of the respective services. In particular, the indication that the second electronic device 620 is in need of authentication credentials for a service indicates the service and that service is listed at the top of the list of service affordances 661A-661G.

FIG. 6F illustrates a contact 650E detected at the location of a first service affordance 661A of the list of service affordance 661A-661G.

Figure 6G:
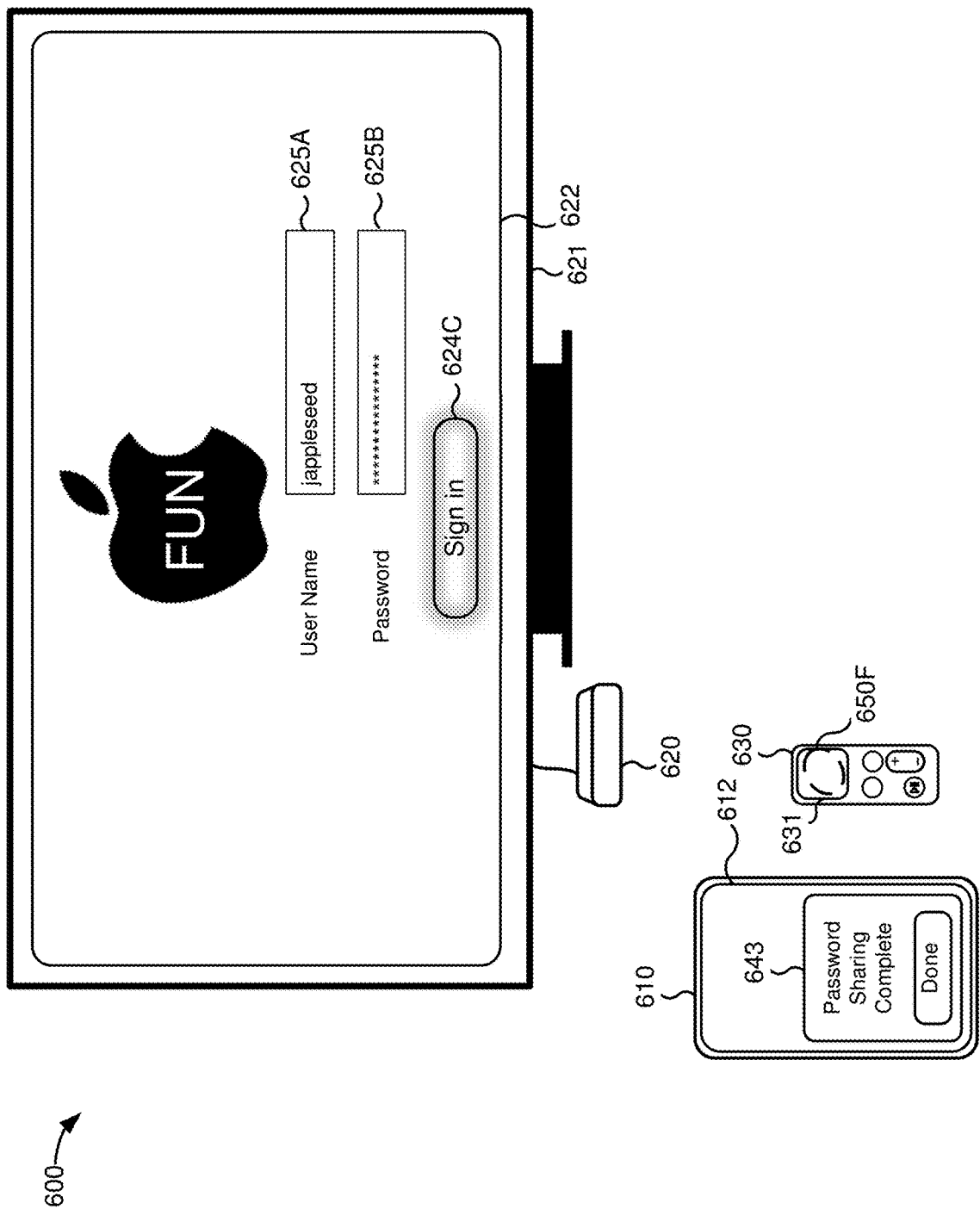

FIG. 6G illustrates the operating environment 600 of FIG. 6E in response to detecting the contact 650E at the location of the first service affordance 661A. In FIG. 6G, in the second user interface 622, the username field 625A and the password field 625B are populated with authentication credentials received from the first electronic device 610. Further, the sign-in affordance 624C is selected. In the first user interface 612, a complete-sharing window 643 is displayed including a notification indicating that the authentication credentials having been shared with the second electronic device 620.

FIG. 6G illustrates a contact 650F detected on the touch-sensitive input device 631 while the continue-sign-in affordance 624C is selected.

Figure 6H:
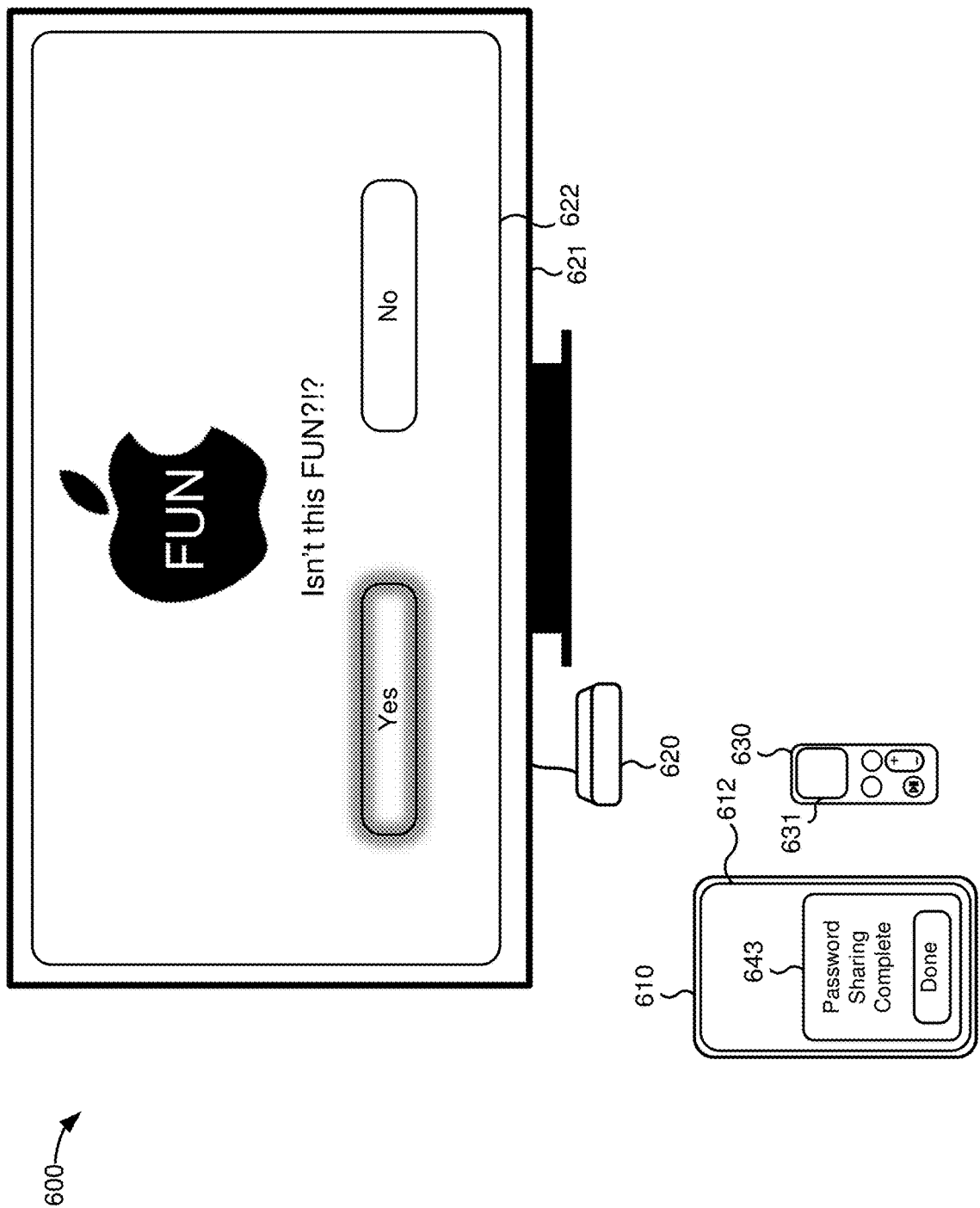

FIG. 6H illustrates the operating environment 600 of FIG. 6G in response to detecting the contact 650F on the touch-sensitive input device 631 while the continue-sign-in affordance 624C is selected. In FIG. 6H, the second user interface 622 includes a content screen of the service.

FIG. 7A illustrates an application launcher user interface 707 as part of a user interface 700 displayed by a portable multifunctional device 100 (hereinafter "device 100"). The user interface 700 includes, in addition to the application launcher user interface 507, a device bar 701 at the top of the display including an identifier of the device 100 (e.g., "iPhone"), a wireless connection indicator, a current time, and a battery indicator indicating a charge level of the device 100.

The user interface 700 includes, below the device bar 701, and spanning the rest of the display, an application launcher user interface 707. The application launcher user interface 707 includes a plurality of representations of applications installed on the device 100, including a settings representation 710. As shown in FIG. 7A, each representation includes an icon associated with the corresponding application and text describing the application (e.g., a name or function of the application). As an application launching user interface 707, in response to detecting a user input at the designated location of the representation of a particular application, the device 100 launches the particular application.

Although FIG. 7A illustrates an application launching user interface 707 in the form of a home screen, in various implementations, the application launching user interface 707 is a taskbar or a file manager. Further, although FIG. 7A illustrates only a single page of a home screen, in various implementations, the application launching user interface 707 includes multiple pages.

FIG. 7A illustrates a contact 750A detected at the location of the settings representation 710.

Figure 7B:
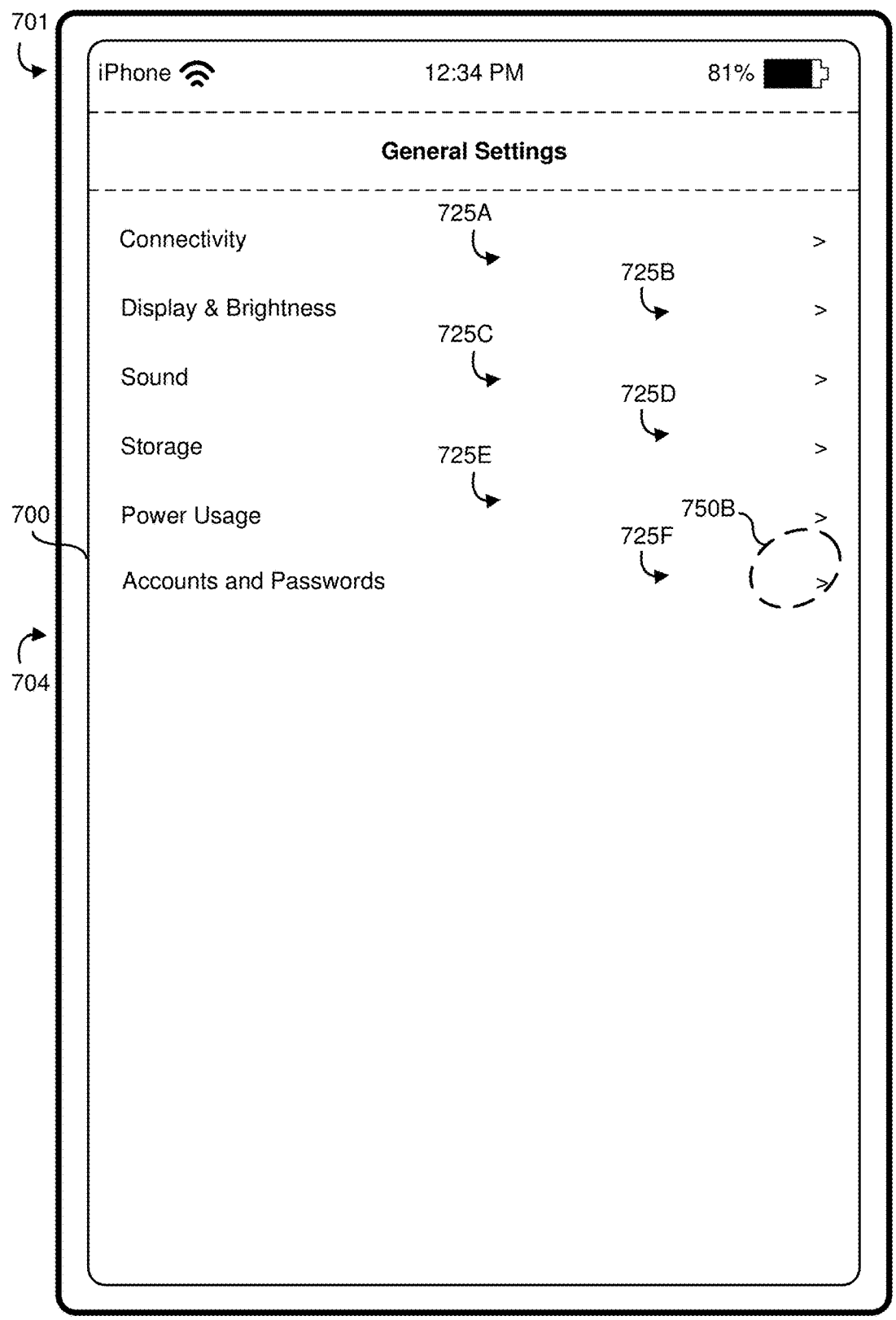

FIG. 7B illustrates the user interface 700 of FIG. 7A in response to detecting the contact 750A at the location of the settings representation 710. In response to detecting the contact 750A at the location of the settings representation 710, the application launcher user interface 707 is replaced with a general settings user interface 704. The general settings user interface 704 includes a plurality of settings affordances 725A-725F including a connectivity management affordance 725A, a display management affordance 725B, a sound management affordance 725C, a storage management affordance 725D, a power management affordance 725E, and a password management affordance 725F. In various implementations, the general settings user interface 704 can include additional, fewer, or other settings affordances.

FIG. 7B illustrates a contact 750B detected at a location of the password management affordance 725F.

Figure 7C:
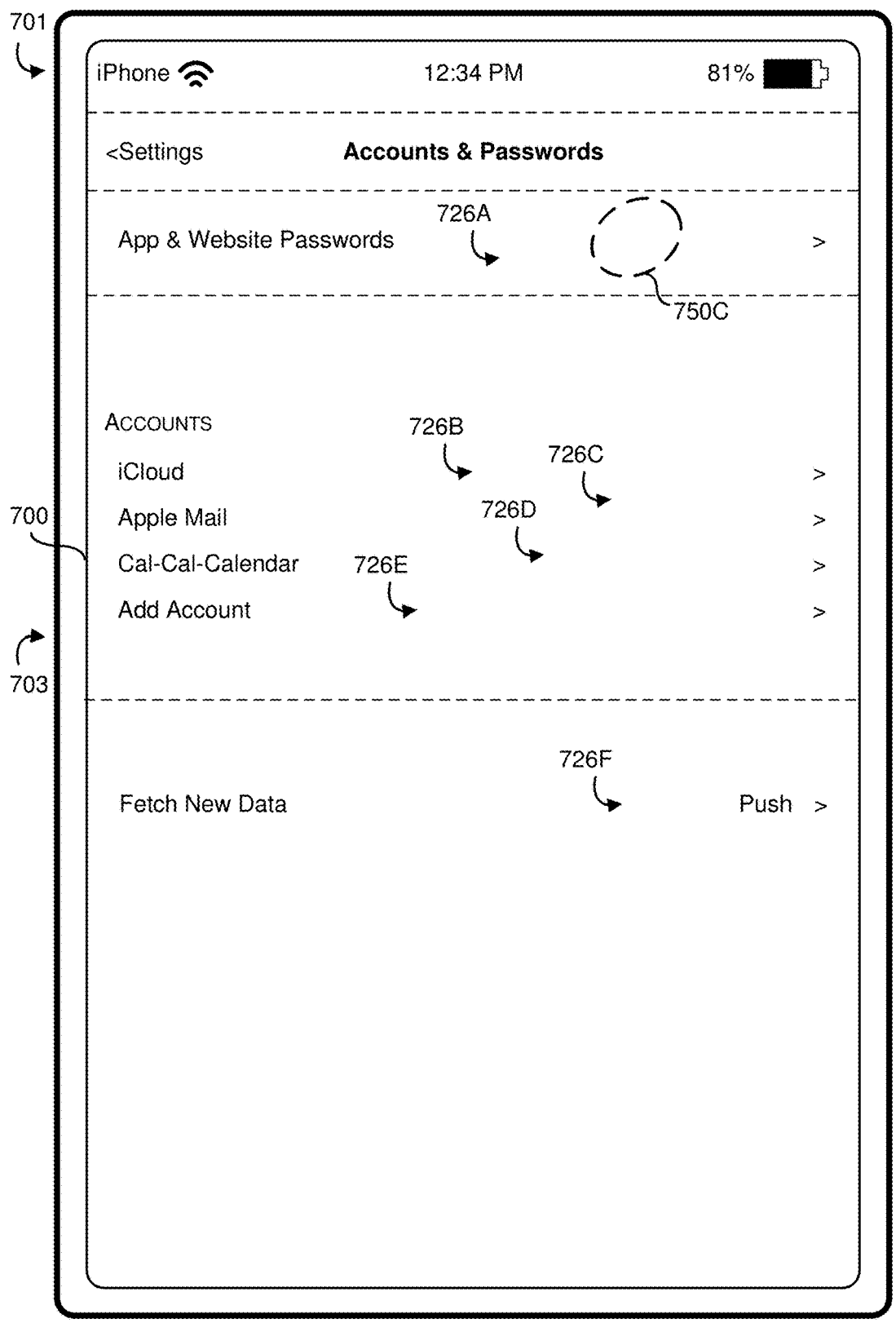

FIG. 7C illustrates the user interface 700 of FIG. 7B in response to detecting the contact 750B at the location of the password management affordance 725F. In response to detecting the contact 750B at the location of the password management affordance 725F, the general settings user interface 704 is replaced with a password management user interface 703. The password management user interface 703 includes a password list affordance 726A that, when selected, displays a list of user accounts having respectively associated authentication credentials. The password management user interface 703 includes a list of account affordances 726B-726D that, when selected, provide information and settable settings for respective user accounts of a list of user accounts. The password management user interface 703 includes an add-account affordance 726E that, when selected, allows a user to add a user account to the list of user accounts. The password management user interface 703 includes a fetch-setting affordance 726F that, when selected, allows a user to select a fetch setting for fetching data from the user accounts.

FIG. 7C illustrates a contact 750C at the location of the password list affordance 726A.

Figure 7D:
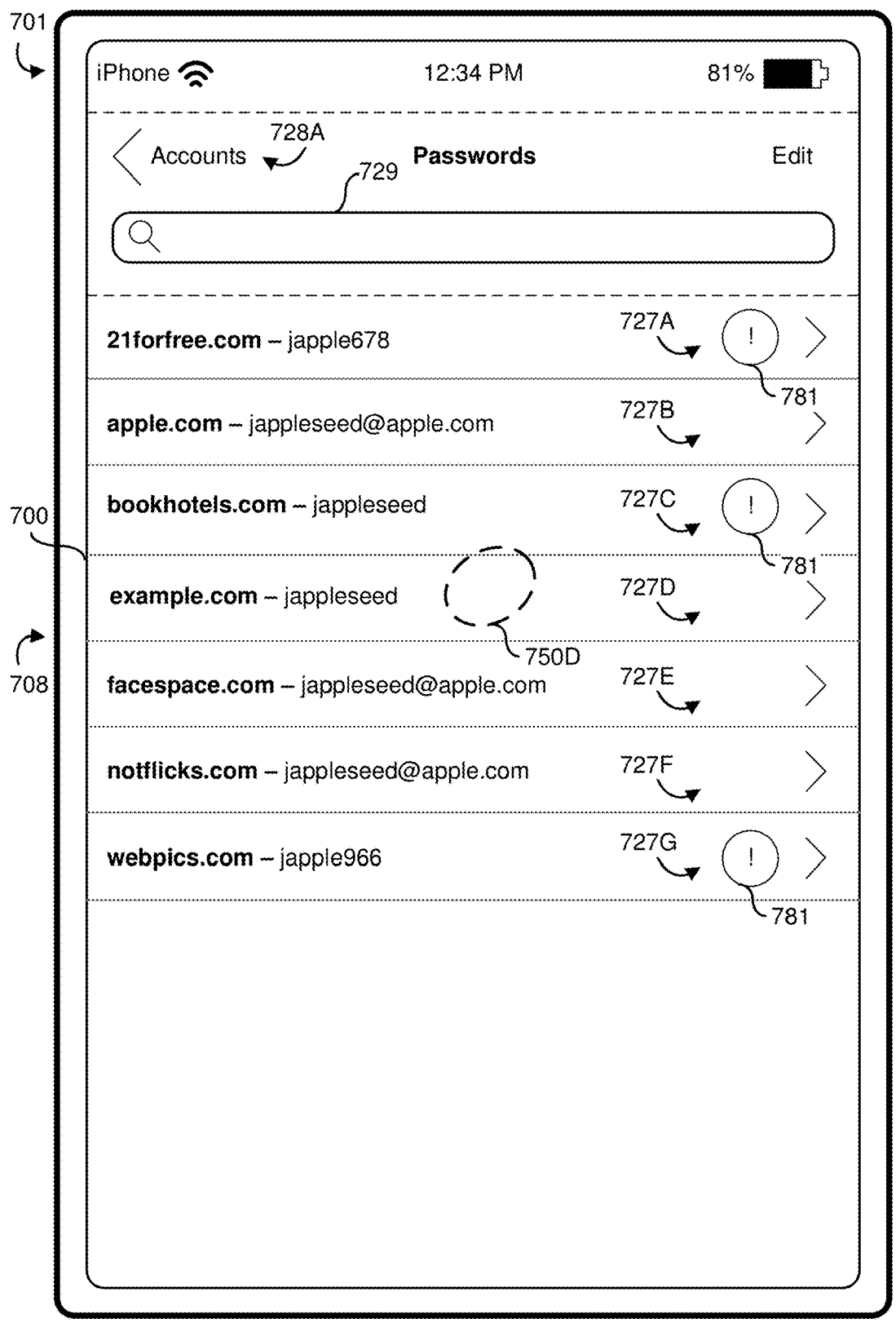

FIG. 7D illustrates the user interface 700 in response to detecting the contact 750C at the location of the password list affordance 726A. In FIG. 7D, the password management user interface 703 is replaced with a password list user interface 708. The password list user interface 708 includes a list of user account affordances 727A-727G respectively associated with a plurality of user accounts for a respective plurality of services and authentication credentials for those user accounts. A few of the user account affordances 727A, 727C, 727G include an alert marker 781 indicating the password associated with the respective user account is the same as the password associated with one or more other user accounts.

In various implementations, a toggle affordance is provided that allows a user to toggle the display of alert markers 781. Further, in some implementations, even when two user accounts have the same password, an alert marker 781 is not shown in either user account affordance when the two user accounts are determined to be affiliated and share authentication credentials. For example, if facespace.com and hotels4less.com are affiliated, e.g., owned by the same entity and/or known to use the same authentication credentials, no alert marker 781 is illustrated in either user account affordance 727E-727F.

The password list user interface 708 includes a search field 729 for receiving a text input and searching the plurality of user accounts based on the text input. The password list user interface 708 includes a return affordance 728A for returning to the password management user interface 703.

FIG. 7D illustrates a contact 750D detected at the location of a fourth user account affordance 727D.

Figure 7E:
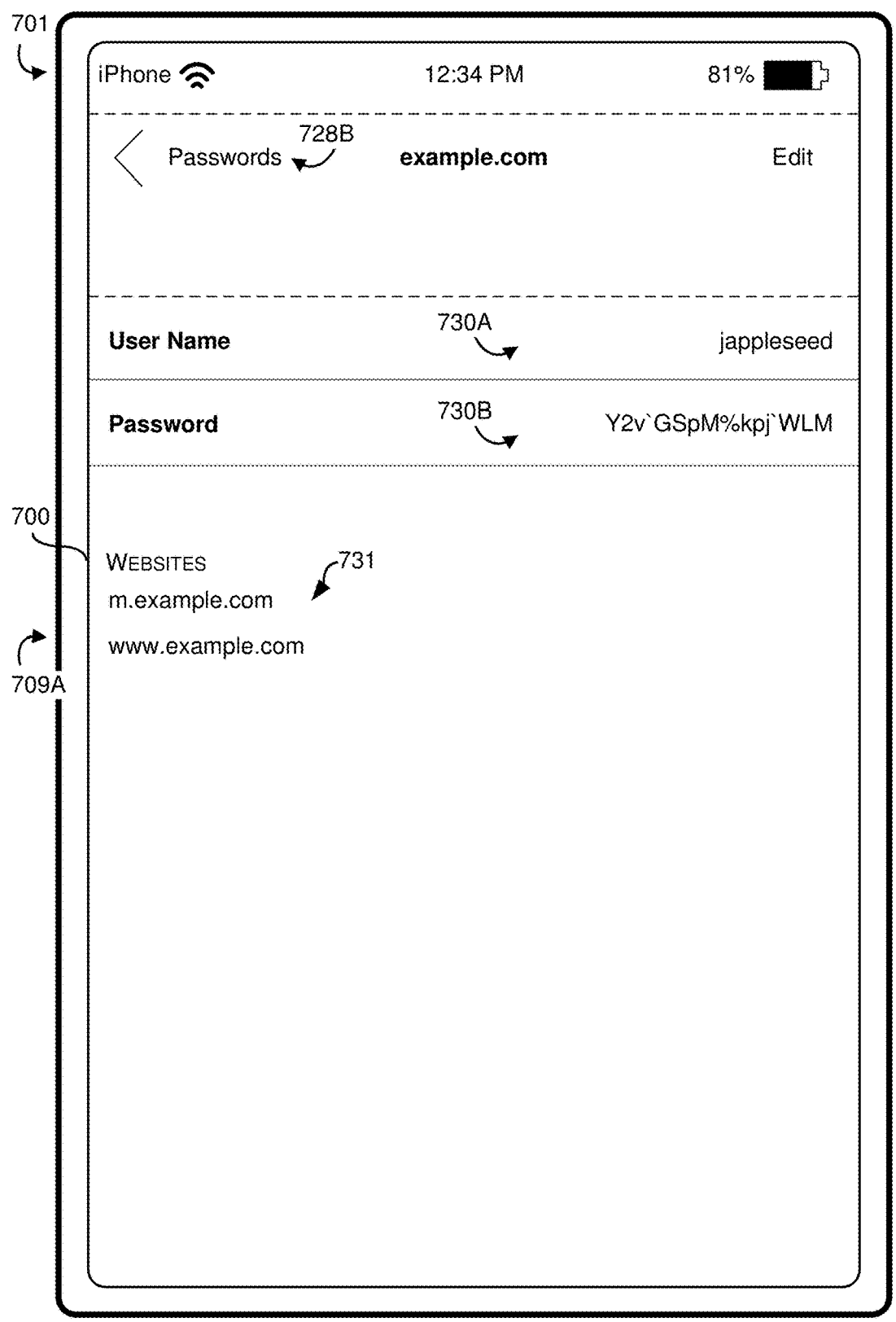

FIG. 7E illustrates the user interface 700 in response to detecting the contact at the location of the fourth user account affordance 727D. In FIG. 7E, the password list user interface 708 is replaced with a password details user interface 709A for a first user account for a first service. The password details user interface 709A includes a username affordance 730A including text indicating the username associated with the first user account of the first service and a password affordance 730B including text indicating the password associated with the first user account. The password details user interface 709A includes text indicative of websites 731A associated with the first service. The password details user interface 709A includes a return affordance 728B for returning to the password list user interface 708.

Figure 7F:
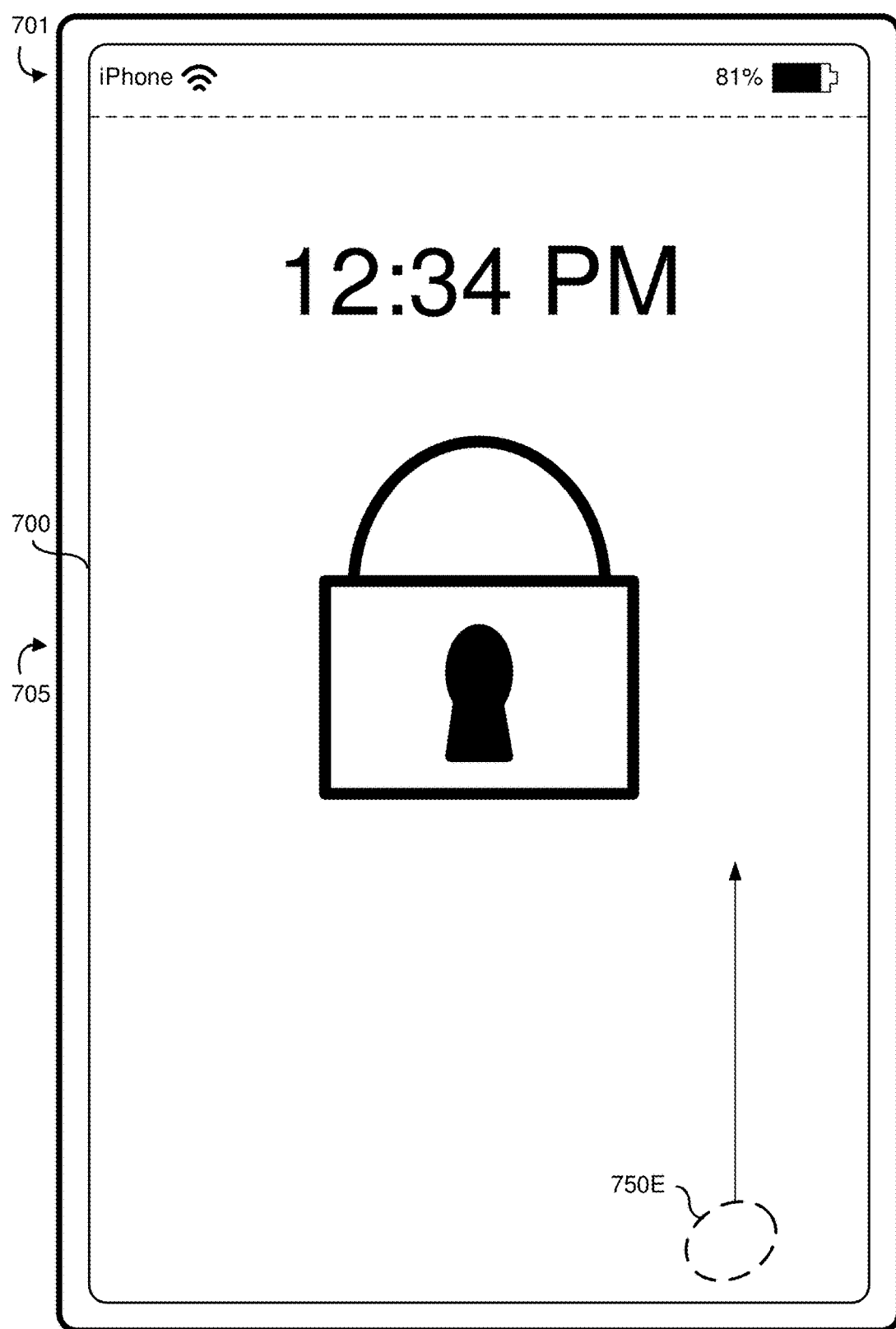

FIG. 7F illustrates a lock screen user interface 705 as part of a user interface 700 displayed by the portable multifunctional device 100 (hereinafter "device 100"). The user interface 700 includes, in addition to the lock screen user interface 705, a device bar 701 at the top of the display including an identifier of the device 100 (e.g., "iPhone"), a wireless connection indicator, a current time, and a battery indicator indicating a charge level of the device 100. In various implementations, the lock screen user interface 705 is displayed while the device 100 is in a locked state.

FIG. 7F illustrates a contact 750E detected moving upwards from a location near the bottom of the display.

Figure 7G:
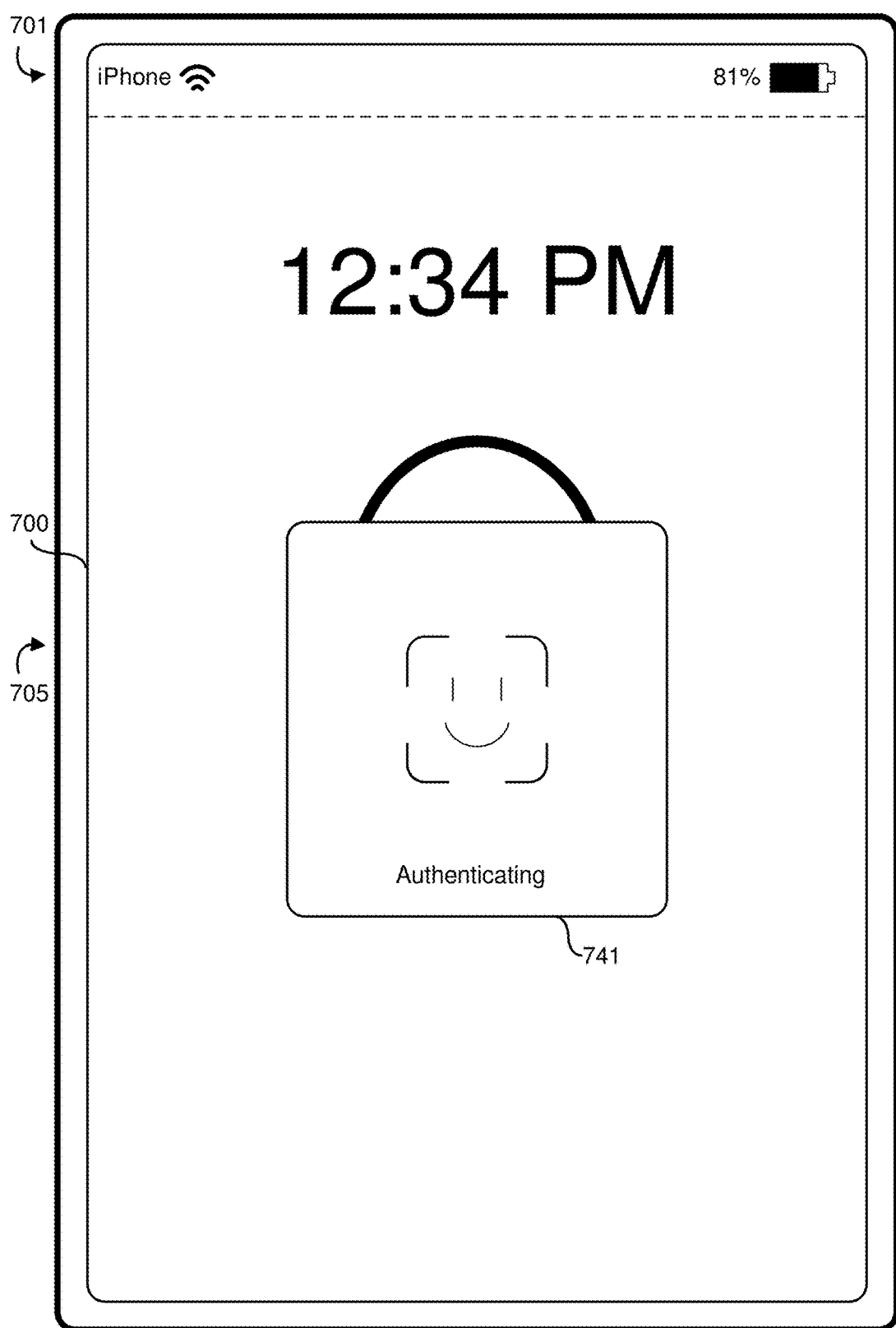

FIG. 7G illustrates the user interface 700 of FIG. 7F in response to detecting the contact 750E moving upwards from a location near the bottom of the display. In FIG. 7G, an authenticating window 741 is displayed indicating that an authentication process for authenticating the user is being performed. In various implementations, the authentication process includes receiving authentication information and authenticating a user based on the authentication information. In various implementations, the authentication information is a biometric of the user, such as one or more facial features or a fingerprint. Thus, in various implementations, the authentication information is received via a camera (e.g., a depth camera) or a fingerprint sensor. In various implementations, the authentication information is a passcode or password provided by the user. Thus, in various implementations, the authentication information is provided received via a touch-sensitive surface.

Figure 7H:
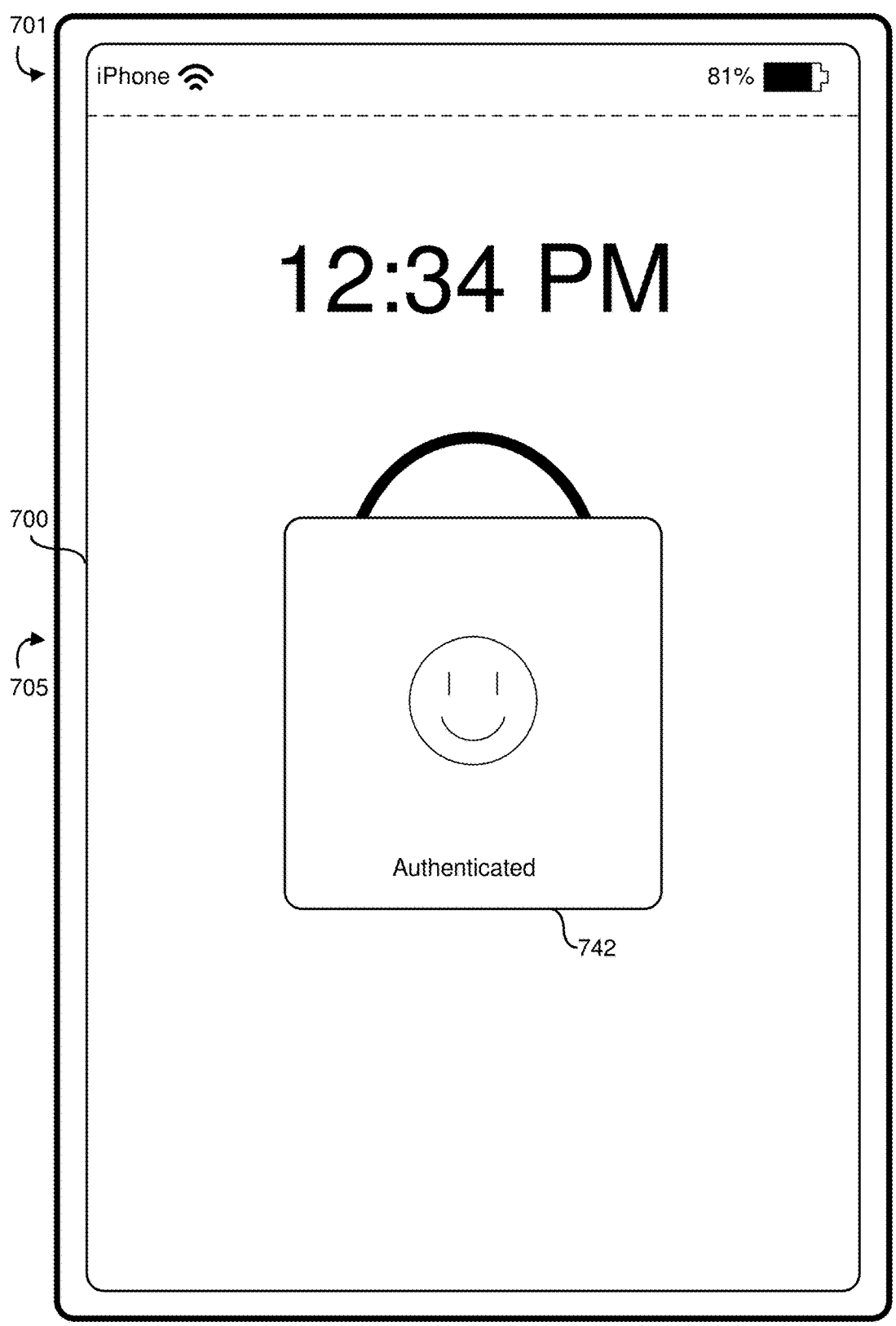

FIG. 7H illustrates the user interface 700 of FIG. 7G in response to authenticating the user. In FIG. 7H, the authenticating window 741 is replaced with an authenticated window 742.

Figure 7I:
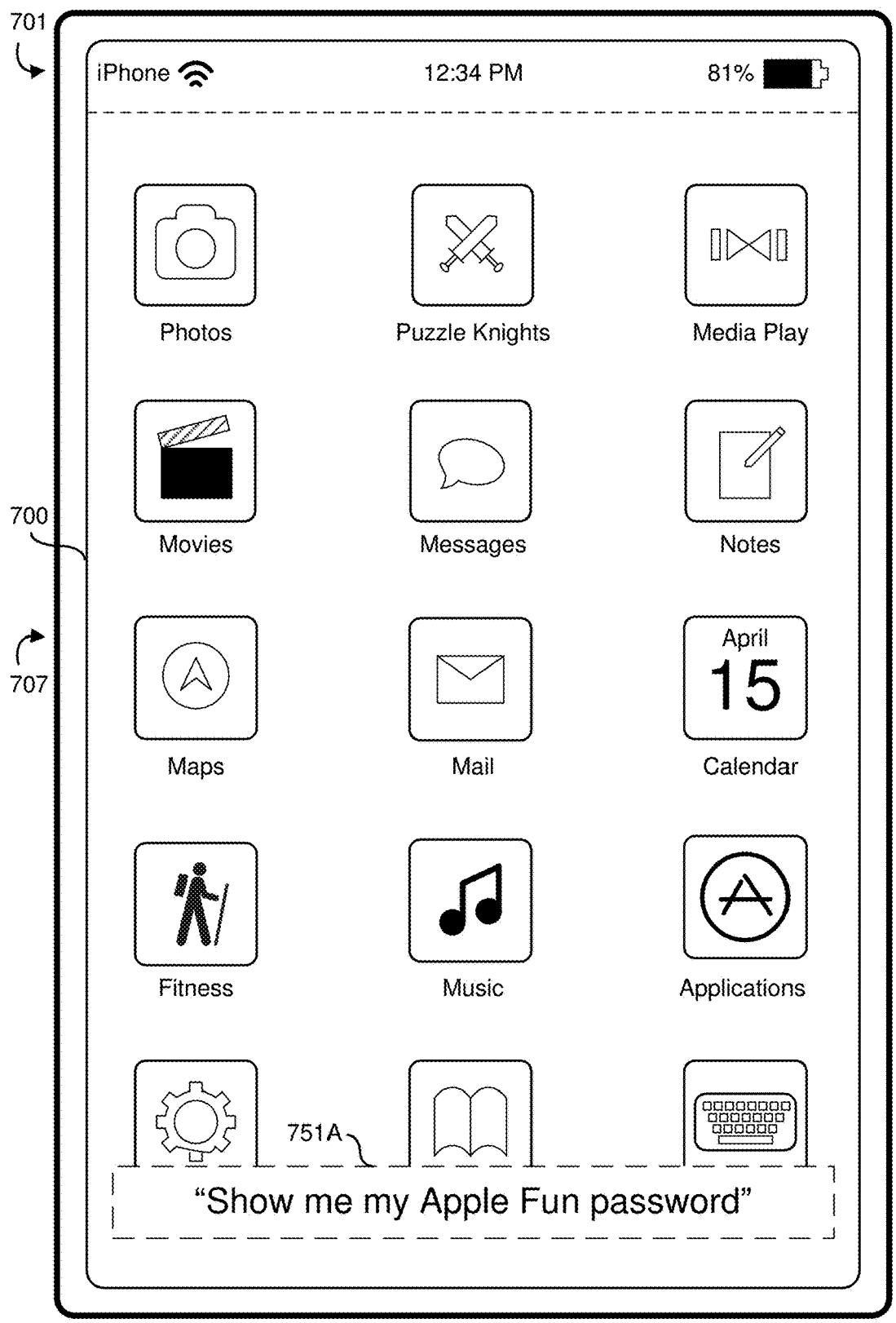

FIG. 7I illustrates the user interface 700 of FIG. 7H after unlocking the device (e.g., placing the device 100 in an unlocked state) in response to authenticating the user. In FIG. 7I, the lock screen user interface 705 is replaced with the application launcher user interface 707.

FIG. 7I illustrates a verbal request 751A detected by the device 100. In various implementations, the verbal request 751A is displayed as part of the user interface 700. In various implementations, the verbal request 751A is not displayed. In FIG. 7I, the verbal request 751A is a verbal request to display password information for a first user account.

Figure 7J:
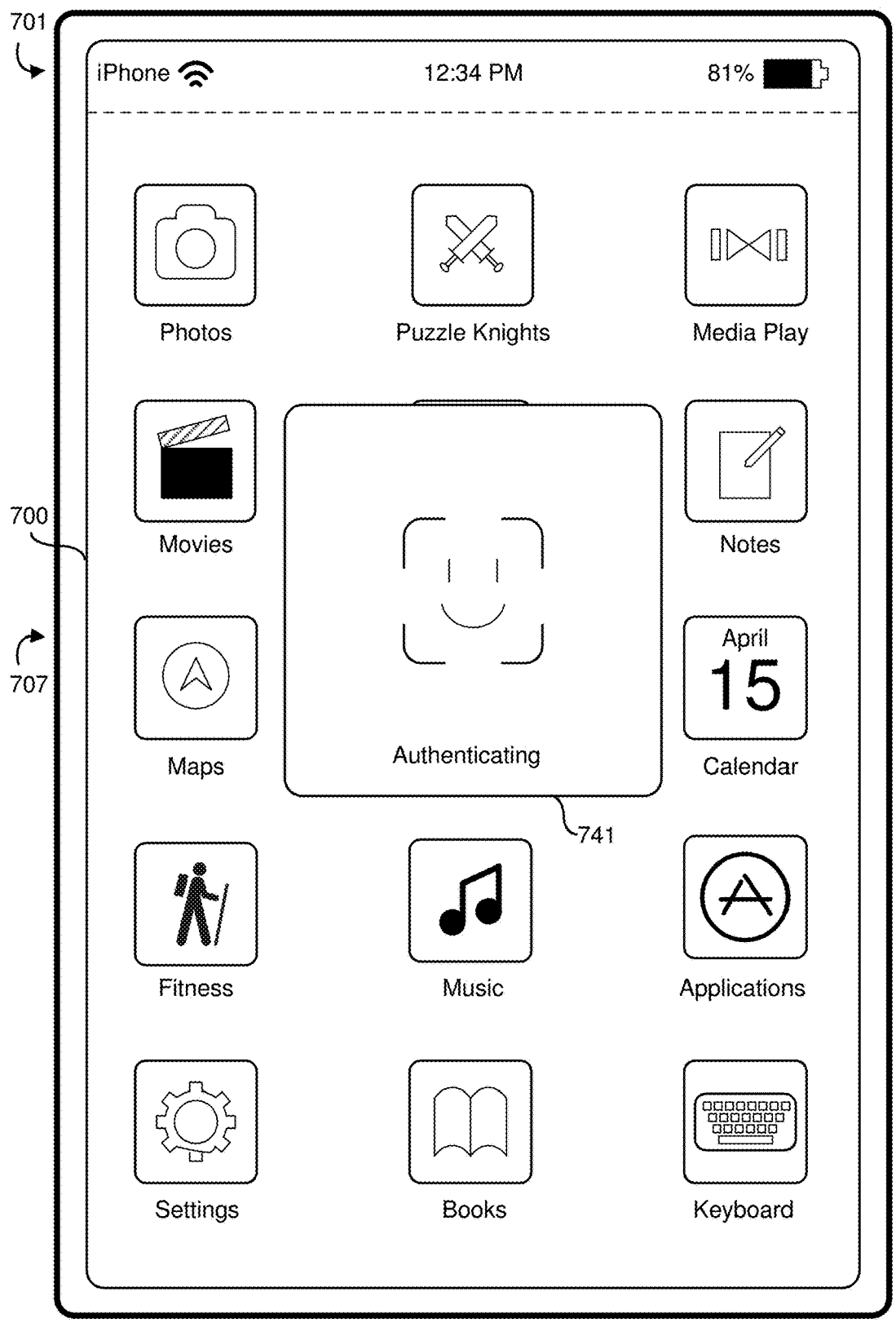

FIG. 7J illustrates the user interface 700 of FIG. 7I in response to detecting the verbal request 751A to display the password information for the first user account. In FIG. 7J, an authenticating window 741 is displayed indicating that an authentication process for authenticating the user is being performed. Accordingly, in various implementations, even when the device 100 is in an unlocked state, the authentication process is performed before password information is displayed. As noted above, in various implementations, the authentication process includes receiving authentication information and authenticating a user based on the authentication information. In various implementations, authentication information suitable to unlock the device (e.g., a passcode) is unsuitable to display password information, which may, for example, require more secure authentication information (e.g., a biometric of the user). However, in various implementations, the authentication information suitable to display password information includes a passcode (e.g., if biometric authentication fails or is not configured).

Figure 7K:
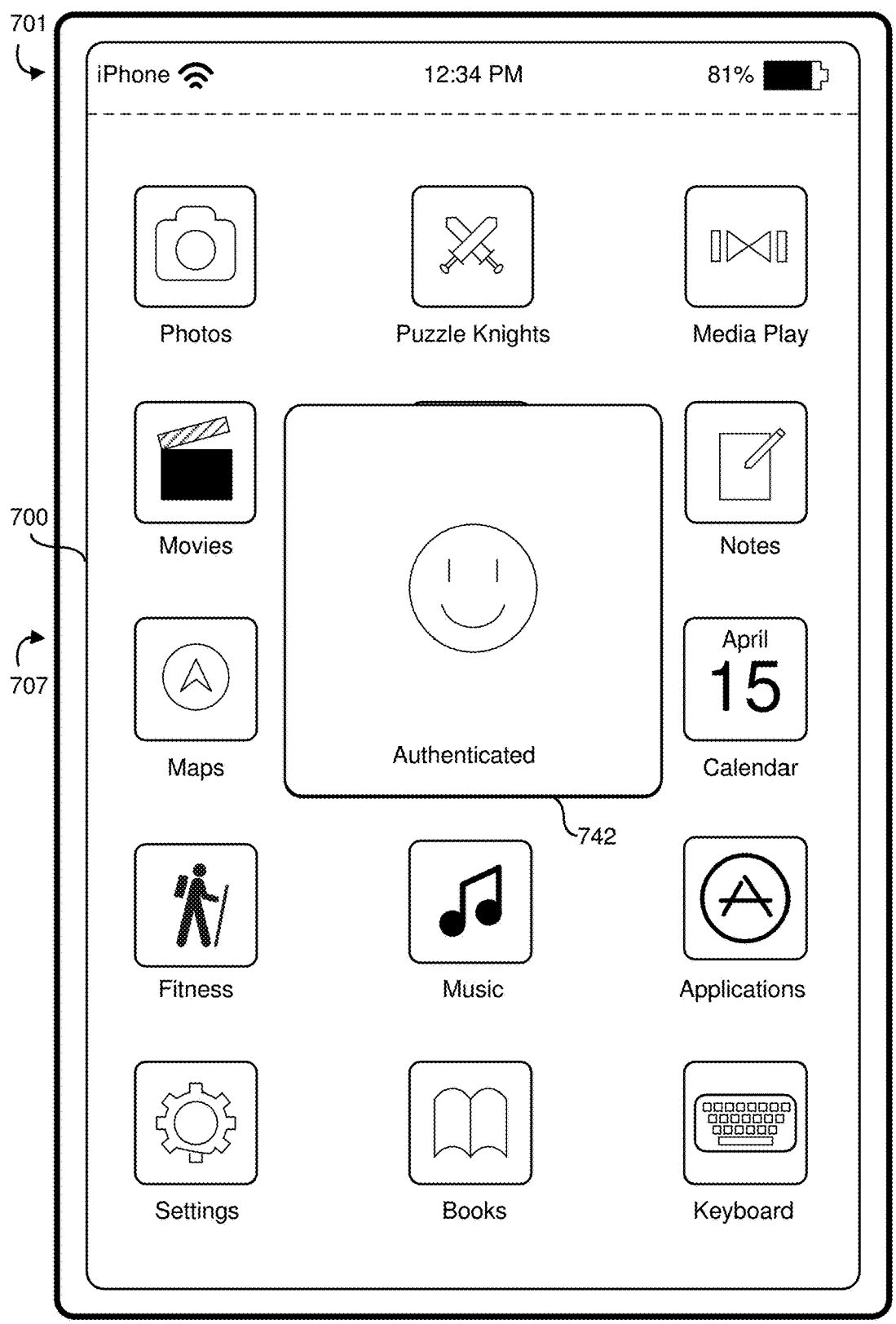

FIG. 7K illustrates the user interface 700 of FIG. 7J in response to authenticating the user. In FIG. 7K, the authenticating window 741 is replaced with the authenticated window 742.

Figure 7L:
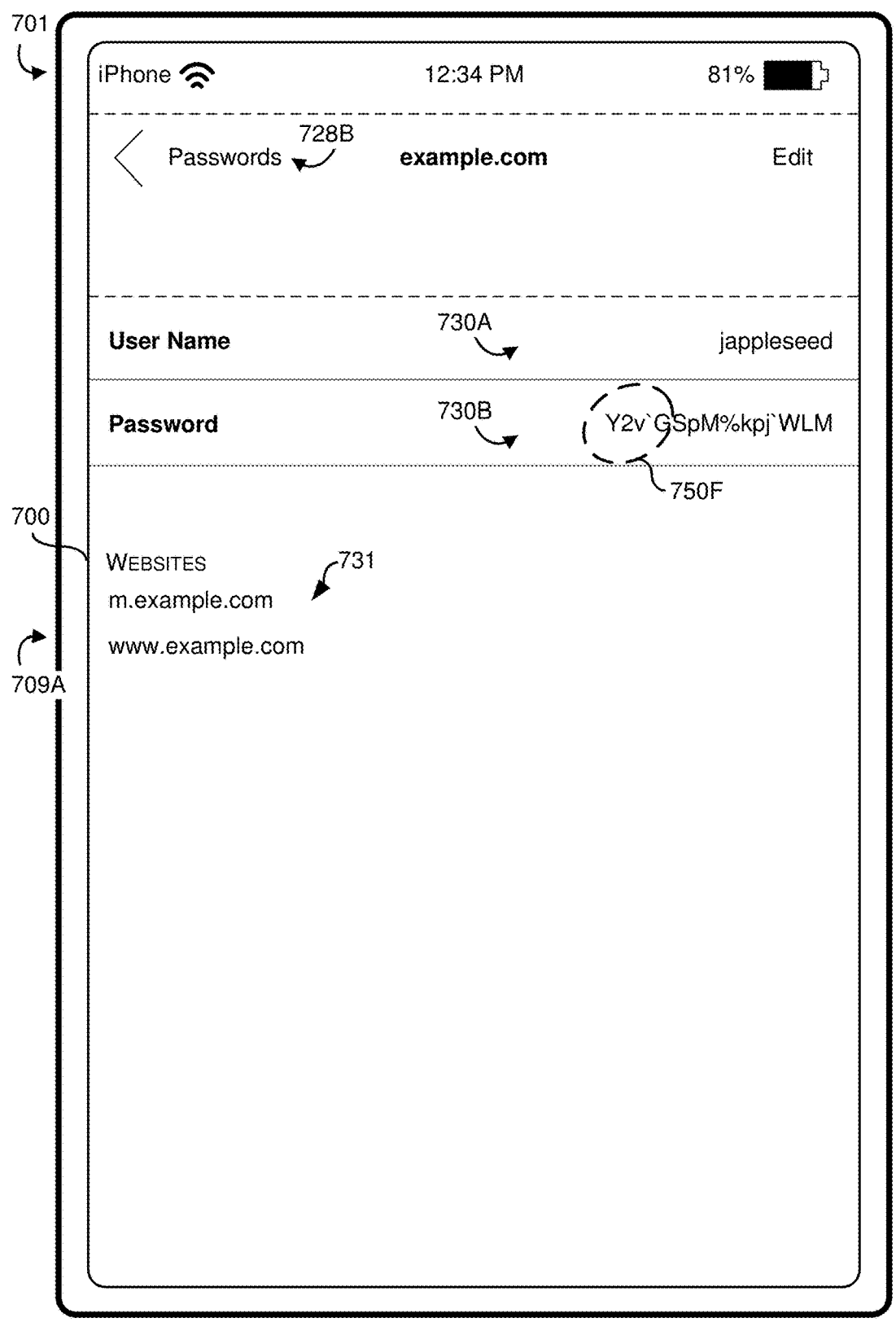

FIG. 7L illustrates the user interface 700 of FIG. 7K in response to authenticating the user and responding to the verbal request 751A. In FIG. 7L, the application launcher user interface 705 is replaced with the password details user interface 709A.

FIG. 7L illustrates a contact 750F detected at the location of password affordance 730B.

Figure 7M:
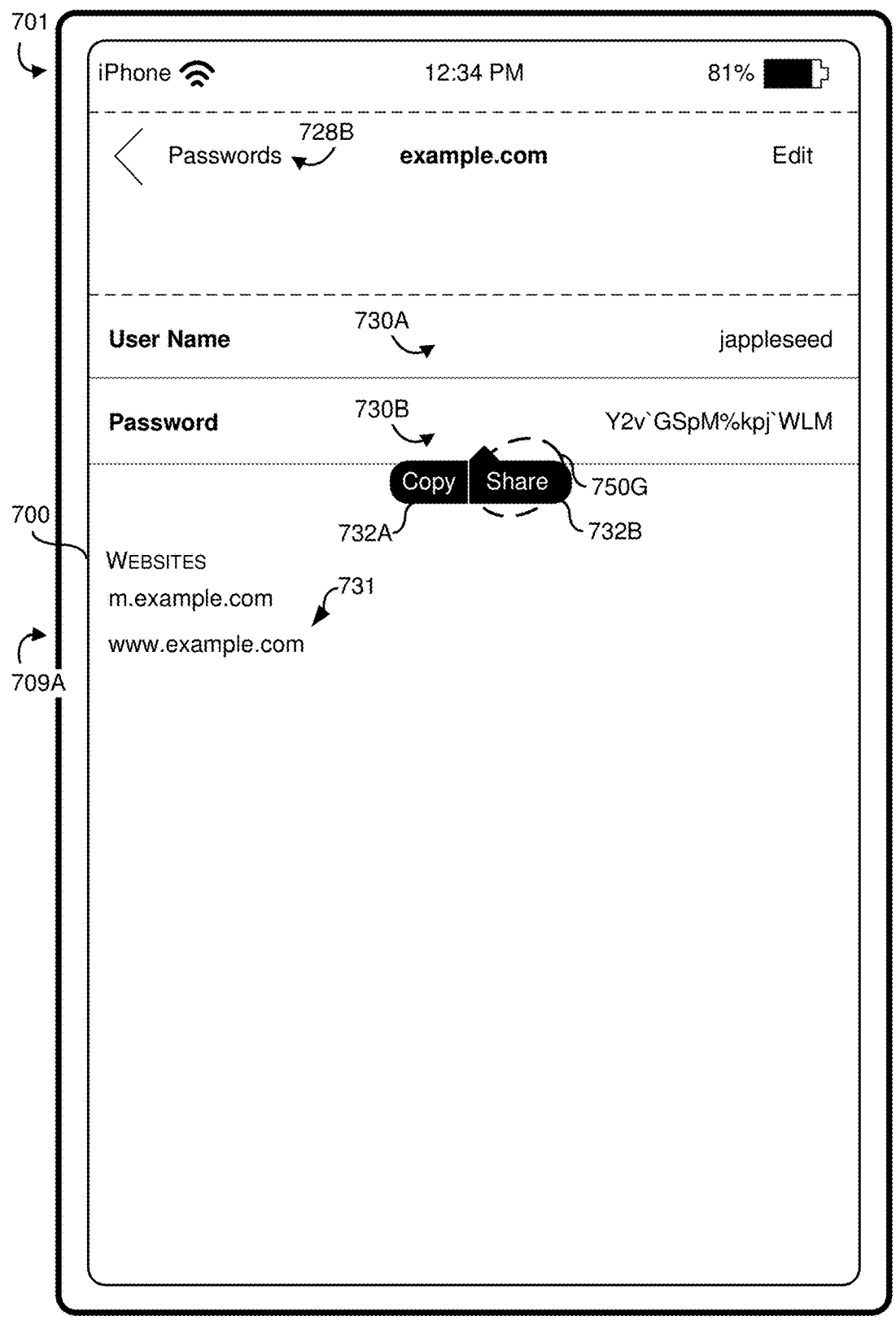

FIG. 7M illustrates the user interface 700 of FIG. 7L in response to detecting the contact 750F at the location of the password affordance 730B. In response to detecting the contact 750F at the location of the password affordance 730B, the user interface 700 includes a copy affordance 732A that, when selected, stores the password associated with the first user account in a cache (e.g., copies the password to a clipboard) and a share affordance 732B that, when selected, initiates a process for sharing the password (and/or other authentication credentials) associated with the first user account.

FIG. 7M illustrates a contact 750G detected at the location of the share affordance 732B.

Figure 7N:
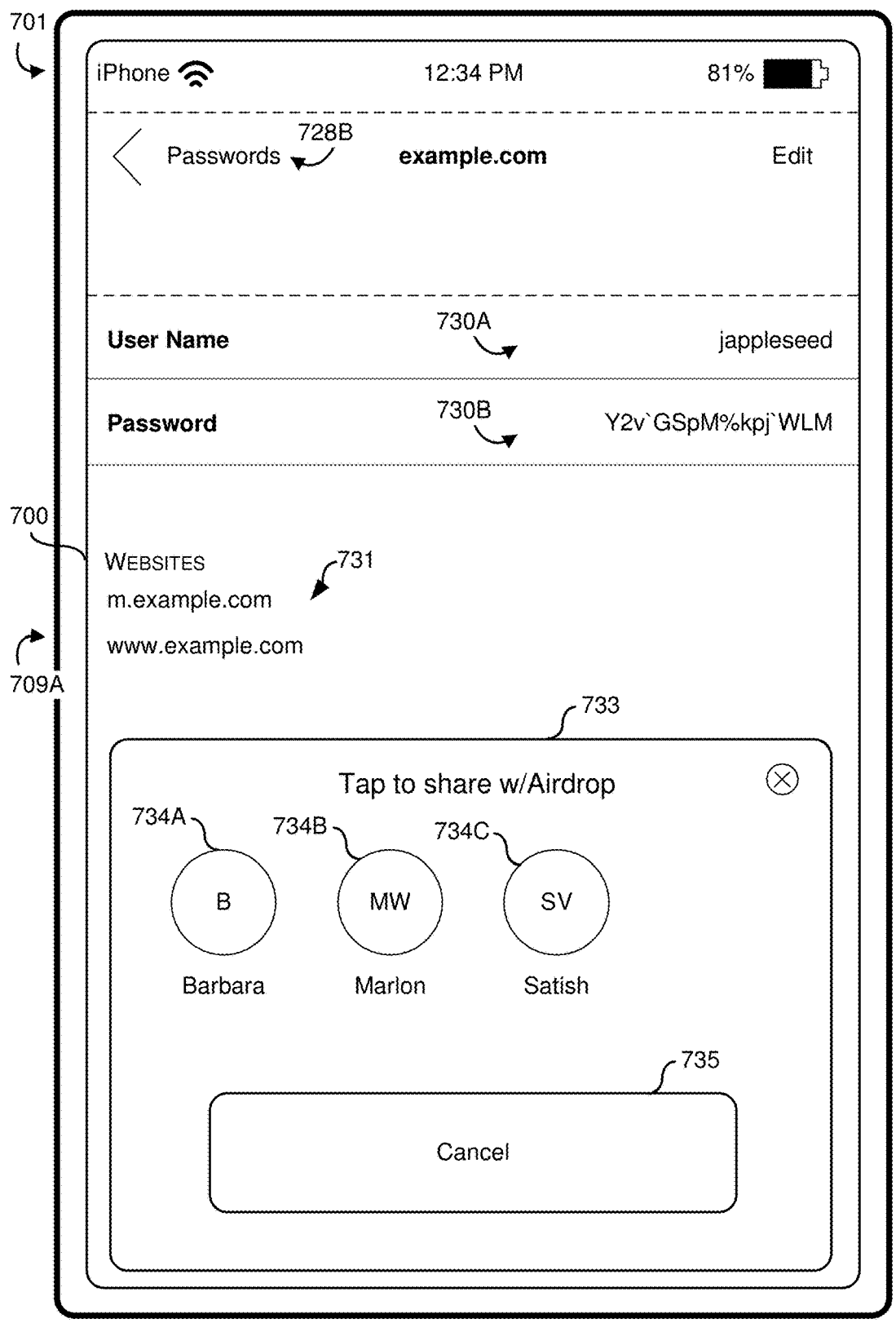

FIG. 7N illustrates the user interface 700 of FIG. 7M in response to detecting the contact 750G at the location of the share affordance 732B. In FIG. 7N, the user interface 700 includes a recipient selection card 733 that includes a plurality of recipient affordances 734A-734C that, when selected initiates a process for sharing the password (and/or other authentication credentials) associated with the first user account with a respective recipient. In various implementations, the recipient selection card 733 includes recipient affordances for nearby devices. In various implementations, the recipient selection card 733 includes recipient affordances for contacts stored by the device 100.

In various implementations, the device 100 displays verification information (e.g., a sequence of characters and/or visual pattern) that is required to be entered into the device 100 (e.g., via a keyboard or for a visual pattern, a camera) before the password (and/or other authentication credentials) is shared with the recipient device. In various implementations, the recipient device displays verification information (e.g., a sequence of characters and/or visual pattern) that is required to be entered (e.g., via a keyboard or for a visual pattern, a camera) into the device 100 before the password (and/or other authentication credentials) is shared with the recipient device. An example of requiring verification information from one device to be input in another device is described above with reference FIGS. 6A-6H.

Figure 7O:
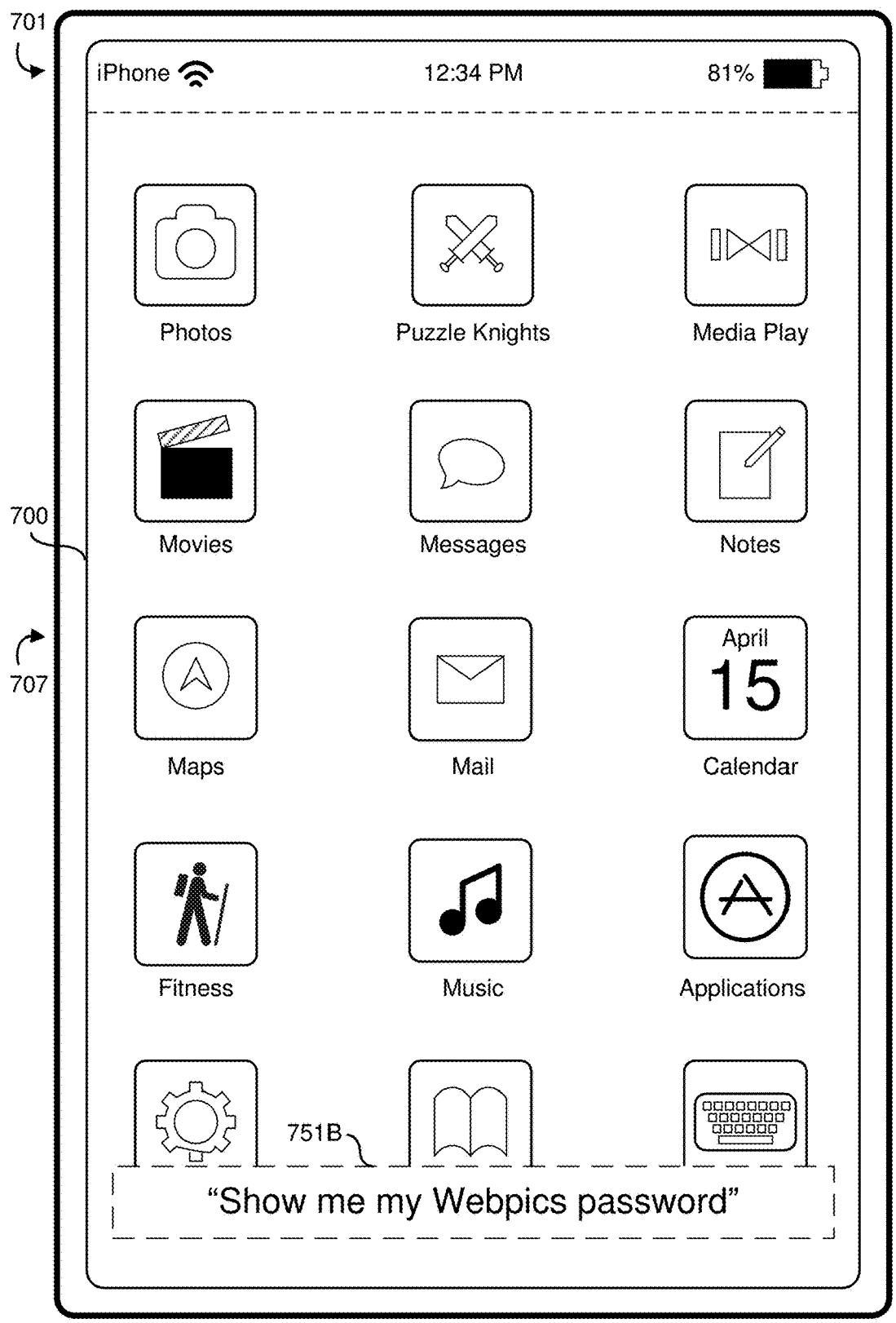

As compared to FIG. 7I, FIG. 7O illustrates another embodiment of the user interface 700 of FIG. 7H after unlocking the device (e.g., placing the device 100 in an unlocked state) in response to authenticating the user. In FIG. 7O, the lock screen user interface 705 is replaced with the application launcher user interface 707.

FIG. 7O illustrates a verbal request 751B detected by the device 100. In various implementations, the verbal request 751B is displayed as part of the user interface 700. In various implementations, the verbal request 751B is not displayed.

In FIG. 7O, the verbal request 751B is a verbal request to display password information for a second user account.

Figure 7P:
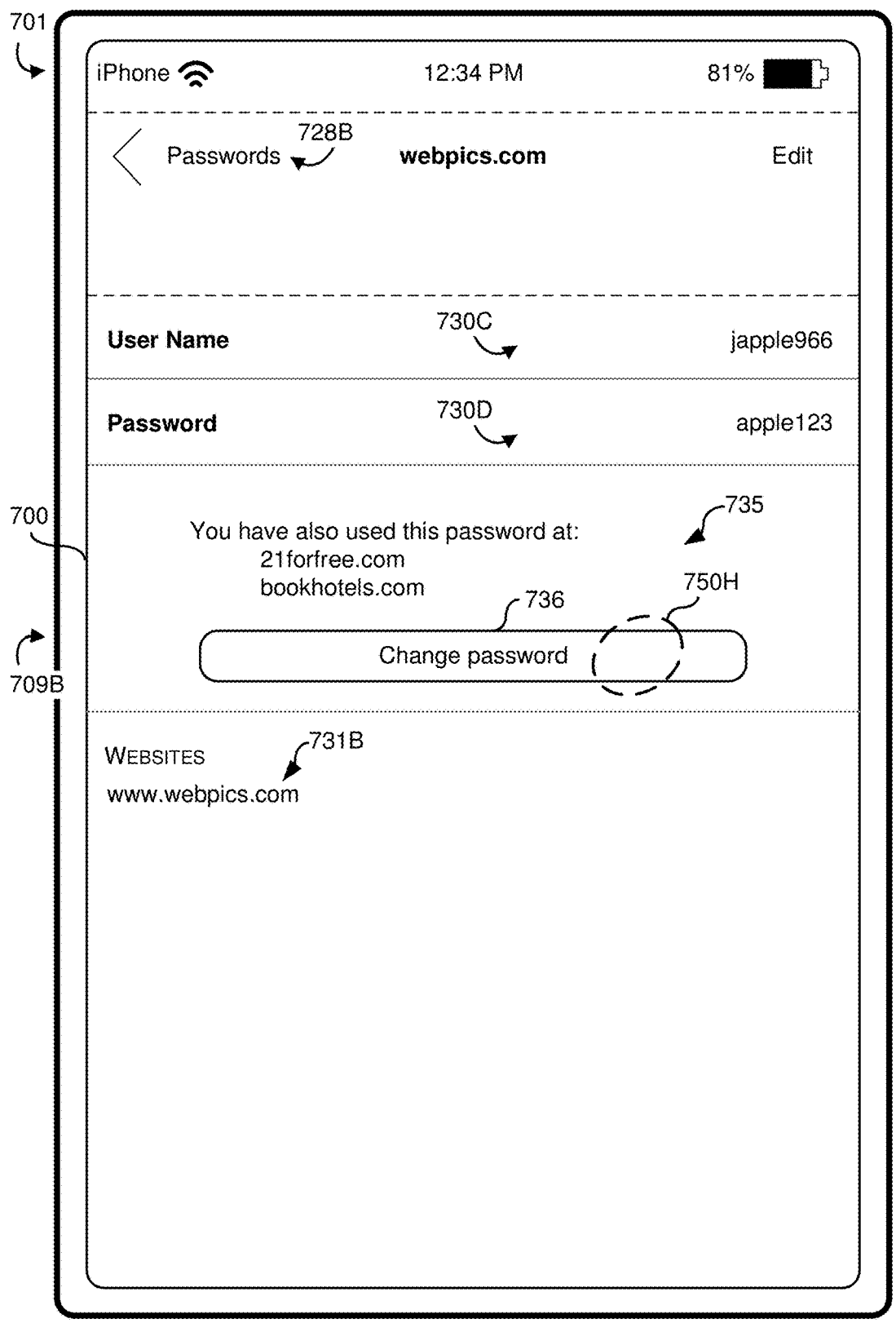

FIG. 7P illustrates the user interface 700 of FIG. 7O in response to authenticating the user and responding to the verbal request 751B. In FIG. 7P, the application launcher user interface 705 is replaced with the password details user interface 709B for a second user account for a second service. The password details user interface 709B includes a username affordance 730C including text indicating the username associated with the second user account of the second service and a password affordance 730D including text indicating the password associated with the second user account. The password details user interface 709B includes text indicative of websites 731B associated with the second service. The password details user interface 709B includes a return affordance 728B for returning to the password list user interface 708.

The password details user interface 709B includes an alert 735 indicating that the password associated with the second user account is the same as a password associated with one or more other accounts. The alert 735 includes a change-password affordance 736 that, when selected, displays a resource, e.g., a webpage or an application, for changing the password for the second account. In various implementations, the change-password affordance 736 links to a general webpage/application, whereas in various implementations, the change-password affordance 736 links to a password change user interface of the webpage/application. In some embodiments, multiple services place a password change user interface under a commonly named path, e.g., ".well-known/change-password" and the change-password affordance 736 links to this path.

FIG. 7P illustrates a contact 750H detected at the location of the change-password affordance 736.

Figure 7Q:

FIG. 7Q illustrates the user interface 700 of FIG. 7P in response to detecting the contact 750H at the location of the change-password affordance 736. In FIG. 7Q, the password details user interface 709B is replaced with a web browser user interface 702 including a user interface for changing the password of the second user account.

Figure 7R:
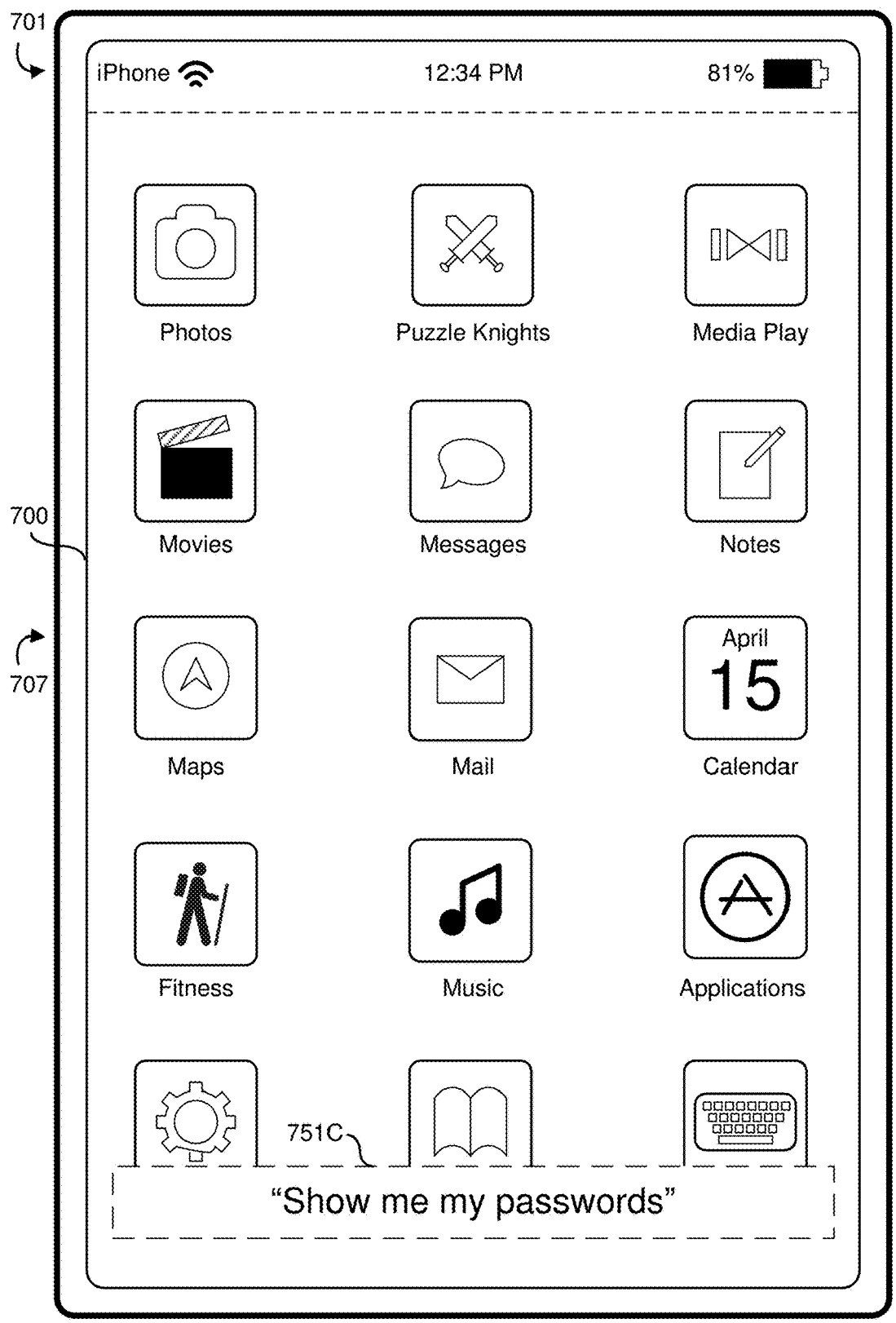

As compared to FIG. 7I, FIG. 7R illustrates another embodiment of the user interface 700 of FIG. 7H after unlocking the device (e.g., placing the device 100 in an unlocked state) in response to authenticating the user. In FIG. 7R, the lock screen user interface 705 is replaced with the application launcher user interface 707.

FIG. 7R illustrates a verbal request 751C detected by the device 100. In various implementations, the verbal request 751C is displayed as part of the user interface 700. In various implementations, the verbal request 751C is not displayed. In FIG. 7R, the verbal request 751C is a verbal request to display general password information.

Figure 7S:
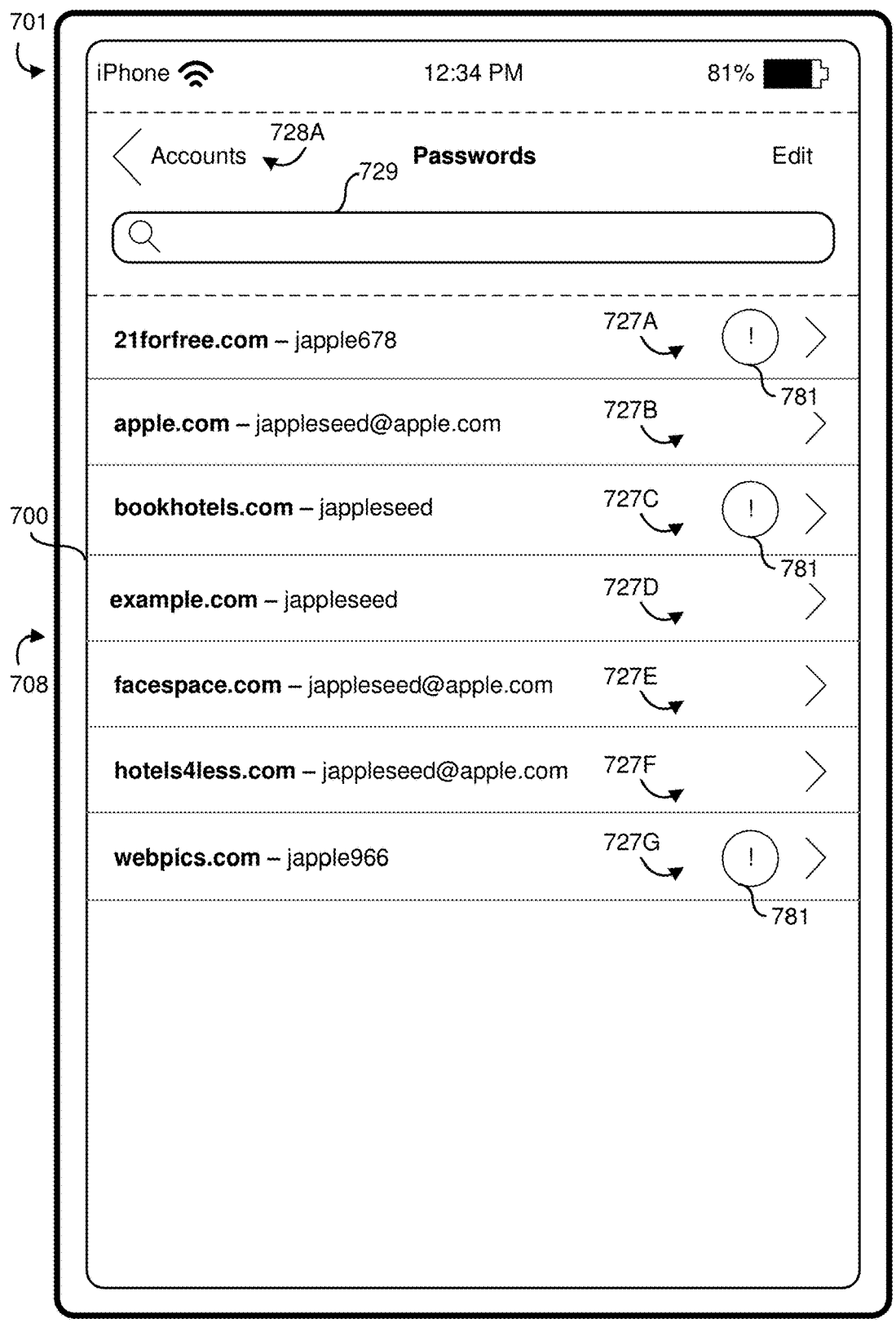

FIG. 7S illustrates the user interface 700 of FIG. 7O in response to authenticating the user and responding to the verbal request 751C. In FIG. 7S, the application launcher user interface 707 is replaced with the password list user interface 708 (as described in detail above with respect to FIG. 7D).

Figure 7T:
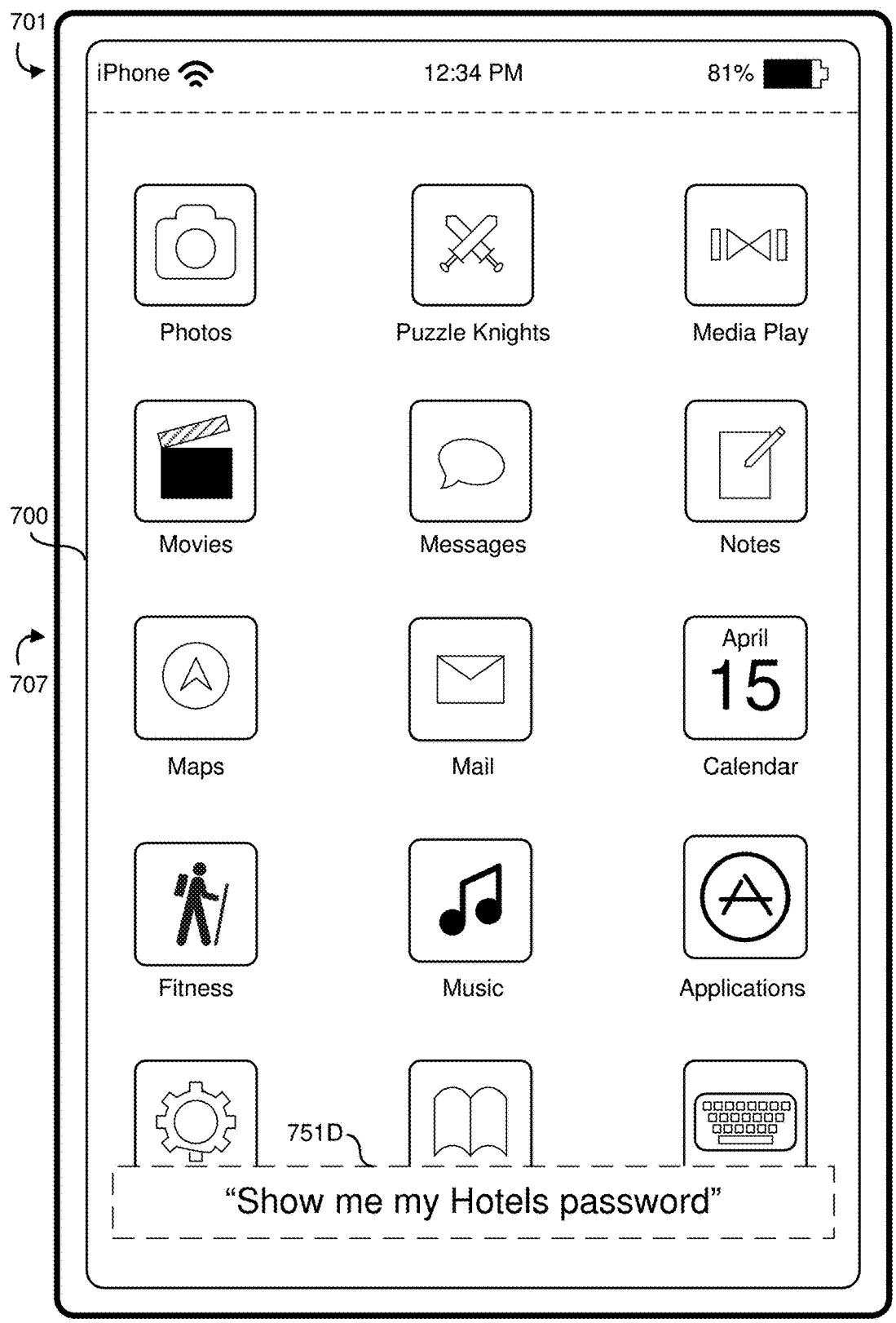

As compared to FIG. 7I, FIG. 7T illustrates another embodiment of the user interface 700 of FIG. 7H after unlocking the device (e.g., placing the device 100 in an unlocked state) in response to authenticating the user. In FIG. 7T, the lock screen user interface 705 is replaced with the application launcher user interface 707.

FIG. 7T illustrates a verbal request 751D detected by the device 100. In various implementations, the verbal request 751D is displayed as part of the user interface 700. In various implementations, the verbal request 751D is not displayed. In FIG. 7T, the verbal request 751D is a verbal request to display password information for a third user account.

Figure 7U:
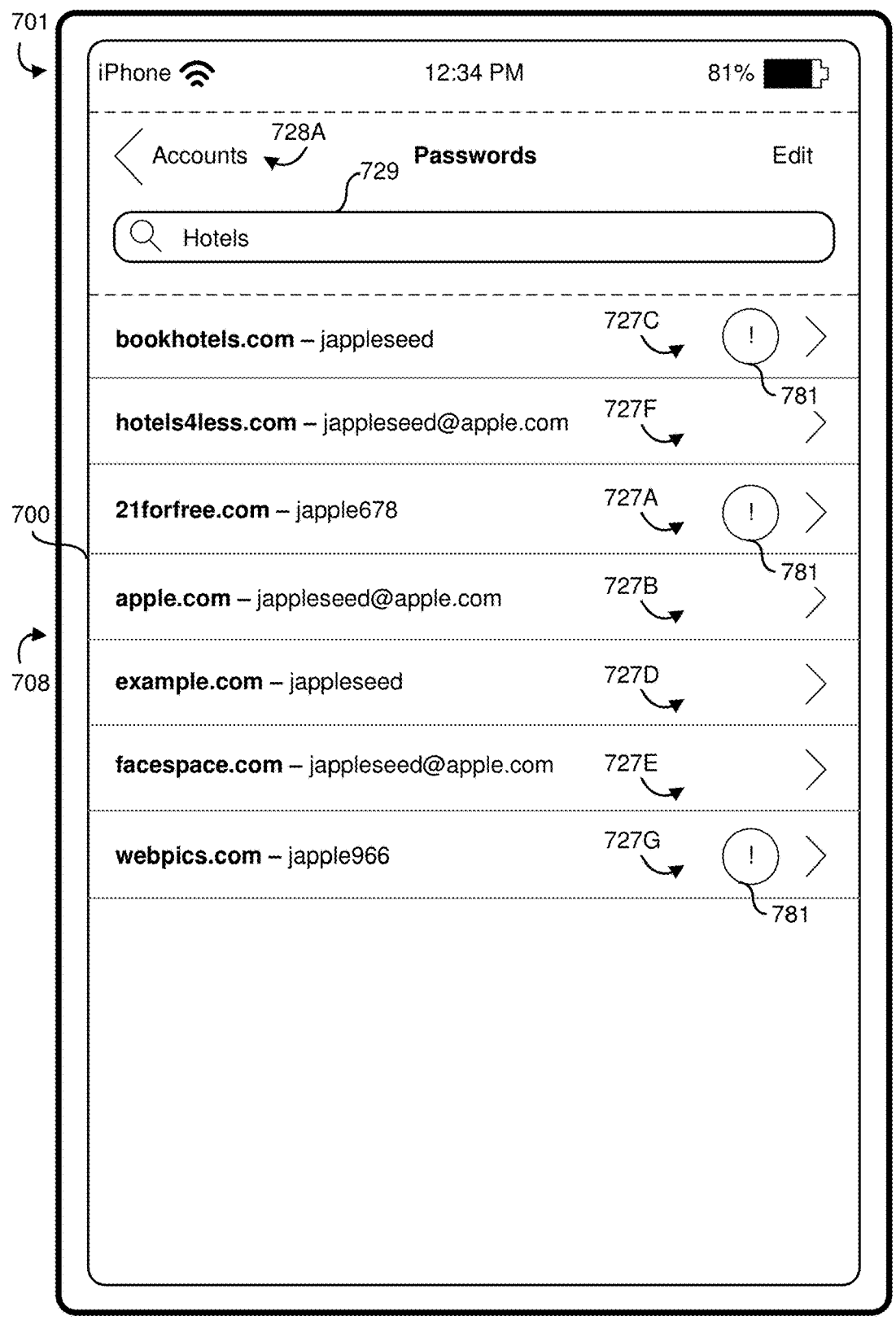

FIG. 7U illustrates the user interface 700 of FIG. 7T in response to authenticating the user and responding to the verbal request 751D. Because the third user account is not one of the user accounts of the list of user accounts 727A-727G, the application launcher user interface 707 is replaced with the password list user interface 708 (as described in detail above with respect to FIG. 7D) rather than a password details user interface 709A-709B. However, in FIG. 7U, the search field 729 is prepopulated based on the verbal request and the list of user accounts 727A-727G is sorted based on the prepopulation of the search field 729. In some embodiments, the list of user accounts is filtered based on the prepopulation of the search field 729 such that user accounts not matching the prepopulation of the search field 729 are not displayed.

Figure 7V:
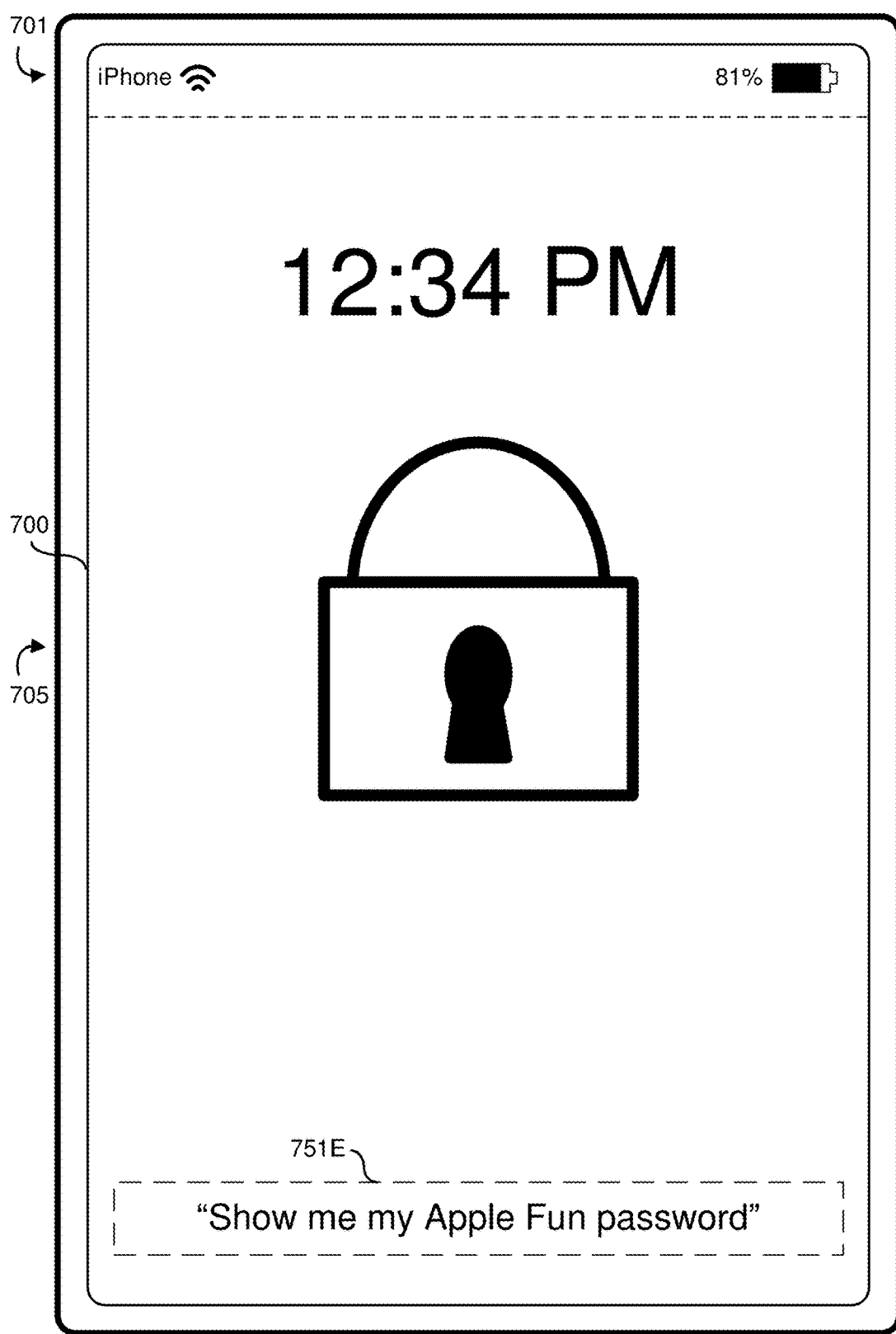

As compared to FIG. 7F, FIG. 7V illustrates a lock screen user interface 705 as part of a user interface 700 displayed by the portable multifunctional device 100 (hereinafter "device 100").

FIG. 7V illustrates a verbal request 751E detected by the device 100. In various implementations, the verbal request 751E is displayed as part of the user interface 700. In various implementations, the verbal request 751E is not displayed. In FIG. 7V, the verbal request 751D is a verbal request to display password information for the first user account.

Figure 7W:
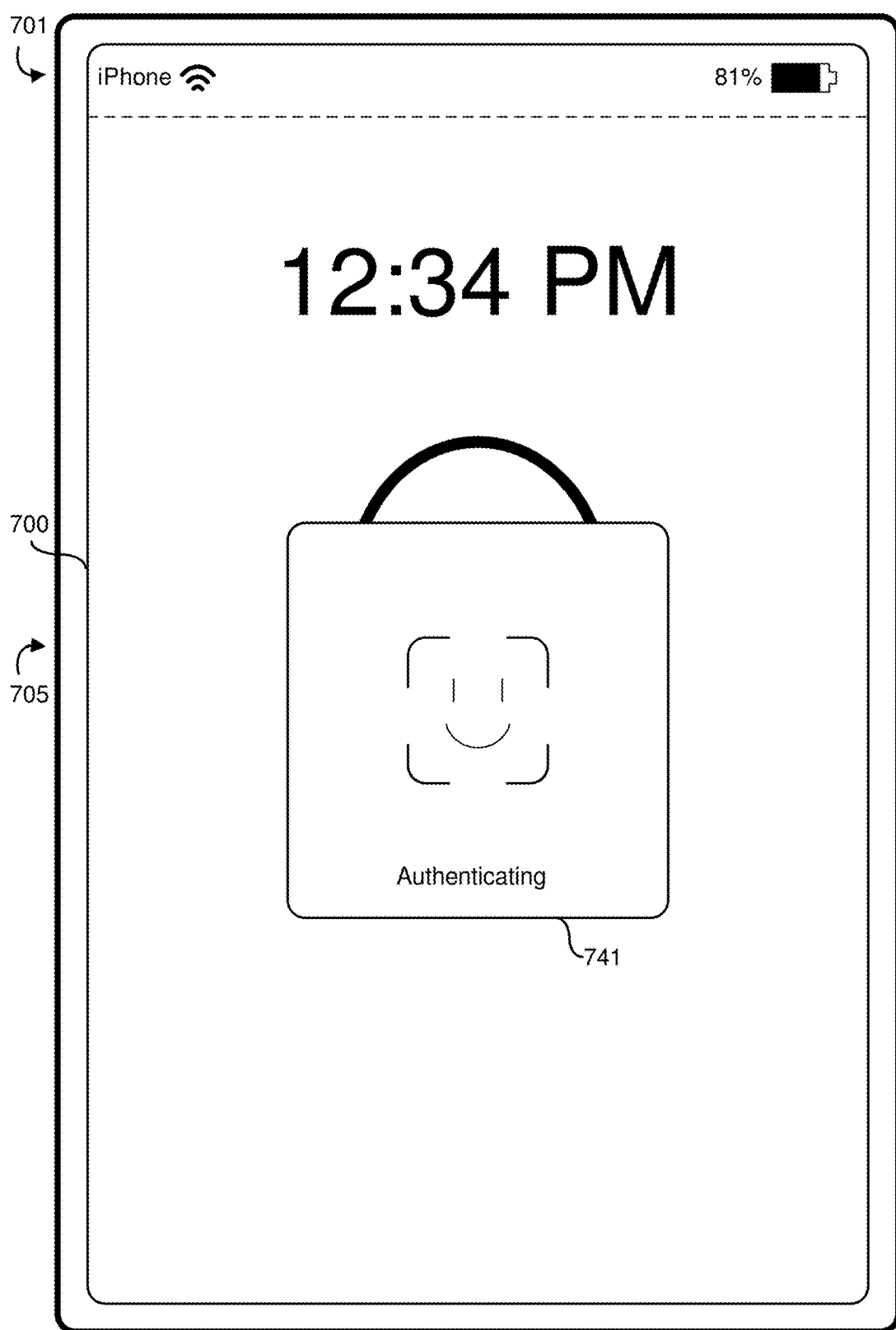

FIG. 7W illustrates the user interface of FIG. 7V in response to detecting the verbal request to display password information for the first user account. In FIG. 7W, an authenticating window 741 is displayed indicating that an authentication process for authenticating the user is being performed.

Figure 7X:
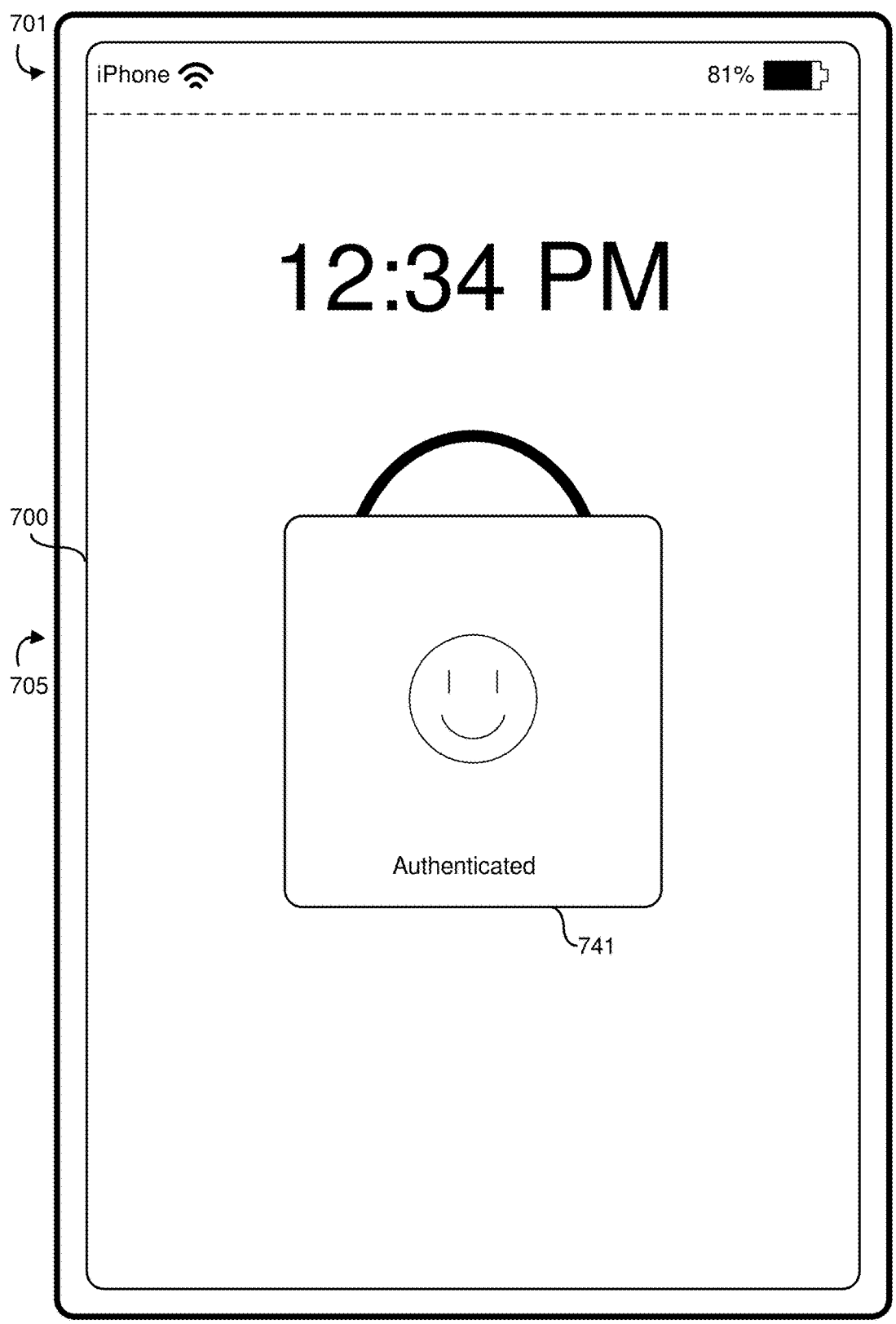
Figure 7Y:
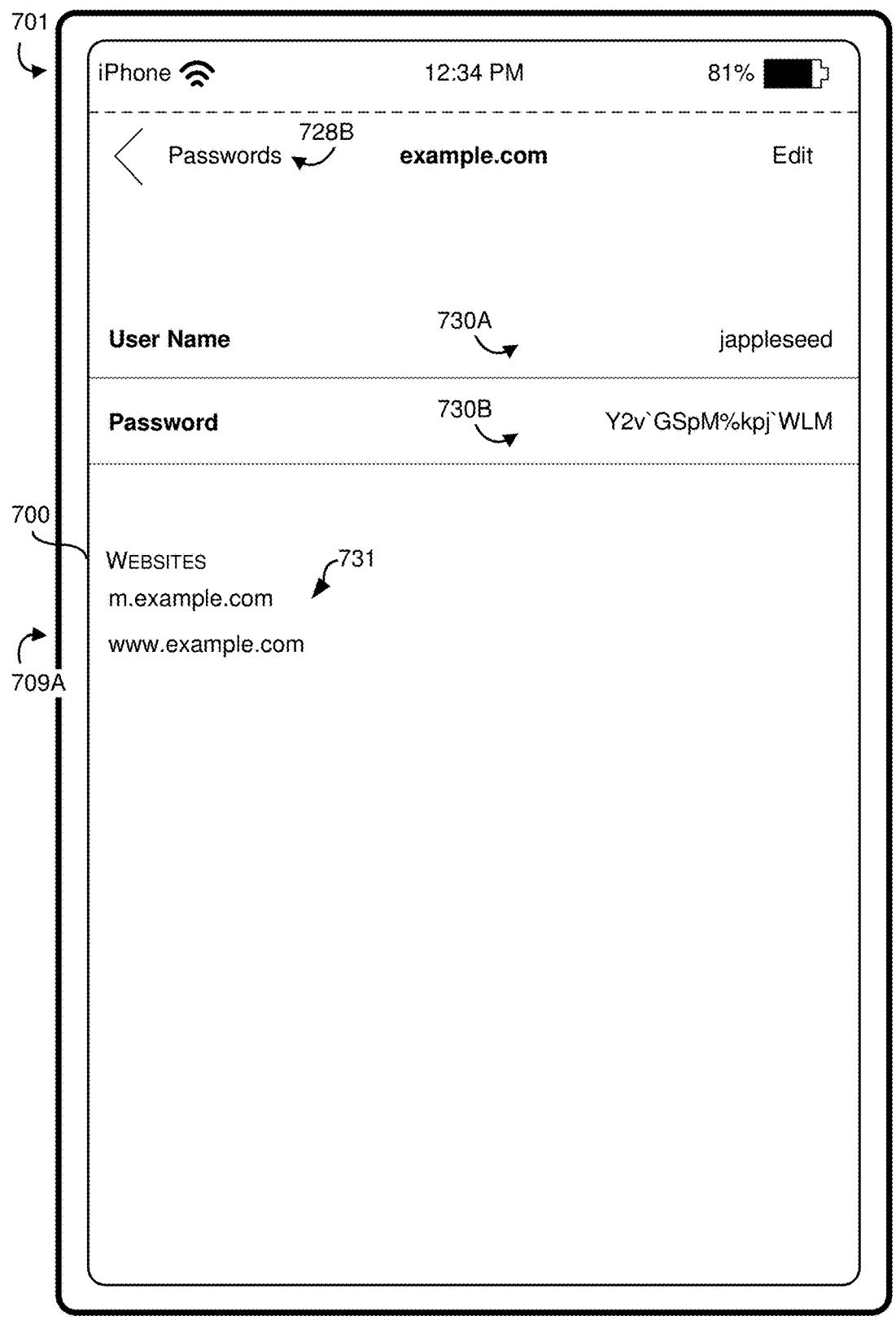

FIG. 7X illustrates the user interface 700 of FIG. 7W in response to authenticating the user. In FIG. 7X, the authenticating window 741 is replaced with an authenticated window 742.

FIG. 7Y illustrates the user interface 700 of FIG. 7X after unlocking the device (e.g., placing the device 100 in an unlocked state) in response to authenticating the user and responding to the verbal request 751E. In FIG. 7Y, the lock screen user interface 705 is replaced with the password details user interface 709A.

FIGS. 8A-8C illustrate a flow diagram of a method 800 of generating a new password for a user account in accordance with some embodiments. The method 800 is performed at an electronic device (e.g., the portable multifunction device 100 in FIG. 1A, or the device 300 in FIG. 3) with a display device and one or more input devices. In some embodiments, the display device is a touch-screen display and one or more of the input devices are on or integrated with the display device. In some embodiments, the display device is separate from the one or more input devices. Some operations in method 800 are, optionally, combined and/or the order of some operations is, optionally, changed.

As described below, the method 800 provides an intuitive way to generate a new password for a user account. The method 800 reduces the cognitive burden on a user when generating a new password for a user account, thereby creating a more efficient human-machine interface. For battery-operated electronic devices, enabling a user to generate a new password for a user account faster and more efficiently conserves power and increases the time between battery charges.

The device displays (802), on the display device, a user interface that includes a new-password field. In various implementations, the user interface includes an electronic form including a plurality of fields. For example, in FIG. 5B, the device 100 displays a web browser user interface 502 that includes a new-password field 532C.

The device detects (804), via the one or more input devices, a user input that corresponds to selection of the new-password field. In various implementations, the user input includes a contact at the location of the new-password field, a click while a cursor is at the location of the new-password field, tabbing to the new-password field, or selecting a next affordance while a field arranged in an order before the new-password field is selected. For example, in FIG. 5F, the device 100 detects a contact 550F at the location of the new-password field 532C. As another example, with reference to FIG. 5F, a user input that corresponds to selection of the new-password field can include a contact at the location of the next affordance in the navigation region 541.

In some embodiments, detecting the user input that corresponds to selection of the new-password field includes determining that a selected field is a new-password field (806) based on one or more of a number of fields of the user interface or text associated with the user interface. For example, in FIG. 5F, the device 100 classifies the field selected by the contact 550F as a new-password field based on the text reading "password" next to the selected field, the text reading "register" in the address bar 521, the number of the plurality of fields 532A-532D being greater than two, and/or the number of fields having text reading "password" next to the field being more than one. By determining that the selected field is a new-password field (as opposed to a different type of field), the user interface provides different options in response to detecting different types of fields and, thus, provides an efficient mechanism for a user to perform various different actions, thereby reducing the amount of user interaction to perform the various actions. The reduction in user interaction reduces wear-and-tear of the device. The reduction in user interaction also results in faster performance of the various actions and, thus, reduces power drain to perform the various actions, increasing battery life of the device.

In response to detecting the user input that corresponds to selection to the new-password field (808), the device displays (810), on the display device, a representation of a new automatically-generated password in the new-password field. Automatically generating a new password for a user account provides an efficient mechanism for a user to generate a new password for a user account, thus reducing the amount of user interaction to generate a new password for a user account. The reduction in user interaction reduces wear-and-tear of the device. The reduction in user interaction also results in faster generation of the new password for the user account and, thus, reduces power drain to generate the new password for the user account, increasing battery life of the device. Further, automatically generating the new password for the user account provides a unique, strong, and/or secure password for the user account, increasing security for user account.

In some embodiments, the device displays (812) the new automatically-generated password. For example, in FIG. 5G1, the device 100 displays the new automatically-generated password in the new-password field 532G. Displaying the new password provides the user with a sense of security, increasing the likelihood that the user will accept the new password, reducing user interaction to generate a different new password. Reducing the user interaction reduces wear-and-tear of the device and reduces power drain, increasing battery life of the device.

In some embodiments, the device displays (814) a generic password indicator. For example, in FIG. 5G2, the device 100 displays a series of asterisks (or bullets) in the new-password field 532C. Displaying a generic password indicator (rather than the new password) reduces user confusion during user account registration and, in particular, password generation, reducing user interaction during the registration. Reducing the user interaction reduces wear-and-tear of the device and reduces power drain, increasing battery life of the device.

In some embodiments, the device displays (816) a portion of the new automatically-generated password and an indication that a portion of the new automatically-generated password is not displayed. For example, in FIG. 5G3, the device 100 displays a portion of the new automatically-generated password and an indication that a portion of the new automatically-generated password is not displayed, e.g., the visibility of the new automatically-generated password decreases along its length by fading. Displaying a portion of the new password provides the benefits of both of the above embodiments, providing the user with a sense of security while reducing user confusion, thereby reducing user interaction with the device. Reducing the user interaction reduces wear-and-tear of the device and reduces power drain, increasing battery life of the device.

In some embodiments, the new automatically-generated password is generated (818) based on one or more password generation constraints of the user interface. For example, in FIG. 5G1, the new automatically-generated password includes an uppercase letter (e.g., Y), a lowercase letter (e.g., v), a number (e.g., 2), a special character (e.g., %), and at least a threshold number of characters. Automatically generating the password based on password generation constraints of the user interface increases the likelihood of the user accepting the password and reduces the probability that the password will be rejected by the service, ultimately reducing the amount of user interaction with the device. Reducing the user interaction reduces wear-and-tear of the device and reduces power drain, increasing battery life of the device. Further, adhering to the password generation constraints of the user interface increases the strength of the password, resulting in increased security for the user account.

Further in response to detecting the user input that corresponds to selection of the new-password field (808), the device displays (820), on the display device, an affordance to accept the new automatically-generated password and an affordance to decline to use the new automatically-generated password. For example, in FIG. 5G3, the device 100 displays the accept affordance 543A and the decline affordance 543B. Displaying the affordance to accept the new password (and the representation of the new password) in response to detecting the user input that corresponds to selection of the new-password field (as opposed to, e.g., user input requesting that the device provide a new automatically-generated password) increases the likelihood that the user will accept the new password and reduces user interaction to generate a new password. Thus, security for the user account is increased and the reduction in user interaction reduces wear-and-tear of the device and reduces power drain, increasing battery life of the device.

In some embodiments, the device displays (822) a new-password user interface including the affordance to accept the new automatically-generated password and the affordance to decline to use the new automatically-generated password. For example, in FIG. 5G3, the device 100 displays the new-password user interface 503C that includes the accept affordance 543A and the decline affordance 543B.

In some embodiments, the device displays (824) the new-password user interface excluding display of a plurality of character insertion affordances displayed in a soft keyboard. For example, in FIG. 5G3, the device 100 displays the new-password user interface 503C, but does not display the soft keyboard 503A of FIG. 5C (or the numeric soft keyboard 503B of FIG. 5E). Excluding display of the soft keyboard increases the likelihood that the user will accept the new password, resulting in increased security and reduced user interaction with the device. Further, excluding display of the soft keyboard uses less space on the screen; thus, a smaller (and less expensive) screen can provide the same usability.

In some embodiments, the device detects (826), via the one or more input devices, a user input that corresponds to a selection of a user identifier field. In various implementations, the user identifier field includes a username field, an e-mail address field, a phone number field, etc. For example, in FIG. 5B, the device 100 detects a contact 550B at the location of the username field 532A. As another example, in FIG. 5D, the device 100 detects a contact 550D at the location of the phone number field 532B. In some embodiments, in response to detecting the user input that corresponds to a selection of the user identifier field, the device displays (828), on the display device, the soft keyboard including the plurality of character insertion affordances. For example, in FIG. 5C, in response to detecting the contact 550B at the location of the username field 532A, the device 100 displays the soft keyboard 503A. As another example, in FIG. 5E, in response to detecting the contact 550D at the location of the phone number field 532B, the device 100 displays the numeric soft keyboard 503B. Providing different user interfaces in response to detecting different types of fields provides an efficient mechanism for a user to perform various different actions, thus reducing the amount of user interaction to perform the various actions. The reduction in user interaction reduces wear-and-tear of the device and increases battery life of the device.

In some embodiments, the new-password user interface includes (830) a description of the new automatically-generated password and instructions for retrieval of the new automatically-generated password. For example, in FIG. 5G3, the new-password user interface 503C includes text 544 including a description of the new automatically-generated password and instructions for retrieval of the new automatically-generated password. In particular, the text 544 indicates that the new automatically-generated password has been automatically generated and satisfies a password strength requirement. The text 544 indicates that the new automatically-generated password will be saved by the device 100 and can be accessed by the user, e.g., via a verbal request. Including a description of the new password and instructions for retrieval increases the likelihood that the user will accept the new password and reduces user interaction to generate a new password. Thus, security for the user account is increased and the reduction in user interaction reduces wear-and-tear of the device and reduces power drain, increasing battery life of the device.

In some embodiments, the device displays (832), separate from the new-password user interface, a second affordance to decline to use the new automatically-generated password. For example, in FIG. 5G3, the device 100 displays a secondary decline affordance 543BB to decline the new automatically-generated password separate from the new-password user interface, in particular, next to the representation of the new automatically-generated password in the new-password field 532C. Displaying a second affordance to decline to use the new password results in a more efficient human-machine interface as a user may more easily find a mechanism to decline to use the new password. For battery-operated electronic devices, a more efficient human-machine user interface conserves power and increases the time between battery charges. Further, a more efficient human-machine user interface reduces the amount of user interaction with the device and reduces wear-and-tear of the device.

In some embodiments, the device detects (834), via the one or more input devices, a user input corresponding to a selection of the affordance to accept the new automatically-generated password. For example, in FIG. 5I, the device 100 detects a contact 550H at the location of the accept affordance 543A. In some embodiments, in response to detecting the user input corresponding to the selection of the affordance to accept the new automatically-generated password, the device ceases to display (836) the affordance to accept the new automatically-generated password and the affordance to decline to use the new automatically-generated password. For example, in FIG. 5J, in response to detecting the contact 550H at the location of the accept affordance 543A, the device ceases to display the new-password user interface 503C including the accept affordance 543A and the decline affordance 543B.

In some embodiments, the device detects (838), via the one or more input devices, a user input corresponding to a selection of the affordance to decline to use the new automatically-generated password. For example, in FIG. 5G3, the device 100 detects a contact 550G at the location of the decline affordance 543B. In some embodiments, in response to detecting the user input corresponding to the selection of the affordance to accept the new automatically-generated password, the device replaces (840) the affordance to accept the new automatically-generated password and the affordance to decline to use the new automatically-generated password with a soft keyboard including a plurality of character insertion affordances. For example, in FIG. 5H, in response to detecting the contact 550G at the location of the decline affordance 543B, the device 100 replaces the new-password user interface 503C including the accept affordance 543A and the decline affordance 543B with the soft keyboard 503B. Replacing the new-password user interface with the soft keyboard provides an efficient mechanism for the user to generate a new password, thus reducing the amount of user interaction to generate the new password. The reduction in user interaction reduces wear-and-tear of the device. The reduction in user interaction also results in faster generation of the new password and, thus, reduces power drain to perform the storage management operations, increasing battery life of the device.

It should be understood that the particular order in which the operations in FIGS. 8A-8C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, and 1100) are also applicable in an analogous manner to method 800 described above with respect to FIGS. 8A-8C. For example, the user interfaces (including the fields, affordances, and responses thereof), user inputs, password representations, and authentication credentials described above with reference to method 800 optionally have one or more of the characteristics of the user interfaces (including the fields, affordances, and responses thereof), user inputs, password representations, and authentication credentials described herein with reference to other methods described herein (e.g., methods 900, 1000, and 1100). For brevity, these details are not repeated here.

FIGS. 9A-9D illustrate a flow diagram of a method 900 of inserting a verification code into a user interface in accordance with some embodiments. The method 900 is performed at an electronic device (e.g., the portable multifunction device 100 in FIG. 1A, or the device 300 in FIG. 3) with a display device and one or more input devices. In some embodiments, the display device is a touch-screen display and one or more of the input devices are on or integrated with the display device. In some embodiments, the display device is separate from the one or more input devices. Some operations in method 900 are, optionally, combined and/or the order of some operations is, optionally, changed.

As described below, the method 900 provides an intuitive way to insert a verification code into a user interface. The method 900 reduces the cognitive burden on a user when inserting a verification code into a user interface, thereby creating a more efficient human-machine interface. For battery-operated electronic devices, enabling a user to insert a verification code into a user interface faster and more efficiently conserves power and increases the time between battery charges.

The device receives (902), via the one or more input devices, a request to access a resource protected by a verification code. In various implementations, the verification code is a one-time use code or on-demand code that is sent via an authorized communication channel, such as via text or email. In various implementations, the request includes selection of a login affordance or selection of a request-code affordance. For example, in FIG. 5M, the device 100 detects a contact 550L at the location of the continue-sign-in affordance 531E.

After receiving the request to access the resource, the device receives (904), at the electronic device, an electronic message. In various implementations, the electronic message is an SMS text message, an e-mail, or a chat message. For example, in FIG. 5O, the device 100 displays a message notification 561A indicating that a text message has been received. However, in various implementations as described below, the device receives the electronic message without displaying a message notification.

In some embodiments, in response to receiving the electronic message, the device displays (906), on the display device, a message notification. For example, in FIG. 5O, in response to receiving the electronic message, the device 100 displays the message notification 561A. In some embodiments, the message notification includes (908) a copy affordance that, when selected, copies the content to a clipboard. For example, in FIG. 5U2, the device 100 displays the message notification 561A including the copy affordance 561C. The copy affordance provides an efficient mechanism for a user to insert the verification code without manually inserting each character of the verification code, reducing user interaction with the device. The reduction in user interaction reduces wear-and-tear of the device. The reduction in user interaction also results in faster insertion of the verification code and, thus, reduces power drain to insert the verification code, increasing battery life of the device.

In some embodiments, the device detects (910), via the one or more inputs, a user input corresponding to selection of the message notification. For example, in FIG. 5O, the device 100 detects the contact 550M at the location of the message notification 561A. In some embodiments, in response to detecting the user input corresponding to selection of the message notification, the device displays (912), on the display device, the electronic message with emphasis of the content that matches the predetermined format (as described further below with respect to block 916). For example, in FIG. 5P, the device 100 displays the message window 564 including the content of the electronic message received from the source, with emphasis (e.g., underlining) of the content that matches the predetermined format (e.g., the verification code "03201981"). Displaying the electronic message in response to detecting selection of the message notification results in a more efficient human-machine interface (as a user need not access an application launcher user interface to launch an application to display the electronic message). Further, displaying the electronic message with emphasis of the content that matches the predetermined format guides the user to quickly find the verification code, resulting in a more efficient human-machine interface. For battery-operated electronic devices, a more efficient human-machine user interface conserves power and increases the time between battery charges. Further, a more efficient human-machine user interface reduces the amount of user interaction with the device and reduces wear-and-tear of the device.

In some embodiments, in response to receiving the electronic message, the device (914), in accordance with a determination that the electronic message does not include content that meets the respective criteria (as described further below with respect to block 916), displays, on the display device, a message notification and, in accordance with a determination that the electronic message includes content that meets the respective criteria, forgoes display of (or suppresses) the message notification. For example, in FIG. 5AC, in accordance with a determination that the received text message does not include a verification code, the device 100 displays the message notification 561F. However, in FIG. 5AB, in accordance with a determination that the received text message includes a verification code, the device 100 forgoes display of a message notification. Forgoing display of the message notification simplifies the process of inserting the verification code, decreasing the likelihood that the user will launch the application by which the electronic message was received and increasing the likelihood the user will insert the verification code using an insertion affordance. This decreases user interaction with the device, reducing wear-and-tear and increasing battery life.

After receiving the electronic message and while displaying, on the display device, a user interface for inputting the verification code: in accordance with a determination that the electronic message includes content that meets respective criteria, wherein the respective criteria include a format requirement that the electronic message includes content that matches a predetermined format, the device displays (916), on the display device, an insertion affordance that, when selected, automatically inserts the content that matches the predetermined format as a verification code in the user interface. For example, in FIG. 5Z, after receiving the text message that prompted display of the message notification 561A in FIG. 5Y and while displaying the web browser user interface 502 including the verification code field 532G, in accordance with a determination that the text message includes a verification code, the device 100 displays the insertion affordance 545 that, when selected inserts the verification code in the verification code field 532G. The insertion affordance provides an efficient mechanism for a user to insert the verification code, thus reducing the amount of user interaction to insert the verification code. The reduction in user interaction reduces wear-and-tear of the device. The reduction in user interaction also results in faster initiation of the performance of the storage management operations and, thus, reduces power drain to perform the storage management operations, increasing battery life of the device.

In some embodiments, the respective criteria include (918) a timing requirement that the user interface for inputting the verification code is displayed within a predetermined time period from when the message was received. For example, in FIG. 5Z, the device 100 displays the insertion affordance 545 in accordance with a determination that the verification code field 532G is selected within three minutes of receiving the text message that prompted display of the message notification 561A in FIG. 5Y. Displaying the insertion affordance for a limited time increases the likelihood that the user will select the insertion affordance and decreases the likelihood that the insertion affordance will be displayed when the user in unlikely to select the insertion affordance, saving space on the screen. By using less space on the screen, a smaller (and less expensive) screen can provide the same usability.

In some embodiments, the respective criteria include (920) a characteristic requirement that the user interface for inputting the verification code includes a text entry field having predetermined characteristics. For example, in FIG. 5Z, the device 100 displays the insertion affordance 545 in accordance with a determination that the web browser user interface 502 includes the verification code field 532G. In some embodiments, the respective criteria include (922) a selection requirement that the text entry field having the predetermined characteristics is selected. For example, in FIG. 5Z, the device 100 displays the insertion affordance 545 in accordance with a determination that the verification code field 532G is selected (e.g., by detecting the contact 550V in FIG. 5Y). Displaying the insertion affordance when a verification code field is selected increases the likelihood that the user will select the insertion affordance and decreases the likelihood that the insertion affordance will be displayed when the user in unlikely to select the insertion affordance, saving space on the screen. By using less space on the screen, a smaller (and less expensive) screen can provide the same usability.

In some embodiments, the predetermined format is based on (924) text of the electronic message. For example, in FIG. 5Z, the device 100 displays the insertion affordance 545 in accordance with detecting the text "code" in the text message that prompted display of the message notification 561A in FIG. 5Y. In some embodiments, the predetermined format is based on (926) the content including a string of characters satisfying a predetermined character criteria. For example, in FIG. 5Z, the device 100 displays the insertion affordance 545 in accordance with detecting the string of characters ("03201981") including a series of eight numbers.

In some embodiments, the insertion affordance is displayed (928) in conjunction with a soft keyboard including a plurality of character insertion affordances. For example, in FIG. 5Z, the device 100 displays the insertion affordance 545 as part of the numeric soft keyboard 503B, above a plurality of character insertion affordances. In some embodiments, the insertion affordance is displayed (930) in a text suggestion region. For example, in FIG. 5Z, the device 100 displays the insertion affordance 545 in the text suggestion region of the numeric soft keyboard 503B. In various implementations, the text suggestion region is above the soft keyboard, located on a touch bar, or within a pop-up menu. Displaying the insertion affordance in conjunction with a soft keyboard provides a more efficient human-machine interface by providing different options to the user (e.g., use the insertion affordance or type the verification code using the soft keyboard) without additional user interaction to access the different options. Reducing the amount of user interaction with the device reduces wear-and-tear of the device and increases battery life of the device.

In some embodiments, the insertion affordance includes (932) an indication of the application by which the electronic message was received. For example, in FIG. 5Z, the insertion affordance 545 includes an indication that the verification code was received from a text messaging application. In some embodiments, the insertion affordance includes (934) an indication of the sender of the electronic message. For example, in FIG. 5Z, the insertion affordance 545 includes an indication that the verification code was received from phone number "987-66." Including an indication of the application and/or sender of the electronic message increases the likelihood that the user will select the insertion affordance and efficiently insert the verification code, reducing user interaction with the device to insert the verification code in other ways. Reducing the amount of user interaction with the device reduces wear-and-tear of the device and increases battery life of the device.

In some embodiments, after receiving the electronic message and while displaying, on the display device, a user interface for inputting the verification code: in accordance with a determination that the electronic message does not include content that meets the respective criteria, the device forgoes display (936) of the insertion affordance. For example, in FIG. 5AD, after receiving the text message that prompted display of the message notification 561F in FIG. 5AC and while displaying the web browser user interface 502 including the verification code field 532G, in accordance with a determination that the text message does not include verification code, the device 100 does not display the insertion affordance 545. In some embodiments, in accordance with a determination that the electronic message does not include content that meets the respective criteria, the device displays (938), on the display device, one or more alternate insertion affordances that, when selected, automatically enters respective words in the user interface. For example, in FIG. 5AD, the device 100 displays alternate insertion affordances in the text suggestion region 542.

In some embodiments, the device detects (940), via the one or more input devices, a user input corresponding to selection of the insertion affordance. For example, in FIG. 5Z, the device 100 detects the contact 550W at the location of the insertion affordance 545. In some embodiments, in response to detecting the user input corresponding to the selection of the insertion affordance, the device automatically inserts (942) the content that matches the predetermined format as a verification code in the user interface. For example, in FIG. 5AA, the device 100 inserts the verification code "03201981" in the verification code field 532G. Automatically inserting the verification code in the user interface provides an efficient human-machine interface for inserting the verification code. For battery-operated electronic devices, a more efficient human-machine user interface conserves power and increases the time between battery charges. Further, a more efficient human-machine user interface reduces the amount of user interaction with the device and reduces wear-and-tear of the device.

In some embodiments, in response to the determination that the electronic message includes the content that meets the respective criteria, the device automatically inserts (944) the content that matches the predetermined format as a verification code in the user interface. For example, in FIG. 5AB, in response to receiving the text message the prompted display of the message notification 561A in FIG. Y, the device 100 automatically inserts the verification code "03201981" in the verification code field 532G. Automatically inserting the verification code in the user interface provides an efficient human-machine interface for inserting the verification code. For battery-operated electronic devices, a more efficient human-machine user interface conserves power and increases the time between battery charges. Further, a more efficient human-machine user interface reduces the amount of user interaction with the device and reduces wear-and-tear of the device.

It should be understood that the particular order in which the operations in FIGS. 9A-9D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000, and 1100) are also applicable in an analogous manner to method 900 described above with respect to FIGS. 9A-9D. For example, the user interfaces (including the fields, affordances, and responses thereof), user inputs, notifications, and criteria described above with reference to method 900 optionally have one or more of the characteristics of the user interfaces (including the fields, affordances, and responses thereof), user inputs, notifications, and criteria described herein with reference to other methods described herein (e.g., methods 800, 1000, and 1100). For brevity, these details are not repeated here.

FIGS. 10A-10C illustrate a flow diagram of a method 1000 of sharing authentication credentials in accordance with some embodiments. The method 1000 is performed at a first electronic device (e.g., the portable multifunction device 100 in FIG. 1A, or the device 300 in FIG. 3) with a display device and one or more input devices. In some embodiments, the display device is a touch-screen display and one or more of the input devices are on or integrated with the display device. In some embodiments, the display device is separate from the one or more input devices. Some operations in method 1000 are, optionally, combined and/or the order of some operations is, optionally, changed.

As described below, the method 1000 provides an intuitive way to share authentication credentials. The method 1000 reduces the cognitive burden on a user when sharing authentication credentials, thereby creating a more efficient human-machine interface. For battery-operated electronic devices, enabling a user to share authentication credentials faster and more efficiently conserves power and increases the time between battery charges.

The first electronic device receives (1002), at the first electronic device, an indication that a second electronic device is in need of authentication credentials for a service. For example, in FIG. 6D, the first electronic device 610 displays a sharing confirmation window 640 in response to receiving an indication that the second electronic device 620 is in need of authentication credentials for a service.

In response to receiving the indication that the second electronic device is in need of authentication credentials for the service, in accordance with a determination that the first electronic device meets respective criteria, wherein the respective criteria include a requirement that the first electronic device is within a predetermined proximity to the second electronic device, the first electronic device displays (1004), on the display device in order for the respective criteria to be met, a verification prompt that requires input of verification information from the second electronic device on the first electronic device in order to proceed. For example, in FIG. 6E, the first electronic device 610 displays the first user interface 612 including a verification prompt that requires input of information from the second electronic device 620 (e.g., the verification information displayed by the second electronic device 620) on the first electronic device 610 in order to proceed.

In some embodiments, in accordance with a determination that the first electronic device does not meet the respective criteria, the first electronic device forgoes display (1006) of the verification prompt. For example, in FIG. 6E, a third electronic device which does not meet the respective criteria forgoes display of the verification prompt. Forgoing display of the verification prompt on user devices that are not proximate to the second electronic devices provides a more efficient human-machine interface, reducing the amount of user interaction to dismiss the verification prompt and using less space on the screen for unnecessary information. For battery-operated electronic devices, a more efficient human-machine user interface conserves power and increases the time between battery charges. Further, a more efficient human-machine user interface reduces the amount of user interaction with the device and reduces wear-and-tear of the device. By using less space on the screen, a smaller (and less expensive) screen can provide the same usability.

In some embodiments, the respective criteria include (1008) a requirement that the first electronic device is within a proximity to a third electronic device that is associated with the second electronic device. In some embodiments, the second electronic device is (1010) a media playback device and the third electronic device is a remote control for the second electronic device. For example, in FIG. 6E, the first electronic device 610 displays the verification prompt in accordance with its proximity to the third electronic device 630.

In some embodiments, the first electronic device displays (1012), on the display device, a sharing confirmation notification including a sharing confirmation affordance that, when selected, causes display of the verification prompt and detects, via the one or more input devices, a user input corresponding to selection of the sharing confirmation affordance. For example, in FIG. 6E, the first electronic device 610 displays the sharing confirmation window 640 that includes the sharing confirmation affordance 641 and detects the contact 650C at the location of the sharing confirmation affordance 641. The sharing confirmation window decreases the likelihood that authentication credentials would be shared accidentally. Thus, the security of the user account is increased.

In some embodiments, the verification information from the second electronic device is (1014) displayed by the second electronic device. For example, in FIG. 6E, the verification information from the second electronic device 620 is displayed by the second electronic device 620 on the display device 621.

While displaying the verification prompt, the first electronic device receives (1016), via the one or more input devices, the verification information from the second electronic device on the first electronic device. For example, in FIG. 6E, the first electronic device detects the contact 650D (and additional contacts) corresponding to the verification information displayed by the second electronic device 620.

In some embodiments, the verification prompt is (1018) for establishing a secure connection between the first electronic device and the second electronic device and receiving the verification information from the second electronic device on the first electronic device includes receiving an input that satisfies the conditions for establishing the secure connection between the first electronic device and the second electronic device.

In response to receiving the verification information, the first electronic device initiates (1020) a process for sharing authentication credentials for the service from the first electronic device to the second electronic device. For example, in FIG. 6F, in response to receiving the verification information, the first electronic device 610 displays the service selection user interface 508 including a list of service affordances 661A-661G respectively associated a plurality of services, user accounts for those services, and authentication credentials for those user accounts and, in FIG. 6G, in response to detecting a selection of a particular service, shares authentication credentials for the service from the first electronic device 610 to the second electronic device 620. Sharing the authentication credentials provides an efficient mechanism for a user to input authentication credentials on the second electronic device without using other user interaction. The reduction in user interaction reduces wear-and-tear of the device. The reduction in user interaction also results in faster initiation of inputting authentication credentials on the second electronic device and, thus, reduces power drain to input the authentication credentials, increasing battery life of the device.

In some embodiments, the first electronic device detects (1022), via the one or more input devices, a sequence of one or more inputs to share authentication credentials for the service. For example, in FIG. 6F, the device detects the contact 650E at the location of the first service affordance 661A and, in response, shares the authentication credentials for the first service from the first electronic device 610 to the second electronic device 620.

In some embodiments, the first electronic device displays (1024), on the display device a service list including a plurality of service affordances respectively corresponding to a plurality of services respectively associated with a plurality of authentication credentials. For example, in FIG. 6F, the first electronic device 610 displays the service selection user interface 508 including a list of service affordances 661A-661G respectively associated a plurality of services, user accounts for those services, and authentication credentials for those user accounts.

In some embodiments, the first electronic device sorts (1026) the service list based at least in part on relevance of the respective services. In various implementations, the relevant of the respective services is based on a domain name, application name, or identifier for the service requesting credentials supplied by the second device and applied by the first device. For example, in FIG. 6F, the indication that the second electronic device 620 is in need of authentication credentials for a service indicates the service and that service is listed at the top of the list of service affordances 661A-661G. Sorting the service list provides an efficient mechanism for the user to select the service affordance associated with the intended service, reducing user interaction with the device and increasing security by reducing the likelihood that the user will share authentication credentials (e.g., for another user account) accidentally.

In some embodiments, the first electronic device detects (1028), via the one or more input devices, a user input corresponding to a selection of one of the plurality of service affordances corresponding to the service associated with the authentication credentials for the service. For example, in FIG. 6F, the device detects the contact 650E at the location of the first service affordance 661A and, in response, shares the authentication credentials for the first service from the first electronic device 610 to the second electronic device 620.

In some embodiments, in response to detecting the sequence of one or more inputs, the first electronic device shares (1030) authentication credentials for the service from the first electronic device to the second electronic device. For example, in FIG. 6G, in response to detecting the contact 650E at the location of the first service affordance 661A in FIG. 6F, the first electronic device 610 shares authentication credentials for the first service from the first electronic device 610 to the second electronic device 620.

In some embodiments, the first electronic device transmits (1032), from the first electronic device to the second electronic device, the authentication credentials for the service wirelessly over a secure connection. For example, the authentication credentials can be transmitted via a peer-to-peer WiFi connection or a Bluetooth connection. In some embodiments, the first electronic device shares (1034) authentication credentials including a user identifier and a password from the first electronic device to the second electronic device.

In some embodiments, before transmitting the authentication credentials, the first electronic device authenticates the user. Thus, in some embodiments, the first electronic device obtains (1036), via the one or more input devices, authentication information and authenticates (1038) the user based on the authentication information. Authenticating the user before sharing the authentication credentials increases security of the user account by decreasing the likelihood that the authentication credentials would be shared without the user's knowledge.

In some embodiments, after the process for sharing the authentication credentials for the service, the first electronic device displays (1040), on the display device, a notification indicating that the process for sharing the authentication credentials for the service is completed. For example, in FIG. 6G, the first electronic device 610 displays a complete-sharing window 643 including a notification indicating that the authentication credentials having been shared with the second electronic device 620.

It should be understood that the particular order in which the operations in FIGS. 10A-10C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, and 1100) are also applicable in an analogous manner to method 1000 described above with respect to FIGS. 10A-10C. For example, the user interfaces (including the fields, affordances, and responses thereof), the user inputs, the electronic devices, and the authentication credentials described above with reference to method 1000 optionally have one or more of the characteristics of the user interfaces (including the fields, affordances, and responses thereof), the user inputs, the electronic devices, and the authentication credentials described herein with reference to other methods described herein (e.g., methods 800, 900, and 1100). For brevity, these details are not repeated here.

FIGS. 11A-11C illustrate a flow diagram of a method 1100 of displaying password information in accordance with some embodiments. The method 1100 is performed at an electronic device (e.g., the portable multifunction device 100 in FIG. 1A, or the device 300 in FIG. 3) with a display device and one or more input devices. In some embodiments, the display device is a touch-screen display and one or more of the input devices are on or integrated with the display device. In some embodiments, the display device is separate from the one or more input devices. Some operations in method 1100 are, optionally, combined and/or the order of some operations is, optionally, changed.

As described below, the method 1100 provides an intuitive way to display password information. The method 1100 reduces the cognitive burden on a user when displaying password information, thereby creating a more efficient human-machine interface. For battery-operated electronic devices, enabling a user to displaying password information faster and more efficiently conserves power and increases the time between battery charges.

The device detects (1102), via the one or more input devices, a verbal request to display password information. In various implementations, the device detects the verbal request via a microphone. For example, in FIG. 7I, the device 100 detects a verbal request 751A to display password information. As another example, in FIG. 7O, the device 100 detects a verbal request 751B to display password information. As another example, in FIG. 7R, the device 100 detects a verbal request 751C to display password information. As another example, in FIG. 7T, the device 100 detects a verbal request 751D to display password information.

In response to receiving the verbal request to display the password information, in accordance with a determination that the request is for a password for a first user account that is accessible by the device and that the user is authenticated, the device displays (1104) the password for the first user account. For example, in FIG. 7L, in accordance with a determination that the verbal request 751A is for a password for the user account associated with the fourth user account affordance 727D of FIG. 7D and after authenticating the user (as illustrated in FIGS. 7J-7K), the device 100 displays a password affordance 730B including text indicating the password associated with that user account. As another example, in FIG. 7P, in accordance with a determination that the verbal request 751B is for a password for the user account associated with the seventh user account affordance 727G of FIG. 7D and after authenticating the user, the device 100 displays a password affordance 730D including text indicating the password associated with that user account. Displaying password information in response to a verbal request provides an efficient mechanism for displaying password information, thus reducing the amount of user interaction to display password information. The reduction in user interaction reduces wear-and-tear of the device. The reduction in user interaction also results in faster initiation of displaying password information and, thus, reduces power drain to display password information, increasing battery life of the device.

In some embodiments, the device displays (1106) information regarding the first user account that is accessible by the device. For example, in FIG. 7L, the device 100 displays the password details user interface 709A including a username affordance 730A including text indicating the username associated with the user account of the service, a password affordance 730B including text indicating the password associated with the user account, and text indicative of websites 731A associated with the service of the user account. As another example, in FIG. 7P, the device 100 displays the password details user interface 709B including a username affordance 730C including text indicating the username associated with the user account of the service, a password affordance 730D including text indicating the password associated with the user account, and text indicative of websites 731B associated with the service of the user account. Providing additional information about the first user account increases user confidence regarding the display of the first password, decreasing the likelihood that the user will perform further user interaction to display the first password. Decreasing user interaction reduces wear-and-tear of the device and increases battery life of the device.

In some embodiments, the information regarding the first user account that is accessible by the device includes (1108) password security information for the password for the first user account. In some embodiments, the information regarding the first user account that is accessible by the device includes (1110) an alert indicating that the password for the first user account is the same as a password for another user account that is accessible by the device. For example, in FIG. 7P, the device 100 displays an alert 735 indicating that the password associated with the second user account is the same as a password associated with one or more other accounts. In some embodiments, the password security information for the password for the first user account includes information regarding a strength of the password, e.g., if it is easily guessed, is short, is low-entropy, contains common words, etc. In some embodiments, the alert includes (1112) an affordance that, when selected, displays a resource for changing the password for the first user account. For example, in FIG. 7P, the alert 735 includes the change-password affordance 736 that, when selected, displays a resource, e.g., a webpage or an application, for changing the password for the user account. Providing an affordance for changing a weak or duplicative password provides an efficient mechanism for a user to change a password, thus reducing the amount of user interaction to change the password. The reduction in user interaction reduces wear-and-tear of the device. The reduction in user interaction also results in faster initiation of changing the password and, thus, reduces power drain to change the password, increasing battery life of the device. Further, providing an efficient mechanism for a user to change the password increases the likelihood that a user will perform such an action and increase security of the user account.

In response to receiving the verbal request to display the password information, in accordance with a determination that the request is for a password for a second user account that is accessible by the device and that the user is authenticated, the device displays (1114) the password for the second user account. For example, in FIG. 7L, in accordance with a determination that the verbal request 751A is for a password for the user account associated with the fourth user account affordance 727D of FIG. 7D and after authenticating the user (as illustrated in FIGS. 7J-7K), the device 100 displays a password affordance 730B including text indicating the password associated with that user account. As another example, in FIG. 7P, in accordance with a determination that the verbal request 751B is for a password for the user account associated with the seventh user account affordance 727G of FIG. 7G and after authenticating the user, the device 100 displays a password affordance 730D including text indicating the password associated with that user account.

In some embodiments, in response to receiving the verbal request to display the password information and in accordance with a determination that the request is for general password information, the device displays (1116) a list of password display affordances which, when selected, displays a respective password of a respective user account accessible by the device. For example, in FIG. 7S, in response to receiving the verbal request 751C in FIG. 7R, the device 100 displays the password list user interface 708 that includes a list of user account affordances 727A-727G respectively associated with a plurality of user accounts with a respective plurality of services and authentication credentials for those user accounts. Displaying password information in response to a verbal request provides an efficient mechanism for displaying password information, thus reducing the amount of user interaction to display password information. The reduction in user interaction reduces wear-and-tear of the device. The reduction in user interaction also results in faster initiation of displaying password information and, thus, reduces power drain to display password information, increasing battery life of the device.

In some embodiments, in response to receiving the verbal request to display the password information and in accordance with a determination that the request is for a password of user account not accessible by the device, the device displays (1118) a list of password display affordances which, when selected, displays a respective password of a respective user account accessible by the device. For example, in FIG. 7U, in response to receiving the verbal request 751D in FIG. 7T, the device 100 displays the password list user interface 708 that includes a list of user account affordances 727A-727G respectively associated with a plurality of user accounts with a respective plurality of services and authentication credentials for those user accounts. In some embodiments, the device displays (1120) a search field prepopulated based on the verbal request. For example, in FIG. 7U, the search field 729 is prepopulated with the word "Hotels" based on the verbal request 751D in FIG. 7T.

In some embodiments, the device detects (1122), via the one or more input devices, a user input corresponding to a selection of the password of the first user account. For example, in FIG. 7L, the device 100 detects the contact 7520F at the location of the password affordance 730B. In some embodiments, in response to detecting the user input corresponding to selection of the password of the first user account, the device displays (1124), on the display device, a share affordance which, when selected, initiates a process for sharing the password of the first user account. For example, in FIG. 7M, the device 100 displays the share affordance 732B that, when selected, initiates a process for sharing the password (and/or other authentication credentials) associated with the first user account. Thus, the user interface provides an efficient mechanism for a user to share authentication credentials, reducing the amount of user interaction to share authentication credentials. The reduction in user interaction reduces wear-and-tear of the device. The reduction in user interaction also results in faster initiation of the sharing of authentication credentials and, thus, reduces power drain to share authentication credentials, increasing battery life of the device.

In some embodiments, the device detects (1126), via the one or more input devices, a user input corresponding to a selection of the share affordance. For example, in FIG. 7M, the device 100 detects the contact 750G at the location of the share affordance 732B. In some embodiments, In response to detecting the user input corresponding to selection of the share affordance, the device displays (1128), on the display device, a recipient selection card including one or more recipient affordances which, when selected, shares the password of the first user account with a respective device. For example, in FIG. 7N, the device 100 displays the recipient selection card 733 that includes the plurality of recipient affordances 734A-734C that, when selected initiates a process for sharing the password (and/or other authentication credentials) associated with the first user account with a respective recipient.

In some embodiments, in response to receiving the verbal request to display the password information and in accordance with a determination that the user is not authenticated, the device authenticates the user and proceeds to display the requested password information. Thus, in some embodiments, in response to receiving the verbal request to display the password information and in accordance with a determination that the user is not authenticated, the device obtains (1130), via the one or more input devices, authentication information and authenticates the user based on the authentication information. For example, in FIGS. 7J-7K, in response to detecting the verbal request 751A, the device 100 obtains, via the one or more input devices, authentication information (as illustrated by the authenticated window 741 of FIG. 7J) and authenticates the user based on the authentication information (as illustrated by the authenticated window 742 of FIG. 7K). In some embodiments, the authentication information includes (1132) a biometric of the user, such as facial features or a fingerprint. Authenticating the user increases the security of the user account by ensuring that the password information will not be displayed without the user's knowledge.

In some embodiments, prior to receiving the verbal request to display the password information and while the device is locked, the device detects (1134), via the one or more input devices, a user input requesting unlocking the device; in response to the user input requesting unlocking the device, the device obtains, via the one or more input devices, unlocking information; and the device unlocks the device based on the unlocking information. For example, in FIG. 7F, the device 100 detects a user input requesting unlocking the device in the form of the contact 750E detected moving upwards from a location near the bottom of the display. In FIG. 7G, the device 100 obtains unlocking information (as illustrated by the authenticating window 741). In FIG. 7H, the device 100 unlocks the device 100 based on the unlocking information (as illustrated by the authenticated window 742).

In some embodiments, the unlocking information includes (1136) a passcode and the authentication information includes a biometric of the user or, if a biometric authentication fails, a passcode. Thus, in various implementations, the authentication information is more secure than the unlocking information. However, in various implementations, the authentication information includes a passcode (e.g., if biometric authentication fails, if biometric authentication fails twice, or is not configured).

In some embodiments, authentication information is obtained (1138) while the device is locked and wherein authenticating the user based on the authentication information further includes unlocking the device based on the authentication information. For example, in FIG. 7W, the device 100 obtains authentication information (as illustrated by the authenticating window 741) while the device is locked (as indicated by the lock screen user interface 705).

In FIG. 7Y, the device 100 is unlocked (as indicated by the password details user interface 709A) based on the authentication information. Unlocking the device and authenticating the user based on the same information results in a more efficient human-machine interface (as a user need not separately unlock the device and authenticate). For battery-operated electronic devices, a more efficient human-machine user interface conserves power and increases the time between battery charges. Further, a more efficient human-machine user interface reduces the amount of user interaction with the device and reduces wear-and-tear of the device.

It should be understood that the particular order in which the operations in FIGS. 11A-11C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, and 1000) are also applicable in an analogous manner to method 1100 described above with respect to FIGS. 11A-11C. For example, the user interfaces (including the fields, affordances, and responses thereof), the user inputs (in particular, verbal requests and commands), and authentication credentials, described above with reference to method 1100 optionally have one or more of the characteristics of the user interfaces (including the fields, affordances, and responses thereof), the user inputs (in particular, verbal requests and commands), and authentication credentials, described herein with reference to other methods described herein (e.g., methods 800, 900, and 1000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8C, 9A-9D, 10A-10C, and 11A-11C are, optionally, implemented by components depicted in FIGS. 1A-1B. For example, display operation 802, detection operation 804, display operation 810, display operation 820, reception operation 902, reception operation 904, display operation 916, reception operation 1002, display operation 1004, reception operation 1016, initiation operation 1020, detection operation 1102, display operation 1104, or display operation 1114 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device with a display device and one or more input devices:
displaying, on the display device, a user interface that includes a new-password field;
detecting, via the one or more input devices, a user input that corresponds to selection of the new-password field; and
in response to detecting the user input that corresponds to selection of the new-password field:
displaying, on the display device, a representation of a new automatically-generated password in the new-password field; and
displaying, on the display device, an affordance to accept the new automatically-generated password and an affordance to decline to use the new automatically-generated password.

2. The method of claim 1, wherein displaying the representation of the new automatically-generated password includes displaying the new automatically-generated password.

3. The method of claim 1, wherein displaying the representation of the new automatically-generated password includes displaying a portion of the new automatically-generated password and an indication that a portion of the new automatically-generated password is not displayed.

4. The method of claim 1, wherein displaying the representation of the new automatically-generated password includes displaying a generic password indicator.

5. The method of claim 1, wherein displaying the affordance to accept the new automatically-generated password and the affordance to decline to use the new automatically-generated password includes displaying a new-password user interface including the affordance to accept the new automatically-generated password and the affordance to decline to use the new automatically-generated password.

6. The method of claim 5, wherein, displaying the new-password user interface excludes display of a plurality of character insertion affordances displayed in a soft keyboard.

7. The method of claim 6, further comprising:
detecting, via the one or more input devices, a user input that corresponds to selection of a user identifier field; and
in response to detecting the user input that corresponds to selection of the user identifier field, displaying, on the display device, the soft keyboard including the plurality of character insertion affordances.

8. The method of claim 5, wherein the new-password user interface further includes a description of the new automatically-generated password and instructions for retrieval of the new automatically-generated password.

9. The method of claim 5, wherein displaying the new-password user interface further includes displaying, separate from the new-password user interface, a second affordance to decline to use the new automatically-generated password.

10. The method of claim 1, further comprising:
detecting, via the one or more input devices, a user input corresponding to a selection of the affordance to accept the new automatically-generated password; and
in response to detecting the user input corresponding to the selection of the affordance to accept the new automatically-generated password, ceasing to display the affordance to accept the new automatically-generated password and the affordance to decline to use the new automatically-generated password.

11. The method of claim 1, further comprising:
detecting, via the one or more input devices, a user input corresponding to a selection of the affordance to decline to use the new automatically-generated password; and
in response to detecting the user input corresponding to the selection of the affordance to accept the new automatically-generated password, replacing the affordance to accept the new automatically-generated password and the affordance to decline to use the new automatically-generated password with a soft keyboard including a plurality of character insertion affordances.

12. The method of claim 1, wherein detecting the user input that corresponds to selection of the new-password field includes determining that a selected field is a new-password field based on one or more of a number of fields of the user interface or text associated with the user interface.

13. The method of claim 1, wherein the new automatically-generated password is generated based on one or more password generation constraints of the user interface.

14. An electronic device comprising:
a display device configured to display a user interface;
one or more input devices configured to receive inputs; and
a processing device coupled with the display device and the one or more input devices, the processing device configured to:
display, on the display device, a user interface that includes a new-password field;
detect, via the one or more input devices, a user input that corresponds to selection of the new-password field; and
in response to detecting the user input that corresponds to selection of the new-password field:
display, on the display device, a representation of a new automatically-generated password in the new-password field; and
display, on the display device, an affordance to accept the new automatically-generated password and an affordance to decline to use the new automatically-generated password.

15. The electronic device of claim 14, wherein the processing device is configured to display the affordance to accept the new automatically-generated password and the affordance to decline to use the new automatically-generated password by displaying a new-password user interface including the affordance to accept the new automatically-generated password and the affordance to decline to use the new automatically-generated password.

16. The electronic device of claim 15, wherein, the processing device is configured to display the new-password user interface without displaying a plurality of character insertion affordances displayed in a soft keyboard.

17. The electronic device of claim 16, wherein the processing device is further configured to:
detect, via the one or more input devices, a user input that corresponds to selection of a user identifier field; and
in response to detecting the user input that corresponds to selection of the user identifier field, display, on the display device, the soft keyboard including the plurality of character insertion affordances.

18. The electronic device of claim 14, wherein the processing device is further configured to:
detect, via the one or more input devices, a user input corresponding to a selection of the affordance to accept the new automatically-generated password; and
in response to detecting the user input corresponding to the selection of the affordance to accept the new automatically-generated password, cease to display the affordance to accept the new automatically-generated password and the affordance to decline to use the new automatically-generated password.

19. The electronic device of claim 14, wherein the processing device is further to:
detect, via the one or more input devices, a user input corresponding to a selection of the affordance to decline to use the new automatically-generated password; and
in response to detecting the user input corresponding to the selection of the affordance to accept the new automatically-generated password, replace the affordance to accept the new automatically-generated password and the affordance to decline to use the new automatically-generated password with a soft keyboard including a plurality of character insertion affordances.

20. A non-transitory computer readable storage medium storing one or more programs, the one or more programs comprising instructions, that, when executed by an electronic device with a display device and one or more input devices, cause the electronic device to:
display, on the display device, a user interface that includes a new-password field;
detect, via the one or more input devices, a user input that corresponds to selection of the new-password field; and
in response to detecting the user input that corresponds to selection of the new-password field:
display, on the display device, a representation of a new automatically-generated password in the new-password field; and
display, on the display device, an affordance to accept the new automatically-generated password and an affordance to decline to use the new automatically-generated password.

21. The non-transitory computer readable storage medium of claim 20, wherein the instructions, when executed, caused the electronic device to display the affordance to accept the new automatically-generated password and the affordance to decline to use the new automatically-generated password by displaying a new-password user interface including the affordance to accept the new automatically-generated password and the affordance to decline to use the new automatically-generated password.

22. The non-transitory computer readable storage medium of claim 21, wherein, the instructions, when executed, caused the electronic device to display the new-password user interface without displaying of a plurality of character insertion affordances displayed in a soft keyboard.

23. The non-transitory computer readable storage medium of claim 22, where the instructions, when executed further cause the electronic device to:

detect, via the one or more input devices, a user input that corresponds to selection of a user identifier field; and in response to detecting the user input that corresponds to selection of the user identifier field, display, on the display device, the soft keyboard including the plurality of character insertion affordances.

24. The non-transitory computer readable storage medium of claim 21, wherein the new-password user interface further includes a description of the new automatically-generated password and instructions for retrieval of the new automatically-generated password.

25. The non-transitory computer readable storage medium of claim 21, wherein the instructions, when executed, cause the electronic device to display the new-password user interface by displaying, separate from the new-password user interface, a second affordance to decline to use the new automatically-generated password.

26. The non-transitory computer readable storage medium of claim 20, wherein the instructions, when executed, further cause the electronic device to:

detect, via the one or more input devices, a user input corresponding to a selection of the affordance to accept the new automatically-generated password; and in response to detecting the user input corresponding to the selection of the affordance to accept the new automatically-generated password, cease to display the affordance to accept the new automatically-generated password and the affordance to decline to use the new automatically-generated password.

27. The non-transitory computer readable storage medium of claim 20, wherein the instructions, when executed, further cause the electronic device to:

detect, via the one or more input devices, a user input corresponding to a selection of the affordance to decline to use the new automatically-generated password; and in response to detecting the user input corresponding to the selection of the affordance to accept the new automatically-generated password, replace the affordance to accept the new automatically-generated password and the affordance to decline to use the new automatically-generated password with a soft keyboard including a plurality of character insertion affordances.

* * * * *